(12) United States Patent
Rivard

(10) Patent No.: US 10,223,618 B1
(45) Date of Patent: Mar. 5, 2019

(54) METHOD AND APPARATUS FOR TRANSFORMATION OF DOT TEXT IN AN IMAGE INTO STROKED CHARACTERS BASED ON DOT PITCHES

(71) Applicant: MATROX ELECTRONIC SYSTEMS LTD., Dorval (CA)

(72) Inventor: Dominique Rivard, Dorval (CA)

(73) Assignee: MATROX ELECTRONIC SYSTEMS LTD., Dorval (CA)

( * ) Notice: Subject to any disclaimer, the term of this patent is extended or adjusted under 35 U.S.C. 154(b) by 50 days.

(21) Appl. No.: 15/277,925

(22) Filed: Sep. 27, 2016

(51) Int. Cl.
*G06K 9/62* (2006.01)

(52) U.S. Cl.
CPC ......... *G06K 9/6298* (2013.01); *G06K 9/6215* (2013.01); *G06K 9/6228* (2013.01); *G06K 2209/01* (2013.01)

(58) Field of Classification Search
CPC ... G06K 9/6298; G06K 9/6215; G06K 9/6228
USPC ....................................................... 382/198
See application file for complete search history.

(56) References Cited

U.S. PATENT DOCUMENTS

| | | | |
|---|---|---|---|
| 5,182,778 A | 1/1993 | Rudak et al. | |
| 5,212,741 A | 5/1993 | Barski et al. | |
| 5,825,919 A | 10/1998 | Bloomberg et al. | |
| 6,438,265 B1 | 8/2002 | Heilper et al. | |
| 6,597,809 B1 | 7/2003 | Ross et al. | |
| 7,903,864 B1 | 3/2011 | Lina et al. | |
| 8,418,249 B1 | 4/2013 | Nucci et al. | |
| 9,317,767 B2 | 4/2016 | Zadeh et al. | |
| 2003/0185448 A1 | 10/2003 | Seeger et al. | |
| 2004/0032500 A1 | 2/2004 | Silverbrook et al. | |
| 2010/0134830 A1 | 6/2010 | Ogashiwa | |
| 2010/0220364 A1* | 9/2010 | Picard | G03G 21/046 358/3.28 |
| 2012/0082371 A1 | 4/2012 | Bengio et al. | |
| 2012/0237116 A1 | 9/2012 | Xiao | |
| 2013/0174011 A1 | 7/2013 | Le et al. | |
| 2014/0063306 A1 | 3/2014 | Scott | |
| 2014/0105496 A1* | 4/2014 | Zadeh | G06K 9/00409 382/177 |
| 2015/0097886 A1 | 4/2015 | Ohnishi | |

(Continued)

OTHER PUBLICATIONS

Notice of Allowance from U.S. Appl. No. 15/277,937, dated Apr. 10, 2018, 12 pages.

(Continued)

*Primary Examiner* — Raj Chakraborty
(74) *Attorney, Agent, or Firm* — Nicholson De Vos Webster & Elliott LLP

(57) ABSTRACT

A method and apparatus for determining orientation and dot pitch of characters in an image. A statistical neighborhood of a set of dots of an image is determined. The statistical neighborhood includes a set of points and each point is associated with a position and a statistical measure indicative of a likelihood that one or more dots that satisfy a shape and a size criteria are located at that position. A Fast Fourier Transform (FFT) is computed across the set of points of the statistical neighborhood; and based on the FFT of the set of points, a first orientation and a first distance between adjacent dots of characters along the first orientation, and a second orientation and a second distance between adjacent dots of the characters along the second orientation are determined.

30 Claims, 31 Drawing Sheets

(56) References Cited

U.S. PATENT DOCUMENTS

2017/0163873 A1    6/2017   Kim et al.
2017/0280132 A1    9/2017   Tohme

OTHER PUBLICATIONS

Notice of Allowance from U.S. Appl. No. 15/277,947, dated Apr. 10, 2018, 12 pages.
Notice of Allowance from U.S. Appl. No. 15/277,958, dated May 10, 2018, 15 pages.
Notice of Allowance from U.S. Appl. No. 15/277,958, dated May 22, 2018, 3 pages.
Notice of Allowance from U.S. Appl. No. 15/277,958, dated Aug. 1, 2018, 15 pages.
Tajinder Kaur et al., "Text Extraction from Natural Scene using PCA", IJCSET (www.ijcset.net), vol. 5, Issue 7,272-277, Jul. 2015, pp. 272-277.
Berrin A. Yanikoglu, "Pitch-based segmentation and recognition of dot-matrix text", International Journal of Document Analysis Recognition (IJDAR), Apr. 21, 2000, pp. 34-39.
Martin Grafmüller et al., "Segmentation of Printed Gray Scale Dot Matrix Characters", International Institute of Informatics and Systemics-IIIS-: 14th World Multi-Conference on Systemics, Cybernetics and Informatics, WMSCI 2010. Proceedings, vol. 2: Jun. 29-Jul. 2, 2010, pp. 87-91.
Yuning Du et al., "Dot Text Detection Based on FAST Points", 2011 International Conference on Document Analysis and Recognition, IEEE, 2011, pp. 435-439.
Khader Mohammad et al,. "Practical Recognition System for Text Printed on Clear Reflected Material" ISRN Machine Vision 2012 (2012), pp. 1-17.
Koji Endo et al., "Performance Improvement of Dot-Matrix Character Recognition by Variatoin Model Based Learning", Asian Conference on Computer Vision. Springer International Publishing, 2014, pp. 1-10.
Siddharth Nitin Patki et al., "Dot Matrix Text Recognition for Industrial Carton Classification", 2015 International Conference on Industrial Instrumentation and Control (ICIC), IEEE, May 28-30, 2015, pp. 777-782.
Lindsay I. Smith, "A tutorial on Principal Components Analysis", Cornell University, USA 51, Feb. 26, 2002, 27 pages.
"Principal component analysis", <https://en.wikipedia.org/wiki/Principal_component_analysis>, Wikipedia, Retrieved Sep. 20, 2016, 22 pages.
Sonu Rani et al., "Automated LED Text Recognition with Neural Network and PCA—A Review", International Journal of Advance Research, Ideas and Innovations in Technology, vol. 2, Issue 3, 2016, pp. 1-5.
"OCR and Other Recognition Technologies", <https://www.abbyy.com.ocr-sdk-windows/ocr-stages/ocr>, FineReader Engine, Retrieved on Aug. 16, 2016, pp. 1-8.
"Optical Character Recognition Using PCA", <http://www.algosome.com/articles/optical-character-recognition-java.html>, Retrieved on Aug. 16, 2016, pp. 1-7.
P. Subbuthai et al., "Identifying the Character by Applying PCA Method using Matlab", International Journal of Computer Applications (0975-8887), vol. 60—No. 1, Dec. 2012, pp. 8-11.
M. Mudrova et al., "Principle Component Analysis in Image Processing", Proceedings of the MATLAB Technical computing Conference, Prague, 2005, 4 pages.
Tao Gao et al., "A method used for Dotted Data Matrix image processing", Journal of Computational Methods in Sciences and Engineering 15, 2015, pp. 685-693.
David Casasent et al., "Detection and Segmentation of Multiple Touching Product Inspection Items", Photonics East'96. International Society for Optics and Photonics, 1996, 12 pages.
Satya Mallick, "Blob Detection Using OpenCV (Python, C++)", <https://www.learnopencv.com/blob-detection-using-opencv-python-c/>, Feb. 17, 2015, pp. 1-11.
"Multi otsu(multi-thresholding) with openCV", <http://stackoverflow.com/questions/22706742/multi-otsumulti-threshholding>, Retrieved Aug. 18, 2016, pp. 1-6.
Non-Final Office Action from U.S. Appl. No. 15/277,958, dated Mar. 26, 2018, 23 pages.
Non-Final Office Action from U.S. Appl. No. 15/277,937, dated Dec. 15, 2017, 13 pages.
Non-Final Office Action from U.S. Appl. No. 15/277,947, dated Dec. 14, 2017, 14 pages.
Notice of Allowance from U.S. Appl. No. 15/277,947, dated Aug. 29, 2018, 15 pages.
Notice of Allowance from U.S. Appl. No. 15/277,937, dated Sep. 12, 2018, 17 pages.

\* cited by examiner

DETERMINE, BASED ON THE FFT OF THE SET OF POINTS, A FIRST ORIENTATION AND A FIRST DISTANCE BETWEEN ADJACENT DOTS OF CHARACTERS ALONG THE FIRST ORIENTATION, AND A SECOND ORIENTATION AND A SECOND DISTANCE BETWEEN ADJACENT DOTS OF THE CHARACTERS ALONG THE SECOND ORIENTATION
920

APPLY A PASS BAND FILTER TO THE FFT OF THE SET OF POINTS
1115

IDENTIFY FROM THE [FILTERED] FFT OF THE SET OF POINTS, A SET OF TWO FFT POINTS THAT SATISFY SELECTION CRITERIA
1120

THE SELECTION CRITERIA INCLUDE AT LEAST ONE OF THE FOLLOWING CRITERIA: EACH FFT POINT IS WITHIN THE RANGE OF 0 AND 180 DEGREES, EACH FFT POINT HAS A HIGH INTENSITY VALUE, THE TWO FFT POINTS ARE AT LEAST D DEGREES APART, WHERE D IS A PREDETERMINED VALUE.
1125

FIGURE 11

METHOD AND APPARATUS FOR TRANSFORMATION OF DOT TEXT IN AN IMAGE INTO STROKED CHARACTERS BASED ON DOT PITCHES

FIELD

Embodiments of the invention relate to the field of image processing, and more specifically, to the transformation of dot text in an image into stroked characters based on dot pitches.

BACKGROUND

Optical character recognition (OCR) consists of recognizing a string of characters in an image and returning a corresponding string of characters (e.g., in text form). OCR has a wide range of applications including the recognition of vehicle license plate numbers (e.g., for use in automated traffic law enforcement, surveillance, access control, tolls, etc.), the recognition of serial numbers on parts in an automated manufacturing environment, the recognition of labels on packages (e.g., pharmaceutical packaging, food and beverage packaging, household and personal products packaging, etc.), and various document analysis applications.

Various types of applications and scenes include images with dot text in which characters of a string are comprised of a set of dots. The expiration date of foods and medicines, the product number of goods, and advertisement lamp boxes with LEDs are examples of images and scenes that would include dot text. Optical character recognition of dot text has several challenges as it involves reading dot text in images with non-uniform dot spacing, deformed, skewed and touching characters, rotated text strings, varying contrast, uneven backgrounds and/or other anomalies.

BRIEF DESCRIPTION OF THE DRAWINGS

The invention may best be understood by referring to the following description and accompanying drawings that are used to illustrate embodiments of the invention. In the drawings:

FIG. 11 illustrates a flow diagram of exemplary detailed operations for determining the orientations and dot pitches of characters in an image in accordance with some embodiments.

DESCRIPTION OF EMBODIMENTS

Figure 1:
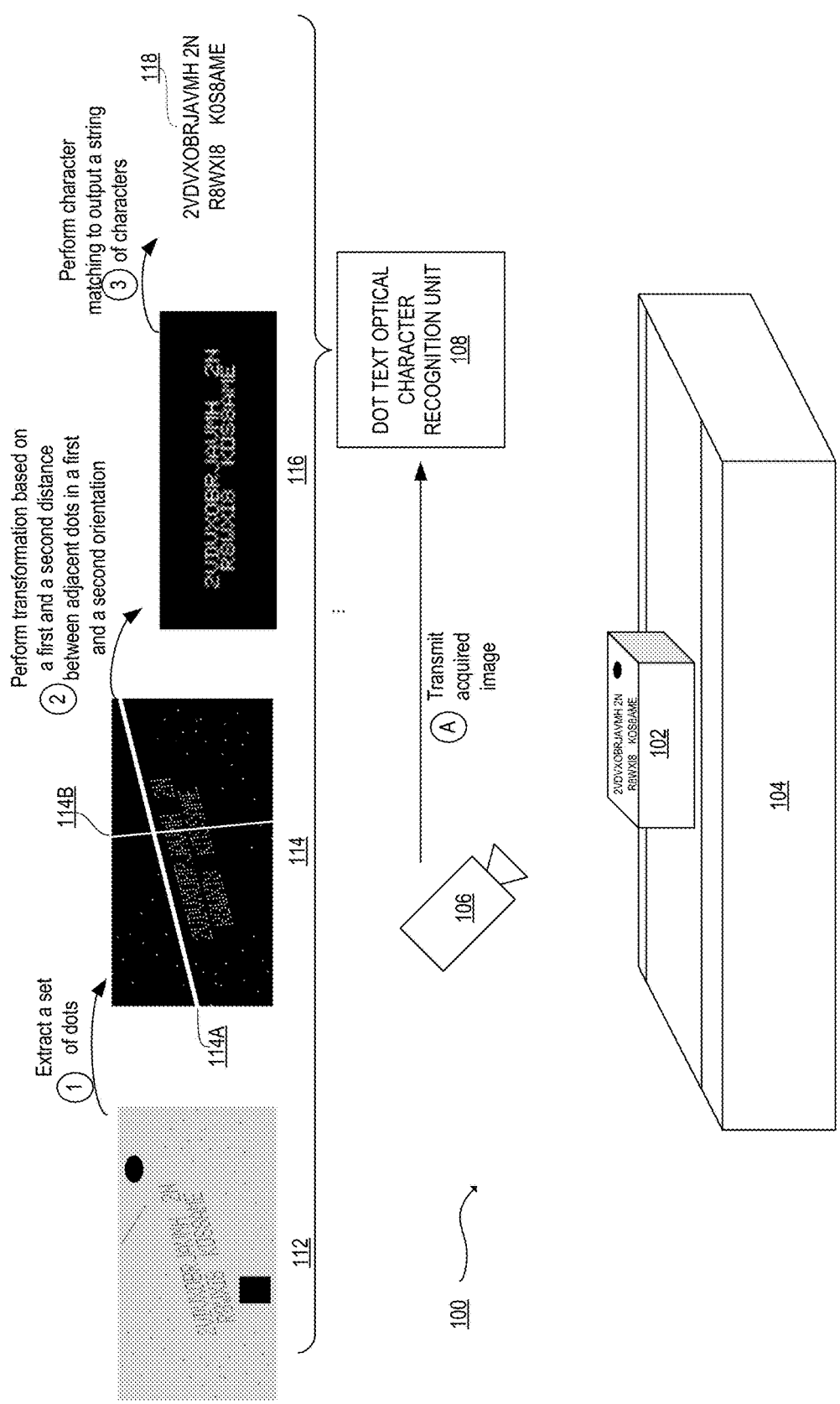
FIG. 1 illustrates a block diagram of an exemplary dot text optical character recognition system in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Existing solutions for optical character recognition of dot text are limited. Some standard approaches involve extensive case-specific image pre-processing. Some approaches use morphological operations to fill the gap between dots of characters in order to enable character matching operations. However, these techniques highly depend on the number of iterations of the morphological operations performed on the image as few iterations will not enable the gap between the dots of characters to be filled, while too many operations will introduce blobs and result in connected characters. Further these approaches are sensitive to a difference in dot pitches (i.e., distance between adjacent dots in a character), as well as being sensitive to variations in gaps between characters, and to the angle of the string of characters. Furthermore, the morphological operations are anisotropic operations such that angled text needs to be corrected prior to performing the morphological operations to fill the gap between the dots.

Other approaches use a character fill method, in which the characters are segmented prior to filling the gaps between the dots with pixel shift operations. In these approaches, segmentation is needed between the foreground and the background, line segmentation as well as character segmentation requiring significant pre-processing of the image prior to filling the gaps between the dots and matching the characters.

Character Recognition of Dot Text in an Image:

The embodiments of the present invention overcome the limitations of the prior approaches and enable a robust and accurate optical character recognition of dot text in an image. The embodiments of the present invention present methods and apparatuses that do not require character or string segmentation prior to performing character matching, they are robust to dot pitch variations. A set of dots are extracted from an image, based on dot selection criteria. A transformation is performed on the set of dots based on a first candidate distance between adjacent dots along a first orientation and on a second candidate distance between adjacent dots along a second orientation to obtain a transformed image including stroked characters. A model based character matching is then performed on the transformed image to output a candidate string of characters.

FIG. 1 illustrates a block diagram of an exemplary dot text optical character recognition system 100 in accordance with some embodiments. The system 100 includes an image acquisition device 106 (such as a digital camera) that is operative to acquire one or more images of an object 102 in a scene. For example, the object 102 may be a product on a conveyor system 104 of a manufacture. The image is transmitted to the dot text optical character recognition unit 108 to be analyzed. The dot text optical character recognition unit 108 is operative to read and recognize dot text from the acquired image. The dot text optical character recognition unit 108 is implemented on an electronic device according to various embodiments as will be described in further details with reference to FIG. 24. While FIG. 1 illustrates a scene of a product inspection scenario in a manufacturing environment, the embodiments of the present invention are not limited to these types of use cases. For example, the invention can be used to recognize and read text in images from natural scenes or any other application that uses images including dot text.

At operation (A), an image is transmitted to the dot text optical character recognition unit 108 to be processed. The image can be a grayscale image (e.g., image 112), in which each pixel of the image has an intensity value within a given range (e.g., between 0 and 255 when the pixel intensity is represented with 8 bits; between 0 and 65535 when the pixel intensity is represented with 16 bits; or other ranges when the pixel intensity is represented with a different number of bits). In the following description, an intensity value of 0 will indicate a black pixel while the maximum value (e.g., 255, 65535 or other) will indicate a white pixel, any other value within the minimum and the maximum value is a shade of grey. While image 112 appears to include white pixels, black pixels and grey pixels of a single shade of grey, other input images will typically include pixels with varying shades of grey. In some embodiments, the acquired image can be a color image (e.g., RGB). In some embodiments a color image can be converted into a grayscale image prior to performing the operations of the character recognition.

At operation (1), the dot text optical character recognition unit 108 extracts a set of dots from the grayscale image 112. Each dot extracted from the image satisfies a dot selection criteria. The dot selection criteria include a predetermined size and shape of the dot. In some embodiments, the selection criteria may include additional criteria such as a predetermined contrast of the dot, a predetermined intensity value, a predetermined color, and any other criterion that uniquely defines dots of characters within the image. In FIG. 1, the extracted set of dots is represented as the binary image 114 including background pixels with a background intensity value (black) and foreground pixels with a foreground intensity value (white), where a set of multiple connected foreground pixels represent a dot.

Each dot $d_i$ is associated with a weight ($w_i$). The weight ($w_i$) of a dot $d_i$ is a measure indicative of the presence of a dot at a given position. In some embodiments, each pixel forming the dot can be associated with a corresponding weight that is a measure of the presence of a dot at the position of the pixel. In some embodiments, pixels which are part of the same dot can have the same weight (such as the intensity value of all the pixels forming the dot is the same in the image 114). For example a highest weight determined within the group of pixels can be associated with all the pixels. In other embodiments, each pixel of a dot may be associated with a respective weight indicative of the presence of a dot at that position that may be different from a pixel to another in the same dot. In some embodiments the weight is a foreground intensity value (white). In another embodiment, the weight is a grey intensity value within a range of grayscale intensities. In these embodiments, the image representing the set of dots is a grayscale image and each pixel that is part of a dot in the image has the weight of the pixel as its intensity value. In contrast, pixels that are not part of any dots are associated with a background intensity value (e.g., black). In some embodiments, the weight is a result of a second order derivative filter applied to the grayscale image 112 that highlights all structures within the grayscale image 112 that correspond to a dot of a given size and shape. In other embodiments, when the dot to be detected is a circle, the weight can be a measure indicative of the roundness/compactness of the dot and its diameter. More generally, the weight can be a measure indicative of the shape of the dot with respect to a model dot that forms characters.

While FIG. 1 illustrates the extracted set of dots as an image (e.g., image 114), in other embodiments, the extracted set of dots can be stored in the dot text optical character recognition unit as a list of positions $(x_i, y_i)$. In one embodiment, each dot $d_i$ is stored with a single position $(x_i, y_i)$ (determined with respect to a coordinate system of the image 112). The single positions can be a position of a pixel that is part of the dot (e.g., a center of the dot, a top-left pixel of the dot, or any other pixel within the dot). In other embodiments, each dot $d_i$ is associated with multiple positions $\{(x_i, y_i), \ldots, (x_n, y_n)\}$ that represent the set of pixels $P_n$ that form the dot.

At operation (2), a transformation is performed on the extracted set of dots based on a first candidate distance between adjacent dots along a first orientation and based on a second candidate distance between adjacent dots along a second orientation to obtain a transformed image (e.g., image 116) including stroked characters. Image 114 includes a first orientation illustrated as the axis 114A (which will be referred to herein as orientation 114A) along which the dots have a first associated dot pitch (i.e., a distance between two adjacent dots) and a second orientation illustrated as the axis 114B (which will be referred to herein as orientation 114B) along which the dots have a second associated dot pitch (i.e., a second distance between two adjacent dots). The first dot pitch along the first orientation 114A and the second dot pitch along the second orientation 114B are used to perform a transformation on the set of extracted dots to obtain an image with stoked characters, image 116. Once the transformed image 116 is obtained, the dot text optical character recognition unit performs, at operation (3), character matching and outputs a string of characters. In the example presented in FIG. 1, the string of characters 118:

2VDVXOBRJAVMH 2N
R8WXI8 K0S8AME
is obtained.

Figure 2A:
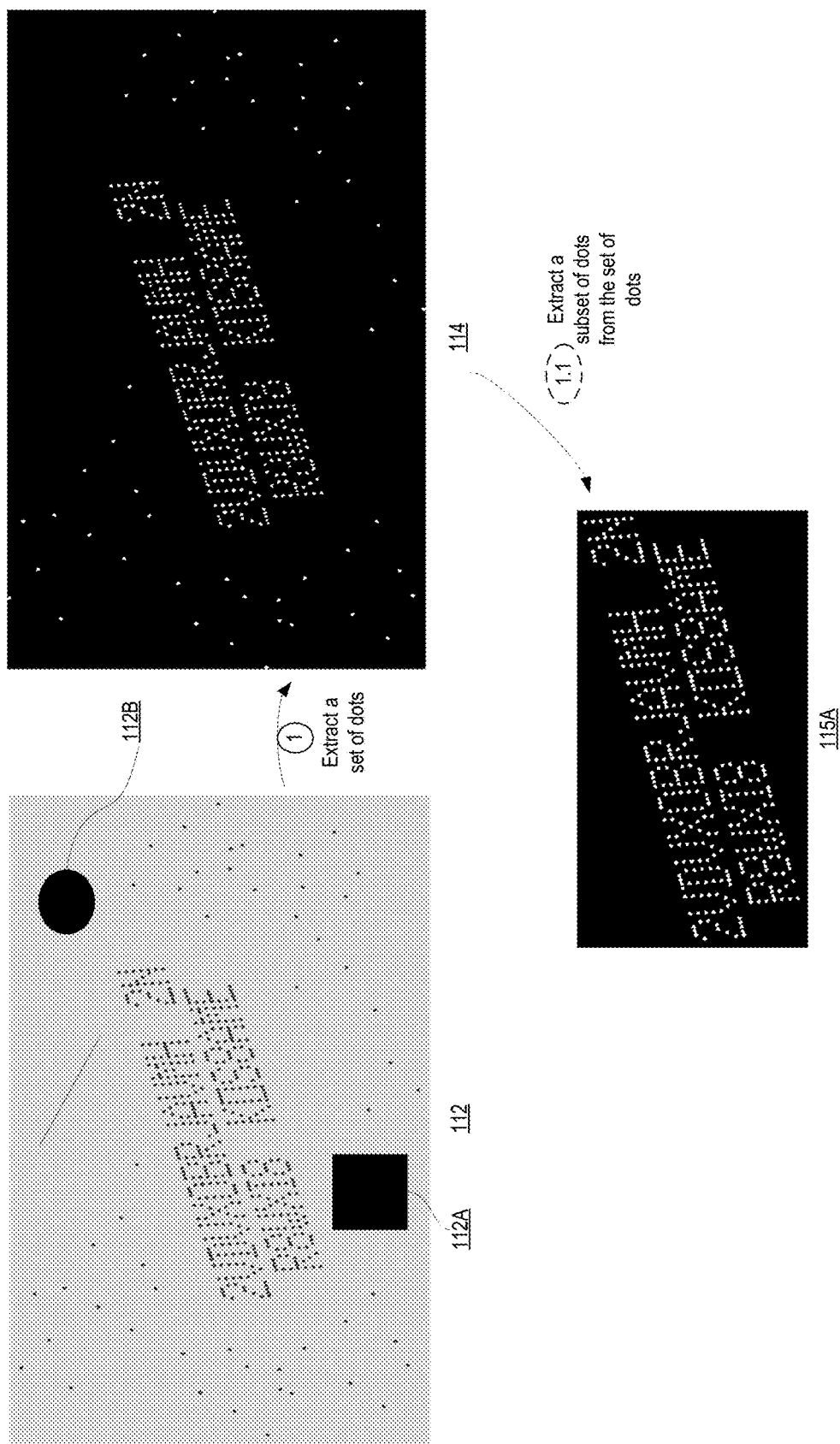
FIG. 2A illustrates exemplary detailed operations for optical character recognition of dot text in accordance with some embodiments.
Figure 2B:
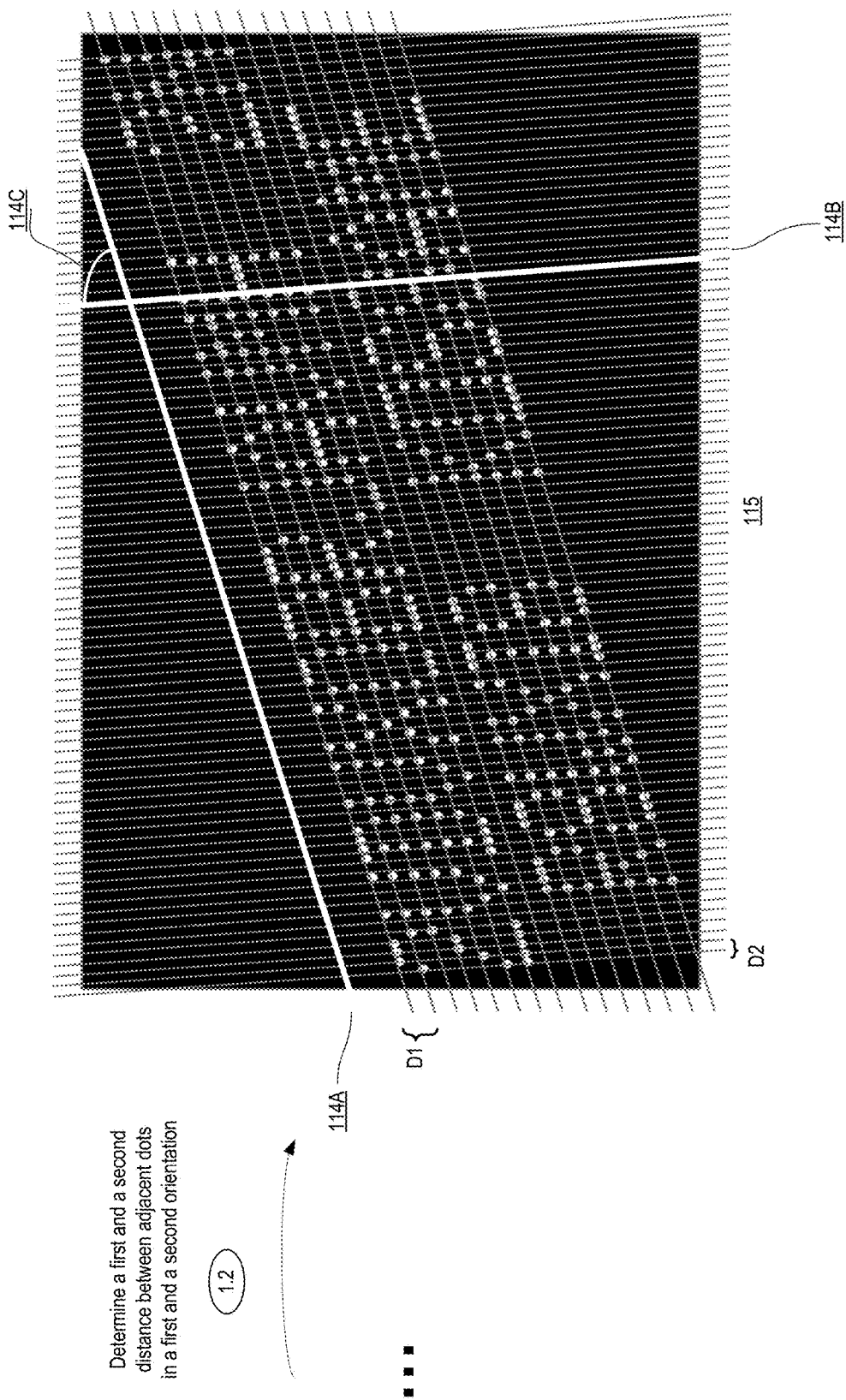
FIG. 2B illustrates an exemplary image resulting from a detection of a first distance and a second distance along a first and a second orientation between adjacent dots according to some embodiments.
Figure 2C:
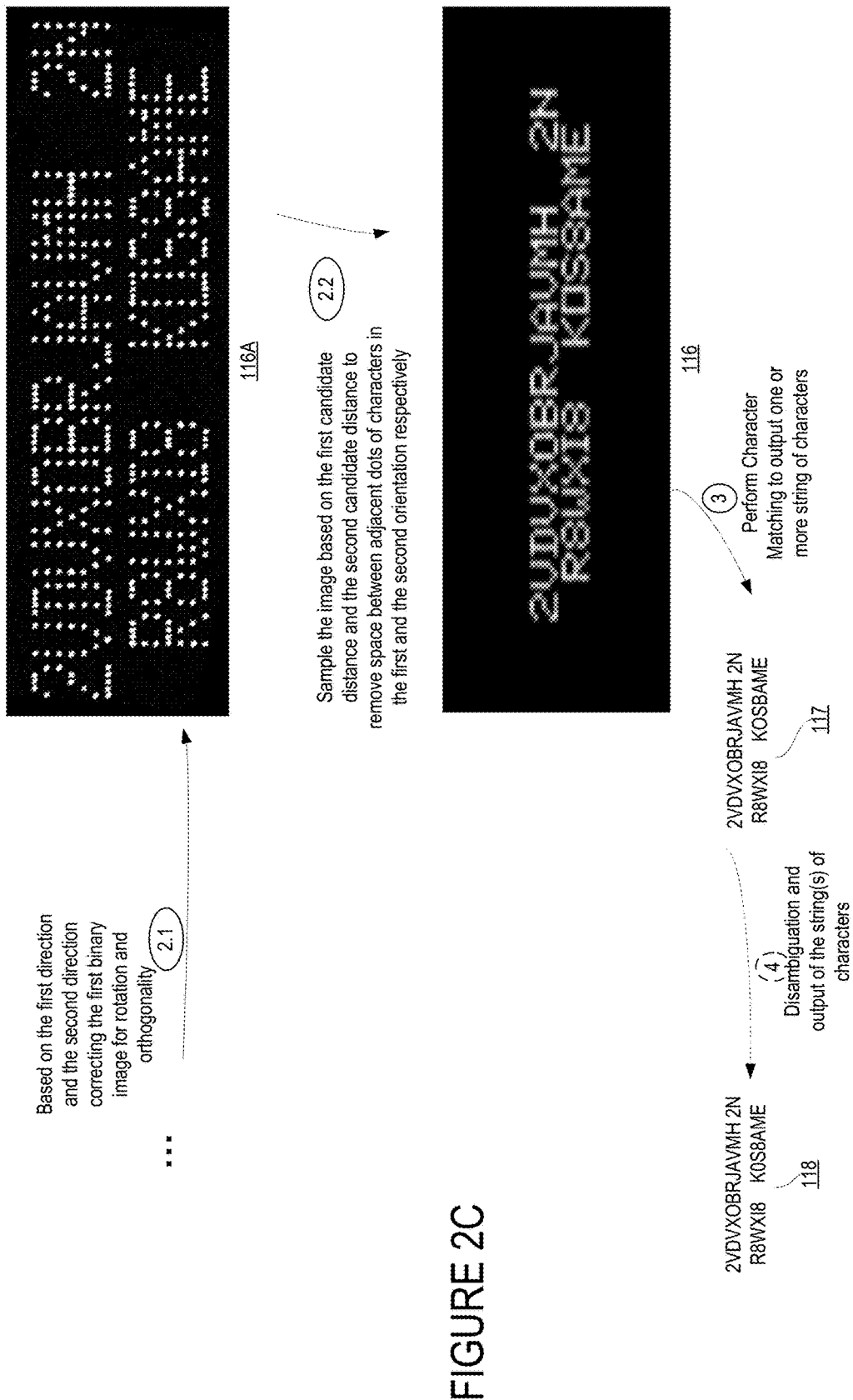
FIG. 2C illustrates exemplary detailed operations for optical character recognition of dot text in accordance with some embodiments.

FIGS. 2A-C illustrate exemplary detailed operations for optical character recognition of dot text in accordance with some embodiments. Throughout the following description similar reference numerals have been used to denote similar elements such as components, features of a system and/or operations performed in a system or element of the system, when applicable.

At operation (1), the dot text optical character recognition unit 108 extracts a set of dots from the grayscale image 112. Each dot extracted from the image satisfies a dot selection criteria. The dot selection criteria include a predetermined size and shape of the dot. In some embodiments, the predetermined size and shape of a dot can be expressed in terms of the area and the elongation of a dot, where the area represents the number of pixels forming the dot and the elongation is a ratio of the length versus the breadth of a dot. In some embodiments, the selection criteria may include additional criteria such as a predetermined contrast of the dot, a predetermined intensity value, a predetermined color, and any other criterion that uniquely defines dots of characters within an image. In a non-limiting example, the selection criteria are input by a user and define the dots to be extracted. For example, a user may be prompted through a user interface to enter a desired shape of the dots, a desired color, a desired size, a desired intensity value, as well as a desired contrast of a dot with respect to the background surrounding the dot, etc. In other embodiments, the dot text optical character recognition unit 108 can be preconfigured with the selection criteria and the user is not needed to input any criterion. Alternatively, the user may be prompted to enter some of the selection criteria, while others are preconfigured (for example, the system may be preconfigured to detect dots of circular shape, while enabling a user to enter the size of the dots by specifying a predetermined diameter).

In some embodiments, the shape of the dot may be a circle and the size of the dot is expressed in terms of the diameter of the circle in pixels (e.g., 7 pixels, 14 pixels, or any number N of pixels). For example, the dot is part of a dot matrix representing strings of characters printed by an impact printer. The present invention further applies to alternative embodiments, in which the shape of the dot is other than a circle (for example, a dot may be an ellipse and the size of the dot is expressed in terms of the semiminor axis and the semimajor axis of the ellipse in pixels; or any other shape of a blob (where the blob is comprised of connected pixels with similar or constant properties (e.g., similar intensities)).

Thus at operation (1), the dot text optical character recognition unit 108 extracts all blobs (i.e., connected sets of pixels with similar or constant properties) within the image 112 that have the predetermined size and shape. All other blobs within the image (e.g., 112A and 112B) which either have a different size (such as blob 112B) or a different shape (such as blob 112A) are discarded. In one embodiment, the detection of the dots is performed according to the operations described with reference to FIG. 5.

Figure 5:
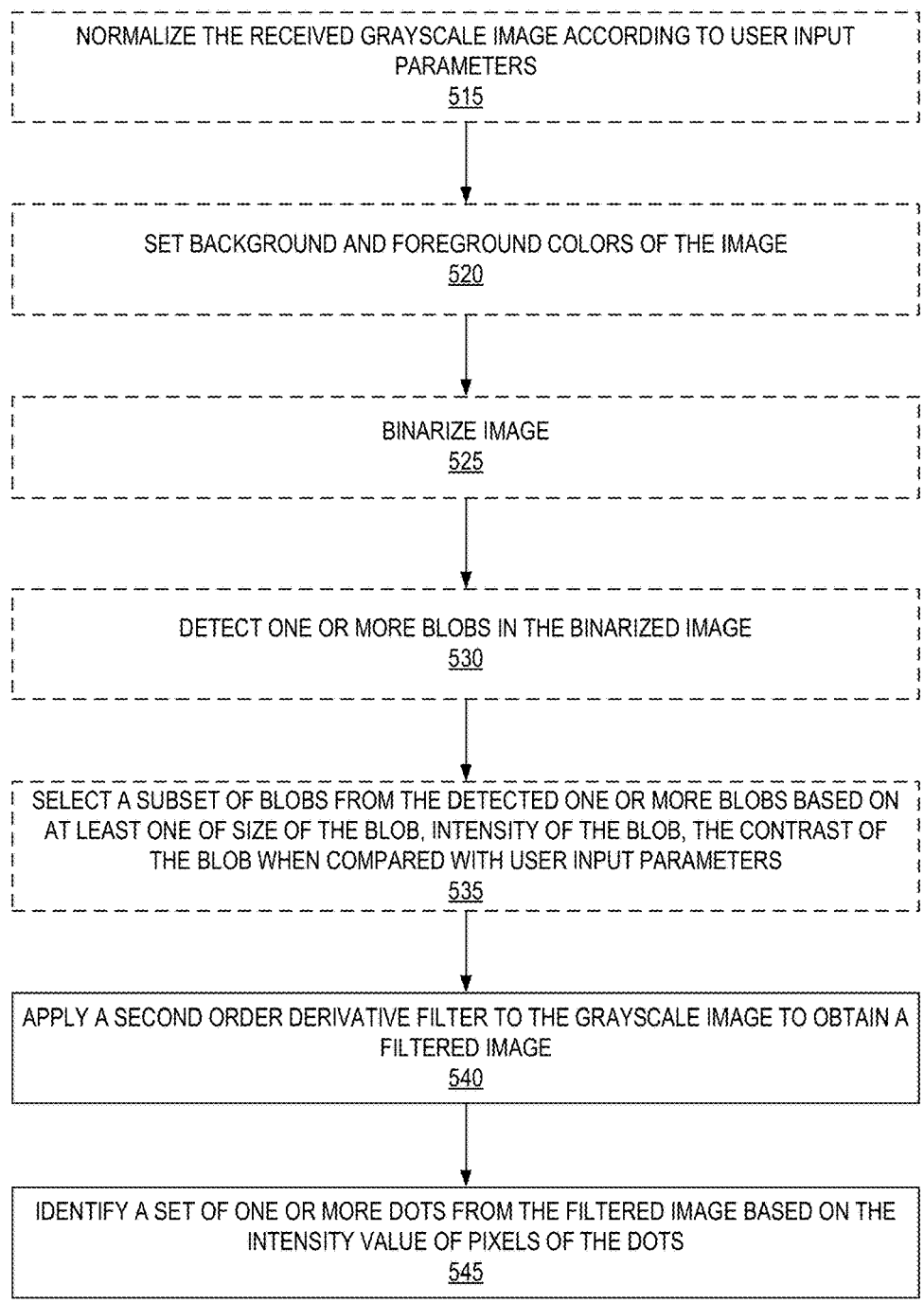
FIG. 5 illustrates a flow diagram of detailed operations for extraction of one or more dots that satisfy dot selection criteria according to some embodiments.

FIG. 5 illustrates detailed operations for extraction of one or more dots that satisfy dot selection criteria according to some embodiments. At operation 540 a second order derivative filter is applied to the grayscale image 112 to obtain a filtered image in which foreground connected sets of pixels that have characteristics of a dot (e.g., the predetermined shape and the predetermined size of a dot) are highlighted while portions of the image that do not have these characteristics are converted into pixels of background intensities. In some embodiments, the filter is used to bring out dots with a shape of a circle of diameter N (e.g., N=7 pixels, N=15 pixels, or any other value). For example, the filter can be a Laplacian filter, or another second order derivative filter which can be implemented as a Finite Impulse Response (FIR) filter, or an Infinite Impulse Response (IIR) filter. In other embodiments, other types of filters may be used.

The flow of operations then moves to operation 545, at which a set of one or more dots is identified from the filtered image based on the intensity values of the pixels of the dots. The identification of the set of dots includes determining a position of local maxima of an intensity profile of the filtered image, where the position of each local maxima represent the location of a dot within the image.

In some embodiments, the set of dots, identified at operation 545, is used to generate a binary image 114 (or mask) in which each dot is represented with foreground pixels (white pixels) and any other portion of the original image which is not a dot is represented with background pixels (black pixels). In some embodiments, each dot $d_i$ is associated with the weight $(w_i)$. The weight $(w_i)$ of a dot $d_i$ is a measure indicative of the presence of a dot. In some embodiments, each pixel forming the dot can be associated with a corresponding weight and the dot is then associated with the multiple positions of the pixels and their associated weights. The weight is determined based on the second order derivative filter applied to the grayscale image 112. For example, the weight is an intensity value resulting from the application of the filter to the image 112. For example, the weight can be a sum of all intensity values in the filtered image of the foreground pixels forming the dot. In some embodiments, the weight can be a function of the intensity value in the filtered image of the position of the local maxima pixel at which the dot was detected.

In some embodiments, the detection of dots described with respect to operations 540 and 545 can be preceded by one or more optional operations 515-535. At operation 515, the received grayscale image 112 is normalized according to user input parameters. This operation is performed in some embodiments, where the operations for detecting the dots are configured to detect dots of a default size while the user inputs a predetermined size that is different from the default size. For example, the user inputs a predetermined size M=14 pixels of dots to be detected, while the operations of the dot text optical character recognition unit 108 are preconfigured to detect dots of size N=7 pixels. In these embodiments, the acquired image 112 is resized to enable detection of dots of size 7 pixels. For example, the image 112 can be sampled to a normalized image reduced in size. The second order derivative filter is then applied (operation 540) to the normalized image instead of the original grayscale image.

At operation 520, background and foreground colors of the received image are set. This operation is performed in some embodiments, in which the operations for detecting the dots are configured to detect dots of a default color (e.g., the dots to be extracted are expected to be white while the background pixels are expected to be black or alternatively). In these embodiments, the user may specify whether the dots in the captured image 112 are of the default foreground color or not. For example, in the illustrated exemplary acquired image 112, the dots are black while the background is grey. Therefore, at operation 520 the colors of the pixels are inverted such as the dots are white. In other embodiments, the operations for detecting the dots are configured to detect black dots with a white background; in that case, the operation 520 is skipped and no color conversion is performed when the default color is black.

At operation 525, the image is binarized. In some embodiments, the original acquired image 112 is binarized. In other embodiments, the normalized image obtained following operations 515 and 520 is binarized. For example, a Niblack Thresholding algorithm can be used for image binarization. Other binarization mechanisms can be used without departing from the scope of the present invention. Flow then moves to operation 530 at which one or more blobs are detected from the binarized image. As mentioned above, a blob consists of a group of connected pixels. Whether or not two pixels are connected is defined by the connectivity, that is, which pixels are neighbors and which are not. The two most often applied types of connectivity are a 4-connectivity or an 8-connectivity. Various mechanisms (referred to as connected component analysis or connected component labeling) can be used for finding the blobs in the binarized image. In some embodiments, a 4-connectivity blob analysis is performed to extract all blobs in the binarized image.

Flow then moves to operation 535 at which a subset of blobs from the detected one or more blobs are selected based on any one or a combination of the size of the blob, the intensity of the blob, and the contrast of the blob. In some embodiments, a user may input a range of acceptable sizes, ranges of intensities and contrasts that a dot can have to be selected. In some embodiments, these ranges are pre-configured in the dot text optical character recognition unit 108 with default ranges. Thus, once the blobs are extracted from the binary image, a selection of blobs is performed based on their size. In some embodiments, all blobs within a given default range are selected while blobs that do not fit within the default range are discarded. For example, all blobs that have a size smaller than a predetermined minimum threshold size of a dot are discarded. Similarly, all blobs with a size greater than a predetermined maximum threshold size of a dot are discarded. In some embodiments, the selection of the blobs is further performed based on an intensity of the pixels forming the blob. For example, if the average intensity value of the pixels within a blob is greater than a first maximum threshold $T_1$ or alternatively smaller than a second minimum threshold $T_2$, the blob is discarded. In some embodiments, the selection of the blobs is further performed based on a contrast of the blob with respect to the neighboring background pixels of the blob. In these embodiments, a blob is selected if its associated contrast is within a range of acceptable contrast values. While in some embodiments, the selection of the blobs is performed based on a single criterion (size, intensity, or contrast), in other embodiments a combination of two or more criteria can be used to select a subset of the blobs. Additional criteria can be used to select the blob without departing from the scope of the present invention.

In some embodiments, the selected blobs are used at operation 540. A mask (binary image) is generated based on the selected blobs, and the second order derivative filter is applied to pixels of the grayscale image 112 that correspond to the selected blobs in the mask. This enables the filtering operation to be performed more efficiently as only a subportion of the original grayscale image is filtered. For example, by performing the blob selection, blobs 112A and 112B are discarded prior to the application of the second order derivative filter.

Referring back to operation (1) of FIG. 2A, in some embodiments, the dot text optical character recognition unit 108 extracts dots from an image according to the embodiments described with reference to FIGS. 18A-23. In other embodiments, other mechanisms can be used to extract the dots from the image 112 without departing from the spirit or scope of the present invention. For example, differential methods based on derivatives of the intensity of the pixels with respect to the position of the pixels can be used to detect dots. Methods such as Laplacian of the Gaussian can be used.

Referring back to FIG. 2A, once the set of dots that satisfy the selection criteria (size, color, contrast and intensity values, etc.) are extracted, a subset of the dots is selected at operation (1.1). For example, a region of interest is extracted within the image 114 resulting in image 115A. The selection of the subset of dots is performed based on a dot text location mechanism in which the dot text is located within the image 114. In some embodiments, this operation is performed based on the operations described with respect to FIGS. 12-17. Other mechanisms can be used to locate the dot text within the image without departing from the scope of the present invention. In some embodiments, a convolution of a bounding box (having the predetermined dimensions) with the image 114 can be performed. In this approach, the position in the image where the result of the convolution is the largest is selected as a position of the dot text. In these embodiments, the orientation of the bounding box can be determined by performing rotations of the image 114. Other approaches can be used to locate the dot text within the image. In some embodiments, the operation (1.1) is optional and may be skipped such as the following operations are performed based on the set of dots extracted at operation (1) instead of the subset of dots selected at operation (1.1). In other embodiments, this operation is not skipped and the following operations are performed based on the selected subset of dots.

FIG. 2B illustrates an exemplary image resulting from a detection of a first distance and a second distance along a first and a second orientation between adjacent dots according to some embodiments. Flow moves from operation (1.1) of FIG. 2A (or alternatively from operation (1) when operation (1.1) is skipped) to operation (1.2) of FIG. 2B, at which a first distance between adjacent dots in a first orientation and a second distance between adjacent dots in a second orientation are determined. Dot text (be it dot matrix printed text, or other type of text in which characters are formed of dots) is structured along two orientations. In some embodiments, for example in dot matrix printed text use cases, the dot text is printed according to two orientations that are orthogonal and may be referred to as a vertical and a horizontal orientation. Further, the distance between two adjacent dots within the same character and along a given orientation is referred to as the dot pitch. The dot pitch along the first orientation (e.g., the vertical dot pitch) can be different or equal to the dot pitch along the second orientation (e.g., the horizontal dot pitch). The dot pitch along a given orientation is substantially the same from a character to another character.

In the acquired image 112, the orientations of the dot text represented by the axis 114A and 114B are not orthogonal and have an angle 114C between the two axes. While the dot text may have been printed with the same orthogonal orientations in different objects, images of the different objects may include varying angles between the two dot pitch orientations that depend on the position of the object when the image is acquired, as well as the position and setup of the camera acquiring the image. The embodiments of the present invention are operative to determine the dot pitches (D1 and D2) along two orientations (114A, 114B) in varying environment and orientation scenarios. In some embodiments, the determination of the dot pitches and the corresponding orientations is performed according to the embodiments described in further details below with respect to FIGS. 6-11. Other mechanisms can be used to detect the orientations and dot pitches of characters in an image without departing from the scope of the present invention. For example, a Radon transform can be used to determine orientations of the dots. A projection of the dots on the determined orientations enables the determination of the dot pitches in each orientation.

Once the orientations 114A and 114B are determined, the flow of operations moves to operation (2.1) of FIG. 2C at which the set of extracted dots is corrected for rotation and orthogonality. A transformation (e.g., a polynomial warp) is applied to the dots such that the first orientation and the second orientation are orthogonal to one another and oriented horizontally and vertically. FIG. 116A illustrates a binary image resulting from the application of a transformation correcting the set of extracted dots (in images 114-115) for orthogonality and rotation.

Flow then moves to operation (2.2), at which the binary image including the set of dots is sampled based on the first candidate distance and the second candidate distance to remove space between adjacent dots of characters in the first and the second orientation respectively. While this operation is described with respect to the binary image, the sampling can be performed on the set of dots as represented with their respective positions. Once the transformed image 116 is obtained, the dot text optical character recognition unit 108 performs, at operation (3), character matching and outputs a string of characters. In the example presented in FIG. 2C, the string 117

2VDVXOBRJAVMH 2N
R8WXI8 KOSBAME
is obtained.

Several mechanisms can be used to match characters in the image 116. For example, a matching mechanism based on a correlation between model characters and the image 116 can be used. The model characters may be input by the user which identifies a font and size of expected characters. In other embodiments, a user may identify only a font of the characters to be recognized, while the matching mechanism is operative to correlate varying sizes of characters within the image 116. In other embodiments, a character classifier (e.g., neural network classifier or other types of classifier) can be used. As will be appreciated by one skilled in the art, various mechanisms can be used to match characters within the image 116. The results of the character matching mechanisms are significantly improved by the use of the image 116 instead of the original grayscale image received from the acquisition device to identify the characters.

The embodiments of the present invention enable the processing of an image including dot text as received from an acquisition device to be processed such as dot text is converted into text of stroked characters consequently enabling an efficient and accurate detection and matching of characters within the image. Thus, contrary to prior character recognition methods of dot text, which required segmentation of characters or extensive application specific preprocessing, the present embodiments enable an efficient and accurate character recognition method based on a transformation of the acquired image according to dot pitches of the characters in a first and a second orientation.

Referring back to FIG. 2C, in some embodiments, following the character matching operation (3), a disambiguation operation (4) may be performed to obtain a more accurate string of characters. This operation is optional and in some embodiments is not performed. In the illustrated example, the character matching operation outputs the string KOSBAME while the string to be recognized (in the image 116) is K0S8ME. Thus in this example, the number 0 is recognized as the letter O and the number 8 is recognized as a letter B. As will be appreciated by one skilled in the art, various mechanisms can be used to further verify the results of the character matching mechanism and obtain the corrected string of characters K0S8ME. While the illustrated example shows that the string of characters obtained following the character matching operation (3) includes inaccurately detected characters, this is intended to be exemplary only, and in some embodiments the output string is accurately read.

The operations in the following flow diagrams of FIGS. 3 and 4 will be described with reference to the system of FIG. 1 and the exemplary images of FIGS. 2A-C. However, it should be understood that the operations in these figures can be performed by embodiments of the invention other than those discussed with reference to FIG. 1 and FIGS. 2A-C, and the embodiments of the invention discussed with reference to the system of FIG. 1 can perform operations different than those discussed with reference to FIGS. 3 and 4.

Figure 3:
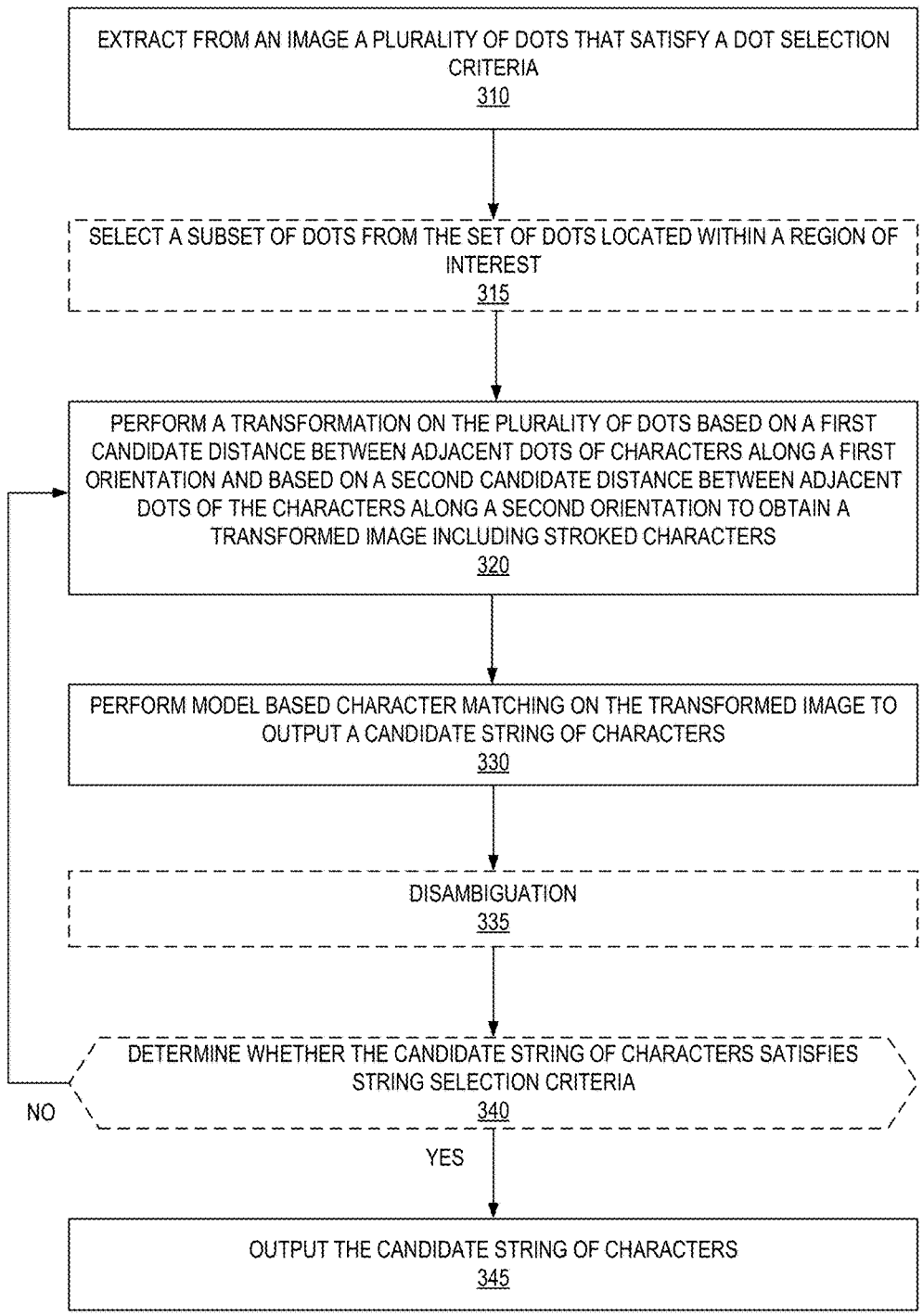
FIG. 3 illustrates a flow diagram of exemplary operations for optical character recognition of dot text in accordance with some embodiments.
Figure 4:
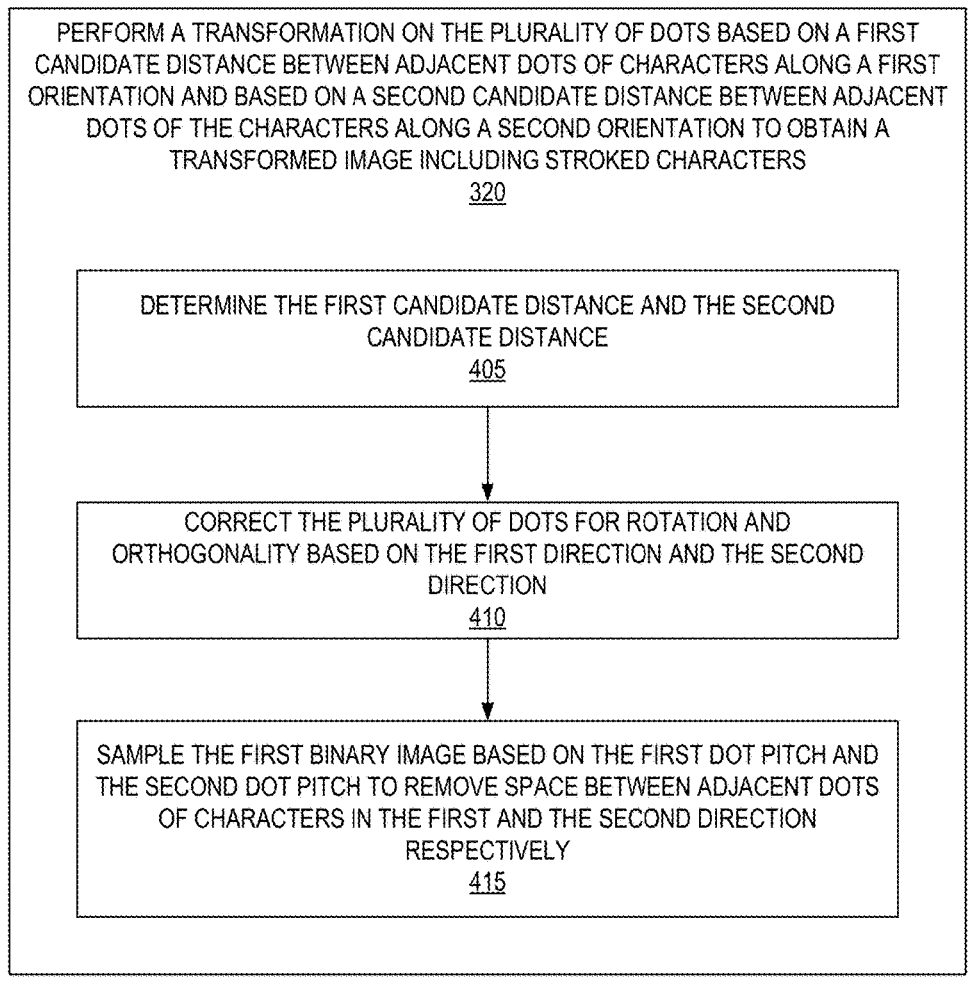
FIG. 4 illustrates a flow diagram of exemplary operations for transformation of a dot text image into an image of stroked characters in accordance with some embodiments.

FIG. 3 illustrates exemplary operations for optical character recognition of dot text in accordance with some embodiments. At operation 310, the dot text optical character recognition unit 108 extracts, based on dot selection criteria, a set of dots from an image. A dot is a blob (i.e., connected set of pixels) with a given shape and size. Each dot extracted at operation 310 is associated with a position and a measure indicative of the presence of a dot at that position. The dot selection criteria include a predetermined size and shape of the dot. In some embodiments, the predetermined size and shape of a dot can be expressed in terms of the area and the elongation of a dot. In some embodiments, the selection criteria may include additional criteria such as a predetermined contrast of the dot, a predetermined intensity value, a predetermined color, and any other criterion that uniquely defines dots of characters within an image. In a non-limiting example, the selection criteria are input by a user and define the dots to be extracted. For example, a user may be prompted through a user interface to enter a desired shape of the dots, a desired color, a desired size, a desired intensity value, as well as a desired contrast of a dot with respect to the background surrounding the dot, etc. In other embodiments, the dot text optical character recognition unit 108 can be preconfigured with the selection criteria and the user is not needed to enter any input. Alternatively, the user may be prompted to enter some of the selection criteria, while others are preconfigured (for example, the system may be preconfigured to detect dots of circular shape, while enabling a user to enter the size of the dots by specifying a predetermined diameter).

Thus at operation 310, the dot text optical character recognition unit 108 extracts all blobs (within the image 112) that have the predetermined size and shape. All other blobs within the image (e.g., 112A and 112B) which either have a different size (such as circle 112B) or a different shape (such as object 112A) are discarded. In one embodiment, the detection of the dots is performed according to the operations described with reference to FIG. 5. In other embodiments, the dot text optical character recognition unit 108 extracts dots from an image according to the embodiments described with reference to FIGS. 18A-23. Other mechanisms can be used to extract the dots from the image 112 without departing from the spirit or scope of the present invention. For example, differential methods based on derivatives of the intensity of the pixels with respect to the position of the pixels can be used to detect dots (such as Laplacian of the Gaussian).

Once the set of dots that satisfy the selection criteria (size, color, contrast and intensity values, etc.) has been extracted, a subset of the dots is selected at operation 315. For example, as illustrated in image 115A, a region of interest including the subset of dots is extracted within the image 114 resulting in image 115A. The selection of the subset of dots is performed based on a dot text location mechanism in which the string of characters is located within the image 114. In some embodiments, this operation is performed based on the operations describe with respect to FIGS. 12-17. Other mechanisms can be used to locate the dot text within the image without departing from the scope of the present invention. In some embodiments, a convolution of a bounding box (having the predetermined dimensions) with the image 114 can be performed. In this approach, the position in the image where the result of the convolution is the largest, is selected as a position of the dot text. In these embodiments, the orientation of the bounding box can be determined by performing rotations of the image 114. Other approaches can be used to locate the dot text within the image, for example, an analysis of the pixels' texture based on co-occurrence matrices can be performed. In some embodiments, the operation 315 is optional and may be skipped such as the following operations are performed based on the set of dots extracted at operation 310 instead of the subset of dots selected at operation 315. In other embodiments, this operation is not skipped and the following operations (320 and 330) are performed based on the selected subset of dots.

Flow then moves to operation 320, at which the dot text optical character recognition unit 108 performs a transformation on the plurality of dots based on a first candidate distance between adjacent dots of characters along a first orientation and a second candidate distance between adjacent dots of the characters along a second orientation. A transformed image (e.g., image 116) is obtained as a result of the transformation including stroked characters.

In some embodiments, the operation 320 includes operations described with reference to FIG. 4. FIG. 4 illustrates exemplary operations for transformation of a dot text image into an image of stroked characters in accordance with some embodiments. At operation 405 the first candidate distance and the second candidate distance are determined. In some embodiments, the determination of the first candidate distance, the second candidate distance and their corresponding orientations is performed according to the embodiments described in further details below with respect to FIGS. 6-11. Other mechanisms can be used to detect the orientations and dot pitches of characters in an image without departing from the scope of the present invention. For example, a Radon transform can be used to determine orientations of the dots. A projection of the dots on the determined orientations enables the determination of the dot pitches in each orientation.

The flow of operations moves to operation 410 at which the set of extracted dots is corrected for rotation and orthogonality based on the first direction and the second direction of the first and second dot pitch respectively. FIG. 2C illustrates a binary image 116A resulting from the application of a transformation (e.g., a warp) correcting the set of extracted dots (in images 114-115) for orthogonality and rotation. Flow then moves to operation 415, at which the binary image including the set of dots is sampled based on the first candidate distance (first dot pitch) and the second candidate distance (second dot pitch) to remove space between adjacent dots of characters in the first and the second orientation respectively.

Referring back to FIG. 3, flow moves from operation 320 to operation 330, at which model based character matching is performed on the transformed image 116. Several mechanisms can be used to match characters in the image 116 and to output a candidate string of characters (e.g., string 117 or string 118). For example, a matching mechanism based on a correlation between model characters and the image 116 can be used. In other embodiments, a character classifier (e.g., neural network classifier or other types of classifier) can be used. As will be appreciated by one skilled in the art, various mechanisms can be used to match characters within the image 116.

In some embodiments, following the character matching operation 330, a disambiguation operation 335 may be performed to obtain a more accurate string of characters. This operation is optional and in some embodiments it is not performed. Flow then moves to operation 340 at which the dot text optical character recognition unit 108 determines whether the candidate string of characters satisfies selection criteria. Upon determining that the candidate string of characters does not satisfy the selection criteria, the operations 320-340 are repeated based on a different set of candidate distances and orientations until the detected candidate string of characters satisfies the selection criteria. Multiple selection criteria can be used to select a candidate string of characters. A verification can be performed to determine that the candidate string of characters includes a given number of characters, that the position of the candidate string relative to other objects (e.g., to other strings of characters), is within an acceptable threshold value. Other characteristics of the string may be evaluated (e.g., space between characters, size of the characters relative to one another, etc.) to determine whether the candidate string of characters is to be selected.

The results of the character matching mechanisms are significantly improved by the use of the image 116 instead of the original grayscale image received from the acquisition device to identify the characters. The embodiments of the present invention enable the processing of an image including dot text as received from an acquisition device to be processed such as dot text is converted into text of stroked characters enabling an efficient and accurate detection and matching of characters within the image. Thus, contrary to prior character recognition methods of dot text, which required segmentation of characters or extensive application specific preprocessing, the present embodiments enable an efficient and accurate character recognition method based on a transformation of the acquired image according to dot pitches of the characters in a first and a second orientation.

Determination of Orientation and Dot Pitch of Dot Text Characters in an Image

The embodiments described with reference to FIGS. 6-11 enable the determination of the orientation and dot pitch of characters in an image. As will be described in further detail below, in some embodiments, the operations performed to enable the determination of the orientation and the dot pitch of dot text characters can be performed independently of the operations enabling optical character recognition, dot extraction, or dot text detection. In other embodiments, the operations performed to enable the determination of the orientations and the dot pitch of characters can be performed as part of the operations enabling optical character recognition described with reference to FIGS. 1-5.

As discussed above, dot text (be it dot matrix printed text, or other type of text in which characters are formed of dots) is structured along two orientations. In some embodiments, for example in dot matrix printed text use cases, the dot text is printed according to two orientations that are orthogonal and may be referred to as a vertical and a horizontal orientation. Further, the distance between two adjacent dots within the same character and along a given orientation is referred to as the dot pitch. The dot pitch along the first orientation (e.g., the vertical dot pitch) can be different or equal to the dot pitch along the second orientation (e.g., the horizontal dot pitch). The dot pitch along a given orientation is substantially the same from a character to another character.

The embodiments presented herein rely on the accumulation of statistical information about the dots present in the neighborhood of each dot. A Fast Fourier Transform (FFT) is computed across the statistical information to extract frequency properties of the statistical information. The first and second distance between adjacent dots of a character and the first and second orientation are deduced from the frequency properties of the statistical neighborhood. Once the orientations and distances between the adjacent dots are determined, they may be used to correct the orientations and resample the dot text in the image in order to connect the dots in the image, thus resulting in a stroked text. The stroked text may then be used to efficiently and accurately perform character recognition.

In some embodiments, the operations described with respect to FIGS. 6-11 are implemented on an electronic device (such as the dot text optical character recognition unit 108 or data processing system 2400) and enable automatic detection in an image of orientations and dot pitches of characters. In some embodiments, the operations described herein are implemented by the dot pitch detection code 2433, which when executed by processor(s) 2405 of FIG.

24, cause the data processing system 2400 to automatically determine the orientations and dot pitches of characters in an image comprising dot text. The determination of the orientation and dot pitch of characters in the image can be used to transform a dot text image into an image of stroked characters enabling efficient and accurate optical character recognition. For example, the image of stroked characters (which is also referred to herein as the transformed image) can be used at operation (1.2) of FIG. 2B and operation 320 of FIG. 3.

Figure 6:
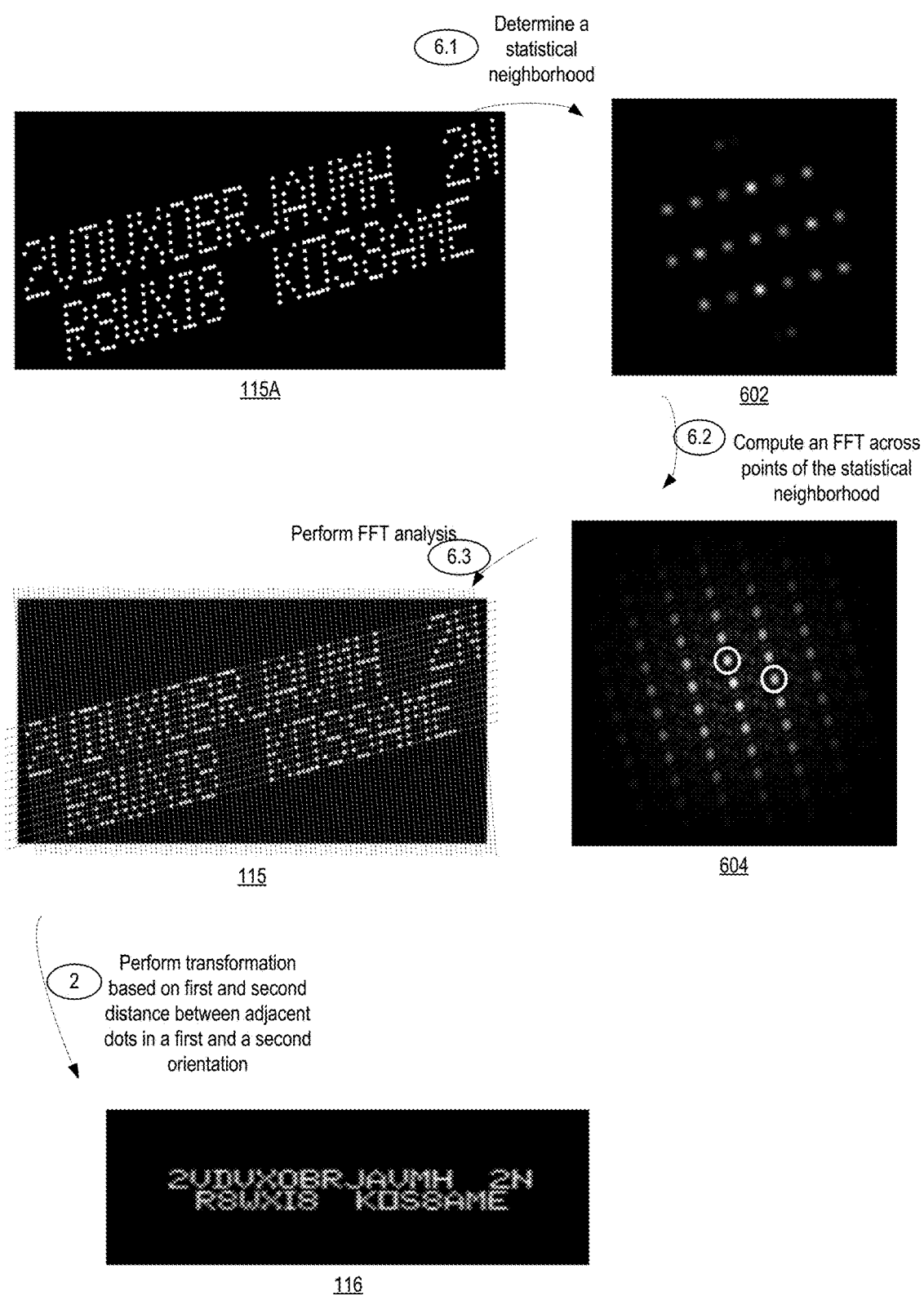
FIG. 6 illustrates operations performed to determine a first and second distance between adjacent dots of a character along a first and a second orientation in accordance with some embodiments.

FIG. 6 illustrates operations performed to determine a first and second distance between adjacent dots of a character along a first and a second orientation in accordance with some embodiments. At operation (6.1), a statistical neighborhood of the set of dots of the image 115A is determined. A statistical neighborhood includes a set of points and each point is associated with a position and a statistical measure indicative of a likelihood that one or more dots that satisfy a shape and a size criteria are located at that position. FIGS. 7A-E illustrate exemplary detailed operations for determining a statistical neighborhood in accordance with some embodiments.

Figure 7A:
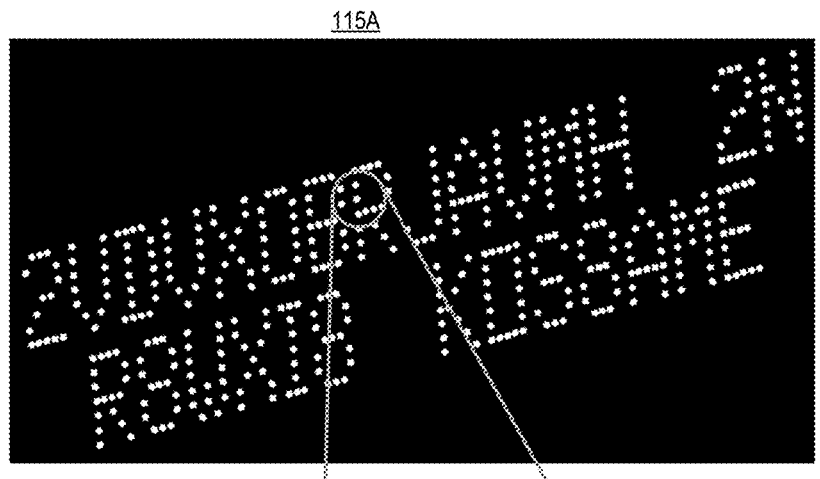
FIG. 7A illustrates an exemplary binary image representative of extracted dots in accordance with some embodiments.

FIG. 7A illustrates an exemplary binary image representative of extracted dots in accordance with some embodiments. Image 115A represents a set of dots extracted from a grayscale image (e.g., image 112) or a color image in which each dot satisfies dot selection criteria. The dot selection criteria include a predetermined size and shape of the dot. In some embodiments, the predetermined size and shape of a dot can be expressed in terms of the area and the elongation of a dot. In some embodiments, the selection criteria may include additional criteria such as a predetermined contrast of the dot, a predetermined intensity value, a predetermined color, and any other criterion that uniquely defines dots of characters within an image. In one embodiment, the detection of the dots is performed according to the operations described with reference to FIG. 5. In other embodiments, the detection of the dots is performed according to the embodiments described with reference to FIGS. 18A-23. Other mechanisms can be used to extract the dots without departing from the spirit or scope of the present invention. For example, differential methods based on derivatives of the intensity of the pixels with respect to the position of the pixels can be used to detect dots (such as Laplacian of the Gaussian).

In some embodiments, the image 115A is a result of a dot extraction mechanism followed with a dot text location mechanism in which the dot text is located within a larger image. The larger image may have comprised additional dots that satisfy the selection criteria but were excluded by a dot text location mechanism (e.g., image 114). In some embodiments, the dot text location mechanism is performed as described in further details with reference to FIGS. 12-17. Other mechanisms can be used to locate the dot text within the image without departing from the scope of the present invention. In some embodiments, a convolution of a bounding box (having the predetermined dimensions) with the image 114 can be performed. In another example, an analysis of the pixels' texture based on co-occurrence matrices can be performed.

In some embodiments, each dot $d_i$ is associated with a position $(x_i, y_i)$ and a weight $(w_i)$. The weight $(w_i)$ of a dot $d_i$ is a measure indicative of the presence of a dot. In some embodiments the weight is a foreground intensity value (white). In another embodiment, the weight is a grey intensity value within a range of grayscale intensities. In some embodiments, the weight is a result of a second order derivative filter applied to the grayscale image 112 that highlights all structures within the grayscale image 112 that correspond to a dot of a given size and shape. For example, the filter can be a Laplacian filter, or another second order derivative filter which can be implemented as a Finite Impulse Response (FIR) filter, or an Infinite Impulse Response (IIR) filter. For example, the weight can be a sum of all intensity values in the filtered image of the foreground pixels forming the dot. In some embodiments, the weight can be a function of the intensity value in the filtered image of the position of the local maxima pixel at which the dot was detected. In some embodiments, the weight can be a measure indicative of the roundness/compactness of the dot and its diameter, when the dot is a circle. More generally, the weight can be a measure indicative of the shape of the dot with respect to a model dot that forms characters.

Figure 7B:
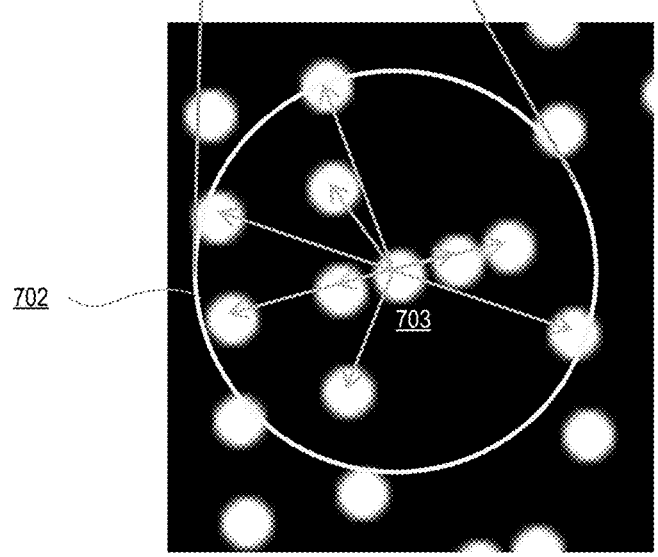
FIG. 7B illustrates an exemplary binary image including a dot and a neighborhood of the dot in accordance with some embodiments.
Figure 7C:
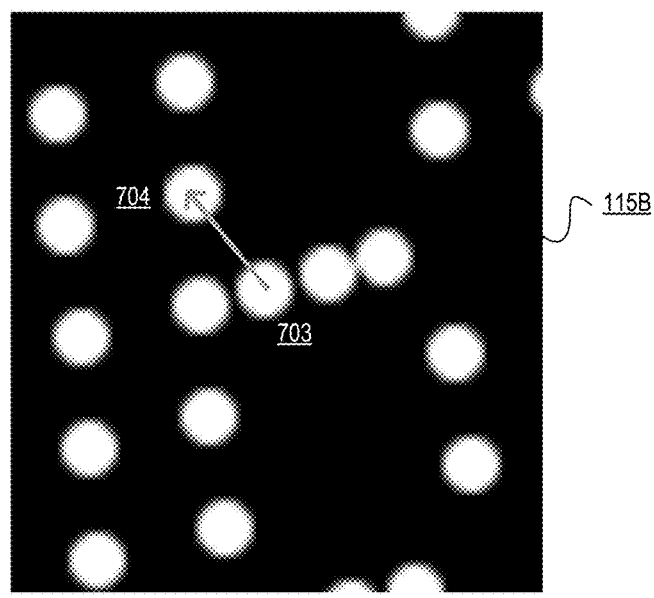
FIG. 7C illustrates an exemplary dot neighbor in accordance with some embodiments.
Figure 7D:
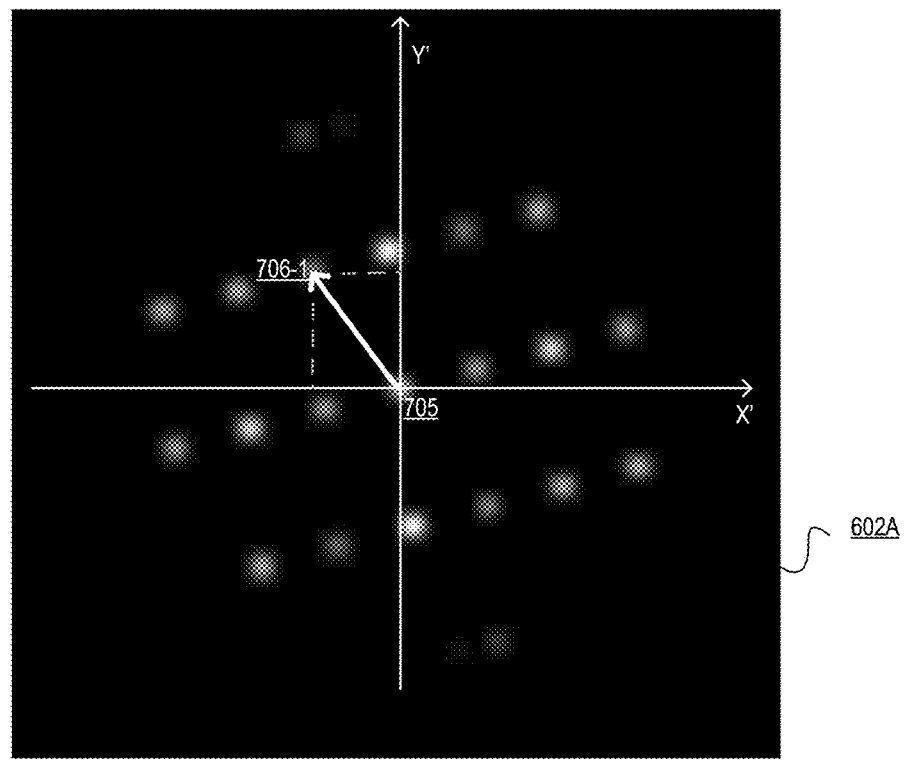
FIG. 7D illustrates an exemplary accumulation of a statistical measure in the statistical neighborhood image in accordance with some embodiments.

Each dot from the set of dots is analyzed to obtain the statistical neighborhood (as represented with image 602). For clarity and ease of understanding the following embodiments will be described with respect to a single dot from the set of dots in the image 115A. However the operations are repeated for each dot from the set of dots to obtain the statistical neighborhood of the set of dots. FIG. 7B illustrates an exemplary binary image including a dot 703 and a neighborhood 702 of the dot in accordance with some embodiments. A portion 115B of image 115A is enlarged including the dot 703 and its neighborhood 702. All dots from the set of dots in the image that are located within the neighborhood of the dot are identified. The neighborhood of the dot can be based on the size of the dot. For example, a neighborhood represents all pixels within a given distance from the center of the dot, where the distance is a multiple of a diameter of the dot. In some embodiments, the dots of the neighborhood are determined based on their respective distance from the dot. For example, in FIG. 7B all dots within the circle 702 are determined to be part of the neighborhood of the dot 703. In the illustrated example, dot 703 has 9 neighbors within the neighborhood 702. FIG. 7C illustrates an exemplary dot neighbor in accordance with some embodiments. 704 is a dot $s_i$ (704) located within the neighborhood 702 of the dot p (703). FIG. 7D illustrates an exemplary accumulation of a statistical measure in the statistical neighborhood image 602B in accordance with some embodiments. For the dot $s_i$ (704), a statistical measure is accumulated at the position 706-1 of the statistical neighborhood 602A. The position 706-1 is determined based on the vector $s_{ip}=s_i-p$. The vector $s_{ip}$ defines the position of the point 706-1 to be added to the statistical neighborhood. The point 705 is located at the center of the image 602A representing the statistical neighborhood of the set of extracted dots and is the origin of the coordinate system (X', Y'). Thus, the position of the point 706-1 in the statistical neighborhood associated with the dot $s_i$ (704) is determined based on a relative position of the neighbor dot $s_i$ (704) with respect to the first dot p (703).

In some embodiments, the statistical measure accumulated at the position 706-1 depends on the respective weights of the dot p and its neighbor $s_i$. For example, a product of the weight $w_p$ of the dot p with the weight $w_{si}$ of the dot $s_i$ (i.e., the product $w_p \times w_{si}$) is added to a statistical measure associated with the position 706-1. In these embodiments, the intensity value of the points at each position (e.g., at position $w_{si}$) in the image 602A represents the statistical measure resulting from the accumulation process as applied to the neighboring dots for each one of the extracted dots of image 115A. In other embodiments, other measures may be accumulated at each position within the statistical neighborhood.

Figure 7E:
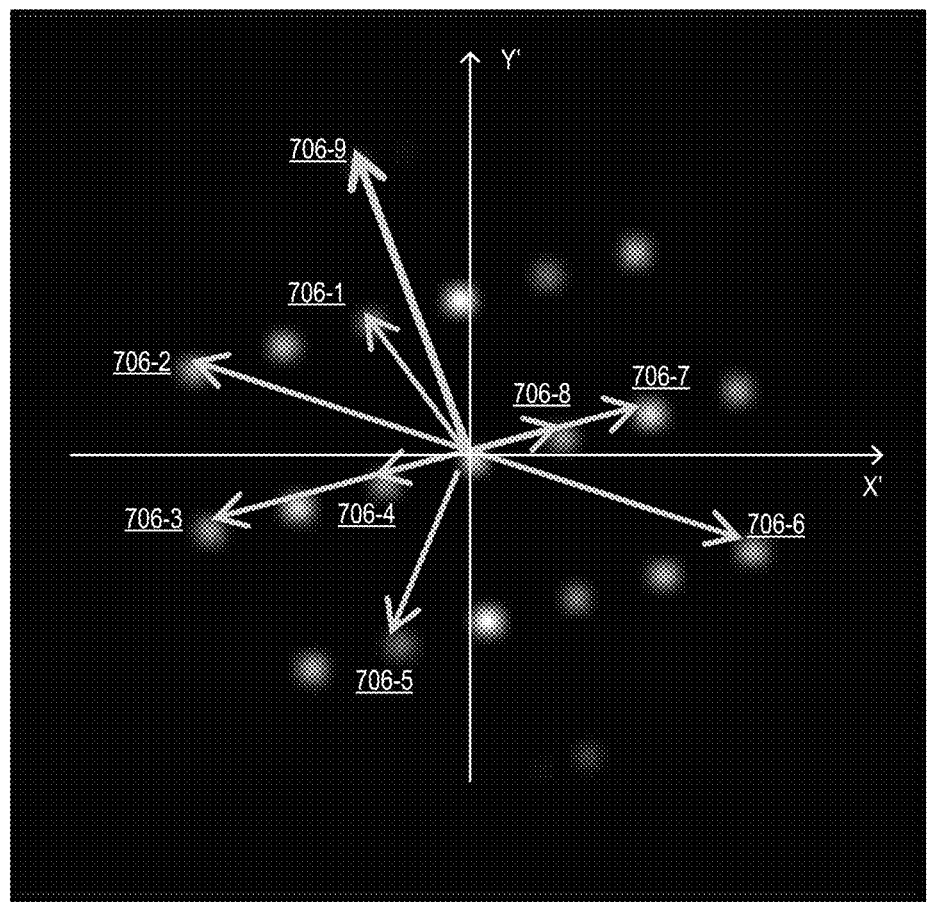
FIG. 7E illustrates an exemplary grayscale image representative of a statistical neighborhood of a dot text image in accordance with some embodiments.

For example, a minimum intensity value, the average intensity value, the maximum intensity value of the pixels forming the neighbor dot can be accumulated. In another example, for each pixel of the neighbor dot, the weight associated with the central pixel of the dot can be accumulated. As discussed above the accumulation operation is repeated for each neighbor of the dot p. FIG. 7E illustrates an exemplary grayscale image 602B representative of a statistical neighborhood of a dot text image in accordance with some embodiments. The arrows illustrated in FIG. 7E represent the positions of the points 706-1 to 706-9 associated with the neighboring dots of the dot p illustrated in FIG. 7B. This process is repeated for each dot within the image 115A to obtain the image 602 representative of the statistical neighborhood. While the statistical neighborhood is represented as a grayscale image, the embodiments of the present invention are not so limited. The statistical neighborhood can be represented as a data structure of points with associated positions and statistical measure indicative of a likelihood that one or more dots that satisfy a shape and a size criteria are located at that position.

Figures 8A, 8B:
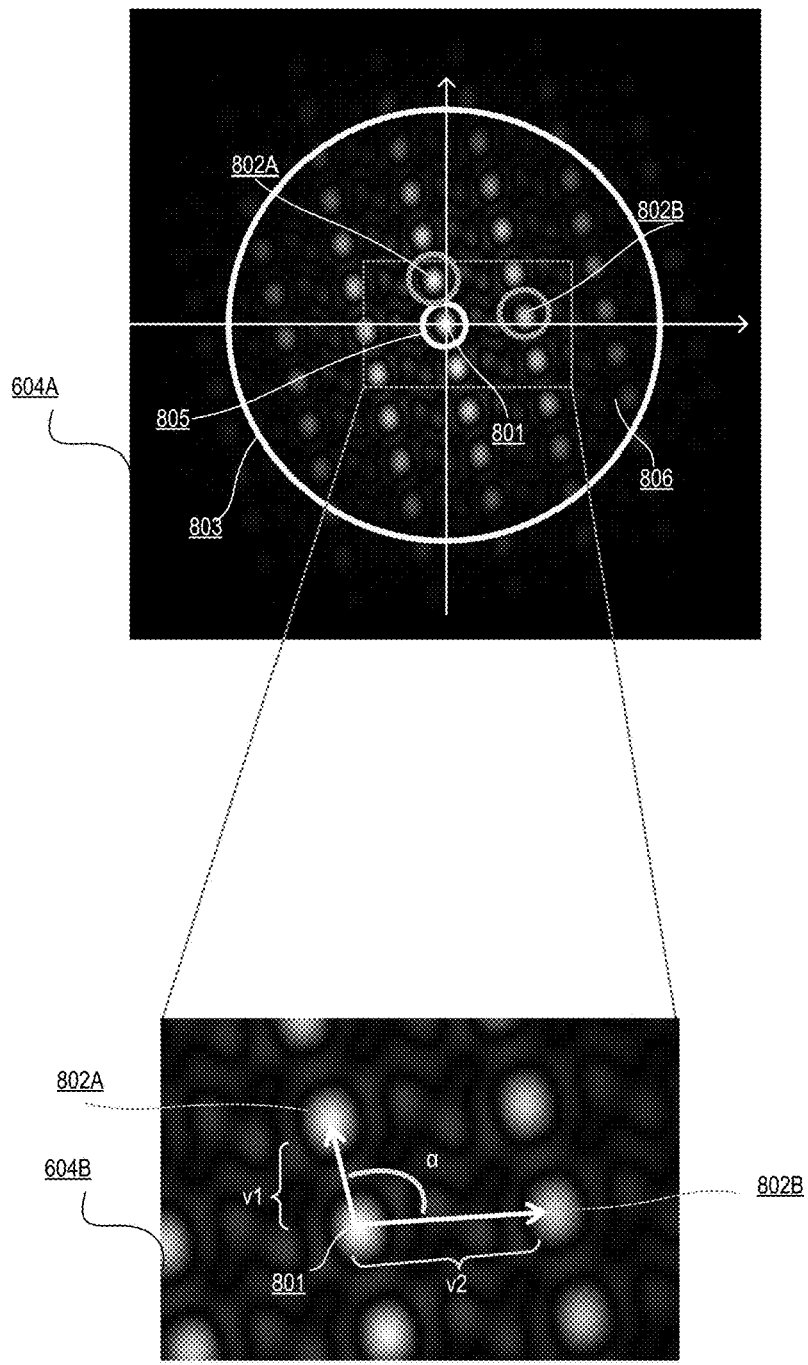
FIG. 8A illustrates an exemplary grayscale image representative of a Fast Fourier Transform of a statistical neighborhood of a dot text image in accordance with some embodiments.
FIG. 8B illustrates a detailed view of an exemplary grayscale image representative of a Fast Fourier Transform of a statistical neighborhood of a dot text image in accordance with some embodiments.

Referring back to FIG. 6, once the statistical neighborhood is determined, a Fast Fourier Transform (FFT) is computed across the statistical neighborhood (operation 6.2). Image 604 is representative of the FFT of the statistical neighborhood. FIG. 8A illustrates an exemplary grayscale image 604A representative of a Fast Fourier Transform of a statistical neighborhood of a dot text image in accordance with some embodiments. The intensity of each pixel of the image 604A representing the FFT of the statistical neighborhood is determined by the magnitude of a sine wave. For example, the intensity of a pixel in the FFT image 604A is determined by the equation $sqrt(R^2+I^2)$ where R is the Real part of the FFT and I is the imaginary part of the FFT. The points 802A and 802B represent local maxima of an intensity profile of the image 604A. The direction and magnitude of a vector originating from the center of the FFT image to a given peak (i.e., local maximum) indicate the direction and the frequency of propagation of a sine wave in the statistical neighborhood.

Referring back to FIG. 6, at operation (6.3), an analysis of the FFT of the statistical neighborhood is performed. A set of two local maximums are extracted from the intensity profile of the FFT. Each peak (or local maximum) estimates an orientation and a respective dot pitch of characters in the image. For instance, FIG. 8B illustrates an exemplary local maxima of a Fast Fourier Transform of a statistical neighborhood in accordance with some embodiments. The first peak 802A and the second peak 802B are selected based on their intensity values and direction within the FFT image. The vector $v_1$ estimates a first sine wave with a first orientation and frequency. The vector $v_2$ estimates a second sine wave with a second orientation and frequency. The first and second local maximum that define the vectors $v_1$ and $v_2$ are selected based on one or more selection criteria (e.g., intensity, angle between the two orientations defined by the vectors, etc.).

In some embodiments, the selection of the first peak 802A and second peak 802B is performed by applying a pass band filter to the FFT of the statistical neighborhood. The pass band filter passes frequencies within a given range and discards (i.e., attenuates) frequencies outside that range enabling the selection of realistic dot pitches in the image 115. For example, the application of a pass band filter on the FFT image 604A results in a selection of the FFT values located between the circle 803 and the circle 805 within the image 604A. The given range can be preconfigured or alternatively determined by a user input. Once the pass band filter is applied, a set of two FFT peaks that satisfy one or more selection criteria are identified from the filtered FFT peaks.

In some embodiments, the selection criteria include determining whether each one of the two FFT peaks is within a given range (for example, the FFT peaks are within 0 and 180 degrees). Further another selection criteria may include determining whether each one of the two FFT peaks has a high intensity value. In some embodiments, determining whether a peak has a high intensity value includes determining that the intensity value of the peak is higher than a given threshold value. In other embodiments, determining whether a peak has a high intensity value includes determining that the intensity value of the peak is higher than the intensity values of other FFT peaks in the image 604A. For example, the peaks 802A and 802B have higher intensity values than the point 806. Further the peaks 802A and 802B have respective intensity values that are higher than a determined threshold value. Another selection criterion may include determining whether the two FFT peaks are at least D degrees apart from one another. The D is a predetermined value that represents realistic italic slant angles of the dot text within the image. For example, the vectors $v_1$ and $v_2$ have an angle α that is greater or equal to the predetermined value D.

Figure 8C:
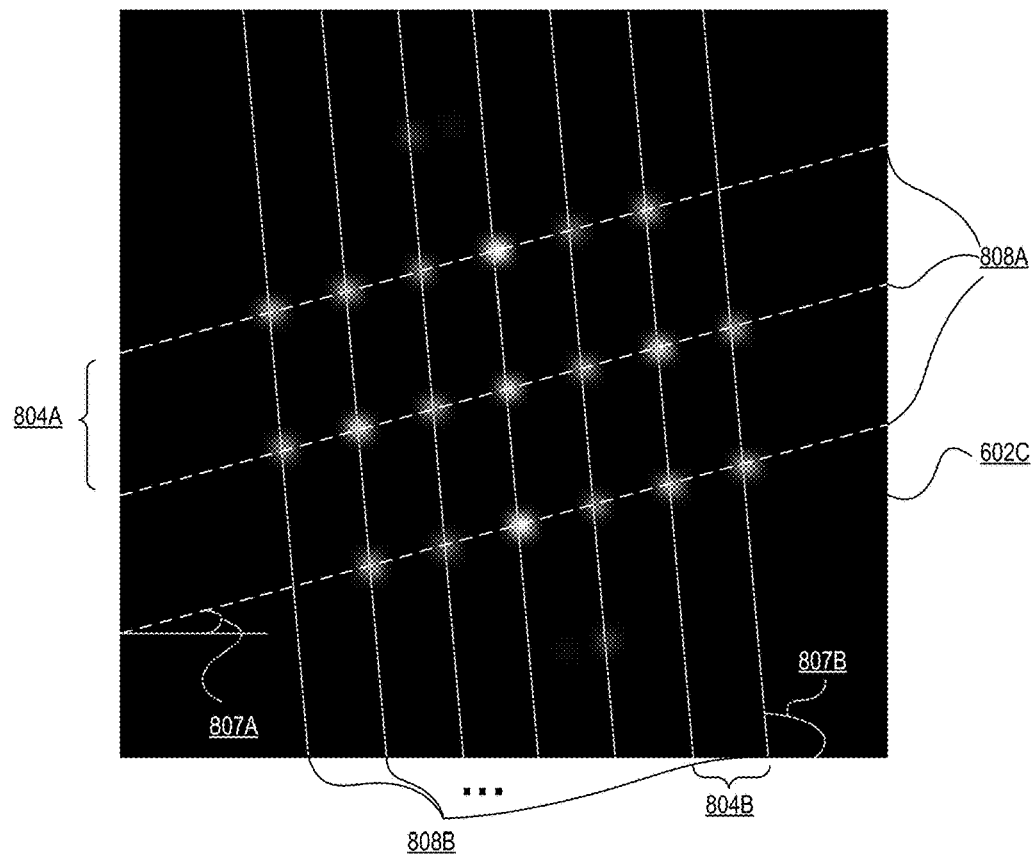
FIG. 8C illustrates exemplary orientation and frequency of the statistical neighborhood determined based on the selected local maxima of the FFT of the statistical neighborhood in accordance with some embodiments.

FIG. 8C illustrates exemplary orientation and frequency of the statistical neighborhood determined based on the selected local maxima of the FFT of the statistical neighborhood in accordance with some embodiments. In the illustrated example of image 602C, the vector $v_1$ estimates a first sine wave illustrated by its wavefronts 808A, where the distance 804A represents the frequency of the sine wave and the angle 807A represents the orientation of the sine wave. The vector $v_2$ estimates a second sine wave illustrated by its wavefronts 808B, where the distance 804B represents the frequency of the sine wave and the angle 807B the orientation of the sine wave.

Figure 8D:
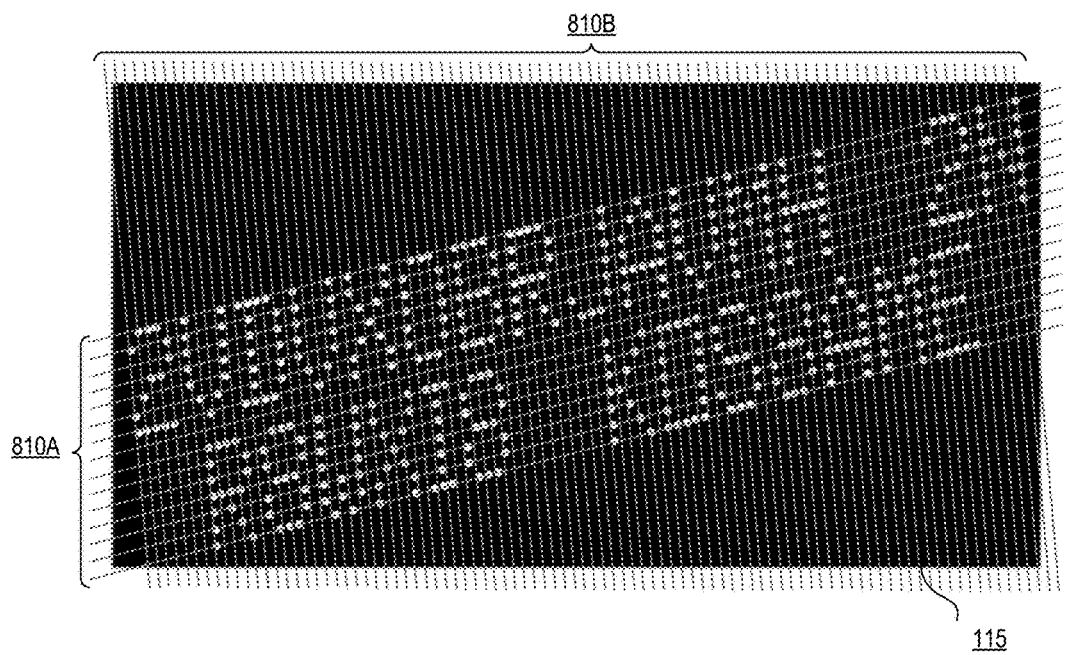
FIG. 8D illustrates exemplary estimated orientations and dot pitches in accordance with some embodiments.

The statistical neighborhood 602C being a construct from the extracted set of dots, the estimated orientations and dot pitches remain valid in the image of dots 115A. Image 115 of FIG. 8D illustrates the estimated orientations and dot pitches of characters in an image as determined in accordance with some embodiments. The lines 810A and 810B are defined based on the orientation and distance defined by the vectors $v_1$ and $v_2$. As shown in FIG. 8D, the lines are aligned with the dots within the image and accurately represent the dot pitches between adjacent dots in a first and a second orientation that are aligned with the orientation of the text in the image. Therefore the embodiments of the present invention allow for an accurate determination of orientation and dot pitches of characters in an image by performing an analysis in the frequency domain of a statistical neighborhood representation of the image.

Referring back to FIG. 6, once the orientations and dot pitches are determined the original set of dots (as illustrated in FIG. 115A) is corrected to obtain an image of stroked text. At operation (2), a transformation is performed on the extracted set of dots based on the first candidate distance (first dot pitch) between adjacent dots along the first orientation and based on the second candidate distance (second dot pitch) between adjacent dots along the second orientation to obtain the transformed image 116 including stroked characters. In some embodiments, the transformation of the image is performed as described with reference to FIG. 4.

Once the transformed image 116 is obtained, the image can be used to perform character matching and output a string of characters.

The operations in the following flow diagrams of FIGS. 9-11 will be described with reference to the exemplary images of FIGS. 6-8D. However, it should be understood that the images of FIGS. 6-8D are exemplary only and the embodiments of the present invention can be used to determine orientation and dot pitch of characters in other images of various scenes under varying acquisition and lighting scenarios.

Figure 9:
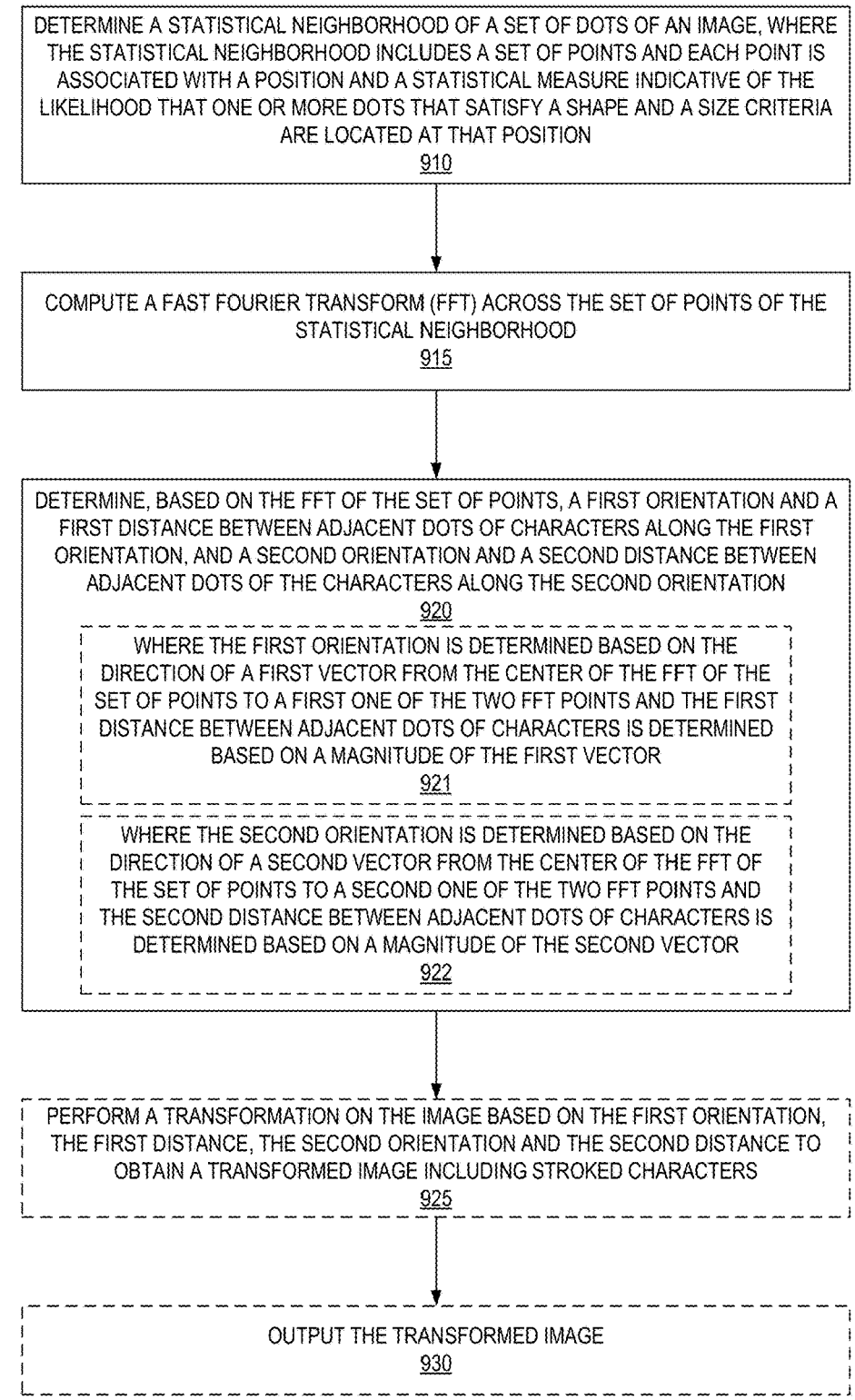
FIG. 9 illustrates a flow diagram of operations for determining orientation and dot pitch of dot text in an image in accordance with some embodiments.
Figure 10:
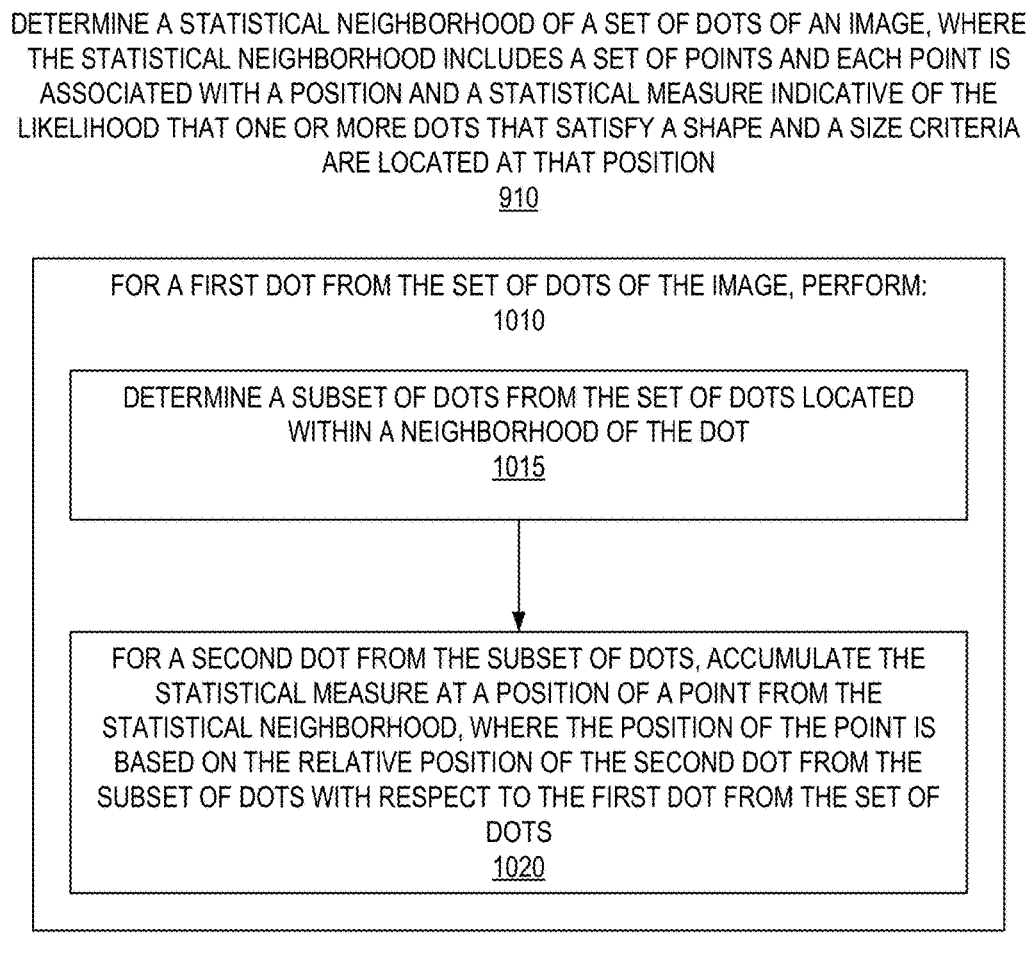
FIG. 10 illustrates a flow diagram of exemplary detailed operations for determining a statistical neighborhood in accordance with some embodiments.

FIG. 9 illustrates a flow diagram of operations for determining orientation and dot pitch of dot text in an image in accordance with some embodiments. At operation 910, a statistical neighborhood of the set of dots of the image 115A is determined. A statistical neighborhood includes a set of points and each point is associated with a position and a statistical measure indicative of a likelihood that one or more dots that satisfy a shape and a size criteria are located at that position. FIG. 10 illustrates exemplary detailed operations for determining a statistical neighborhood in accordance with some embodiments.

At operation 1010 for each dot from the set of dots of the image (e.g., 115A), operations 1015 and 1020 are performed. In some embodiments, image 115A represents a set of dots extracted from a grayscale image (e.g., image 112) in which each dot satisfies dot selection criteria. The dot selection criteria include a predetermined size and shape of the dot. In some embodiments, the predetermined size and shape of a dot can be expressed in terms of the area and the elongation of a dot. In some embodiments, the selection criteria may include additional criteria such as a predetermined contrast of the dot, a predetermined intensity value, a predetermined color, and any other criterion that uniquely defines dots of characters within an image. In one embodiment, the detection of the dots is performed according to the operations described with reference to FIG. 5. In other embodiments, the detection of the dots is performed according to the embodiments described with reference to FIGS. 18A-23. Other mechanisms can be used to extract the dots without departing from the spirit or scope of the present invention. For example, differential methods based on derivatives of the intensity of the pixels with respect to the position of the pixels can be used to detect dots (such as Laplacian of the Gaussian).

For clarity and ease of understanding the following embodiments will be described with respect to a single dot from the set of dots in the image 115A. However the operations are repeated for each dot from the set of dots to obtain the statistical neighborhood (e.g., image 602) of the set of dots. At operation 1015, a subset of dots from the set of dots located within a neighborhood of the processed dot is determined. At operation 1020, for each dot from the subset of dots a statistical measure is accumulated at a position of a point from the statistical neighborhood. The position of the point is based on a relative position of the neighbor dot (e.g., 704) with respect to the dot (703) being processed. In some embodiments, the operations 1010, 1015 and 1020 are performed as described with respect to FIGS. 7A-E.

Referring back to FIG. 9, flow then moves from operation 910 to operation 915 at which a Fast Fourier Transform (FFT) is computed across the statistical neighborhood. Image 604 is representative of the FFT of the statistical neighborhood. FIG. 8A illustrates an exemplary grayscale image representative of a Fast Fourier Transform of a statistical neighborhood of a dot text image.

Flow then moves to operation 920, at which a first orientation and a first distance between adjacent dots of characters along the first orientation, and a second orientation and a second distance between adjacent dots of the characters along the second orientation are determined based on the FFT of the set of points. The first orientation is determined (operation 921) based on a direction of a first vector (e.g., vector $v_1$) from a center of the FFT of the set of points to a first one of the two FFT points (802A) and the first distance between adjacent dots of characters is determined based on a magnitude of the first vector. The second orientation is determined (operation 922) based on a direction of a second vector (e.g., vector $v_2$) from a center of the FFT of the set of points to a second one of the two FFT points (e.g., 802B) and the second distance between adjacent dots of characters is determined based on a magnitude of the second vector.

FIG. 11 illustrates exemplary detailed operations for determining the orientations and dot pitches of characters in an image in accordance with some embodiments. In one embodiment, operation 920 includes applying (operation 1115) a pass band filter to the FFT of the statistical neighborhood. The pass band filter passes frequencies within a given range and discards (i.e., attenuates) frequencies outside that range enabling the selection of realistic dot pitches in the image 115. For example, the application of pass band filter on the FFT image 604A results in a selection of the FFT values located between the circle 803 and the circle 805 within the image 604A. The given range can be preconfigured or alternatively determined by a user input. In other embodiments, the application of the pass band filter can be skipped and the operation 1120 is applied on the unfiltered FFT image.

Flow then moves to operation 1120, at which a set of two FFT points (e.g., FFT peaks 802A and 802B) that satisfy one or more selection criteria are identified. The two FFT points are selected from the filtered FFT of the statistical neighborhood or alternatively from the FFT of the statistical neighborhood if the pass band filter is not applied. In some embodiments, the selection criteria include at least one of the following criteria: each one of the two FFT points is within a range of 0 and 180 degrees, each one of the two FFT points has a high intensity value, the two FFT points are at least D degrees apart, where D is a predetermined value. In some embodiments, determining whether each one of the two FFT points has a high intensity value includes determining that the intensity value of the peak is higher than a given threshold value. In other embodiments, determining whether a peak has a high intensity value includes determining that the intensity value of the peak is higher than the intensity values of other FFT peaks in the image 604A. Another selection criterion may include determining whether the two FFT peaks are at least D degrees apart from one another. The D is a predetermined value that represents realistic italic slant angles of the dot text within the image. In some embodiments, the determination of the orientations and dot pitches based on the FFT of the set of points is performed as described with the exemplary images of FIGS. 8A-D.

In some embodiments, the flow of operations moves to operation 925, at which a transformation is performed on the extracted set of dots based on the first orientation, the first candidate distance, the second orientation and the second candidate distance to obtain a transformed image (e.g., image 116) including stroked characters. In some embodiments, the transformation of the image is performed as described with reference to FIG. 4. Once the transformed image 116 is obtained, the image is output and can be used to perform character matching.

Therefore the embodiments of the present invention described with reference to FIGS. 6-11 allow for an accurate determination of orientation and dot pitches of characters in an image by performing an analysis in the frequency domain of a statistical neighborhood representation of the image.

While the embodiments above were described with respect to determining two orientations and two dot pitches of dot text in an image, alternative embodiments can be performed in which a single orientation and a single dot pitch are detected. For example, in some embodiments, a first orientation of the text is known and operations can be performed to detect the other orientation of the text and determine whether the text is in italic form or not. In another example, the two orientations of the text may be known, while the dot pitches may be unknown, it will be apparent to one of ordinary skill in the art, that the operations of the present invention can be used to determine the dot pitches given that the orientations are known.

Location of Dot Text in an Image:

The embodiments described with reference to FIGS. 12-17 enable the localization of dot text in an image. As will be described in further detail below, in some embodiments, the operations performed to enable the localization of dot text can be performed independently of the operations enabling optical character recognition, dot extraction, or orientation and dot pitch determination. In other embodiments, the operations performed to enable the localization of dot text can be performed as part of the operations enabling optical character recognition described with reference to FIGS. 1-5, alternatively or additionally, the operations can be performed as part of the orientation and dot pitch detection methods of FIGS. 6-11.

The embodiments described herein present methods and apparatuses for locating dot text in an image. A set of dots is extracted from an image. The location of the dot text is determined based on a recursive process of principal component analysis of multiple subsets of dots from the extracted set of dots. In an initial operation, a first region of interest including the set of dots is determined, where the first region of interest is oriented based on a first and a second axis resulting from the principal component analysis of the set of dots. Upon determination that the first region of interest satisfies selection criteria, the first region of interest is output as a location of the dot text in the image. Upon determination that the first region of interest does not satisfy the selection criteria, the following operations are performed: an outlier dot is removed from the extracted set of dots to obtain a second set of dots, and the process of determining whether the region of interest including the second set of dots satisfies the selection criteria and removing outlier dots from the current set of dots is repeated until a resulting region of interest satisfies the selection criteria.

In some embodiments, the operations described with respect to FIGS. 12-17 are implemented on an electronic device (such as the dot text optical character recognition unit 108 or data processing system 2400) and enable automatic location of dot text. In some embodiments, the operations described herein are implemented by the dot text location code 2432, which when executed by processor(s) 2405 of FIG. 24, cause the data processing system 2400 to automatically locate dot text within an image. The location of the dot text in an image can be used in the optical character recognition process described with reference to FIGS. 1-5, and/or in the orientation and dot pitch detection process described with reference to FIGS. 6-11. For example, the operations described herein below can be performed at operation (1.1) of FIG. 2A and operation 315 of FIG. 3. Further the operations described herein below can be performed to determine and extract the subset of dots as illustrated in image 115A of FIGS. 6 and 7A used to determine the statistical neighborhood in the orientation and dot pitch detection process.

While the embodiments of the present invention described with reference to FIGS. 12-17 focus on exemplary use cases of optical character recognition, the use of the present invention is not so limited. The methods and apparatuses for locating the dot text may be used for other purposes and in other use cases. For example, the location of the dot text may be used in other applications for verifying the appropriate location of the dot text in an image (without the need of performing OCR on the text). Other use cases can be contemplated without departing from the scope and spirit of the present invention.

Figure 12:
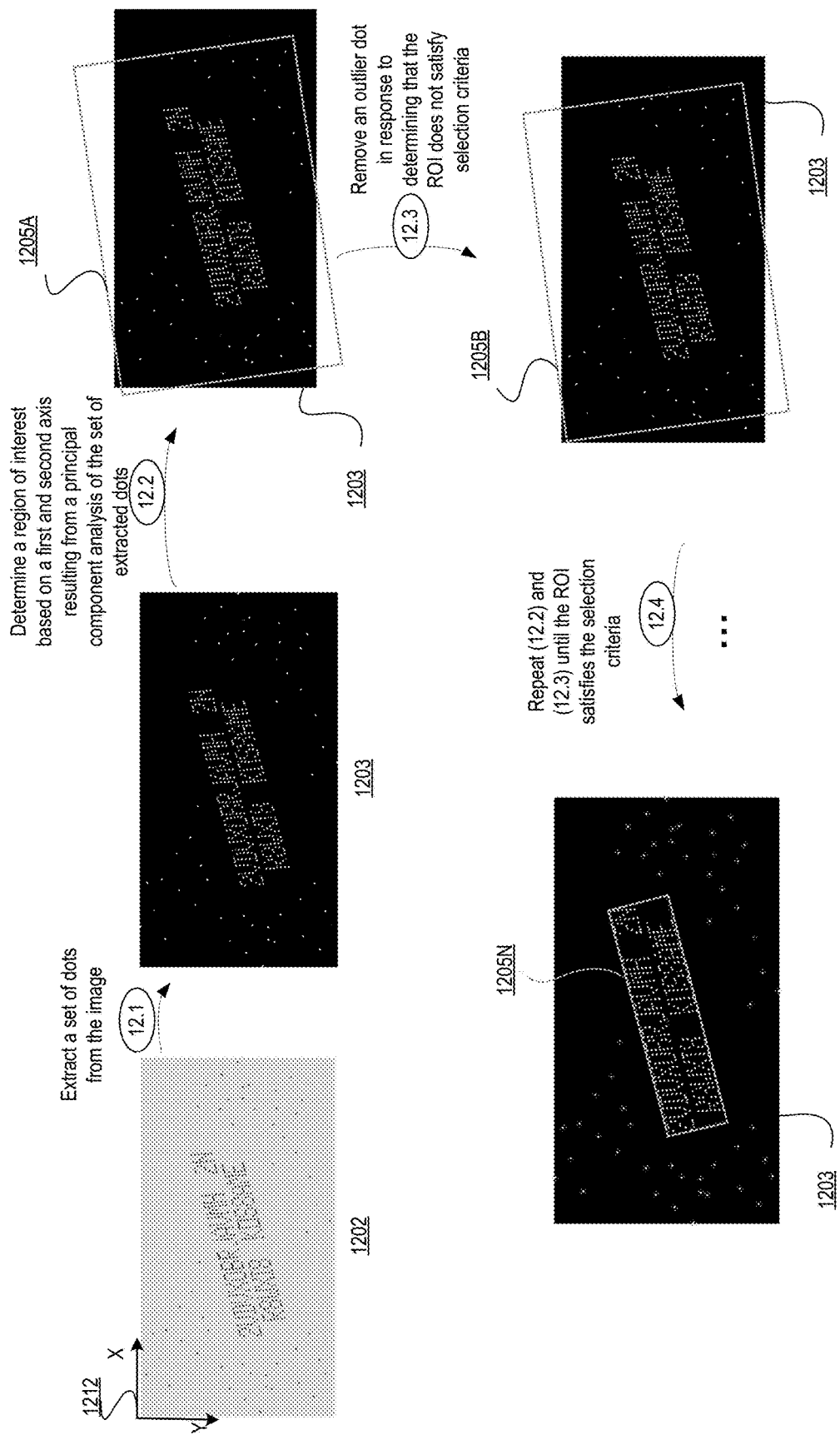
FIG. 12 illustrates exemplary operations for locating dot text in an image in accordance with some embodiments.

FIG. 12 illustrates exemplary operations for locating dot text in an image in accordance with some embodiments. Image 1202 is an exemplary grayscale image that may be processed to locate dot text. The image 1202 is a grayscale image, in which each pixel of the image has an intensity value within a given range (e.g., between 0 and 255 when the pixel intensity is represented with 8 bits; between 0 and 65535 when the pixel intensity is represented with 16 bits; or other ranges when the pixel intensity is represented with a different number of bits). While image 1202 appears to include white pixels, black pixels and grey pixels of a single shade of grey, other input images will typically include pixels with varying shades of grey. In some embodiments, the processed image can be a color image (e.g., RGB). In some embodiments a color image can be converted into a grayscale image prior to detecting the dot text in the image.

At operation (12.1), a set of dots $D_1$ is extracted from the image 1202. Image 1203 represents the set of dots $D_1$ extracted from the image 1202 in which each dot $d_i$ satisfies dot selection criteria. The dot selection criteria include a predetermined size and shape of the dot. In some embodiments, the predetermined size and shape of a dot can be expressed in terms of the area and the elongation of a dot. In some embodiments, the selection criteria may include additional criteria such as a predetermined contrast of the dot, a predetermined intensity value, a predetermined color, and any other criterion that uniquely defines dots of characters within an image. In some embodiments, the detection of the dots is performed according to the embodiments described with reference to FIGS. 18A-23. In other embodiments, the detection of the dots is performed according to the operations described with reference to FIG. 5. Other mechanisms can be used to extract the dots without departing from the spirit or scope of the present invention. For example, differential methods based on derivatives of the intensity of the pixels with respect to the position of the pixels can be used to detect dots (such as Laplacian of the Gaussian).

Each dot $d_i$ is associated with a position $(x_i, y_i)$ (determined with respect to the coordinate system 1212 of the image) and an associated weight $(w_i)$. The weight $(w_i)$ of a dot is a measure indicative of the presence of a dot. In some embodiments the weight is a foreground intensity value (white). In another embodiment, the weight is a grey intensity value within a range of grayscale intensities. In another embodiment, the weight is a result of a second order derivative filter applied to the grayscale image 1202 that highlights all structures within the grayscale image 1202 that correspond to a dot of a given size and shape. In some embodiments, the weight can be a measure indicative of the roundness/compactness of the dot and its diameter, when the dot is a circle. More generally, the weight can be a measure indicative of the shape of the dot with respect to a model dot that forms characters. While FIG. 12 illustrates the extracted set of dots as a binary image (e.g., image 1203), in other embodiments, the extracted set of dots can be stored as a list of positions $(x_i, y_i)$ determined with respect to the coordinate system of the image with the associated weight ($w_i$).

In some embodiments, image 1203 may have different dimensions than the original image 1202 and may be associated with a different coordinate system than 1212. In these embodiments, a dot's position may be expressed in terms of sets of coordinates in each one of the two coordinate systems and a transformation between the two coordinate systems to enable the detection of the location of the dot text within the coordinate system of the image 1202. For example, the processing of the dots can be performed in the coordinate system of image 1203 and later converted into the coordinate system of 1202 when the dot text is located. In other embodiments, the processing of the dots can be directly performed in the coordinate system of image 1202.

Figure 13:
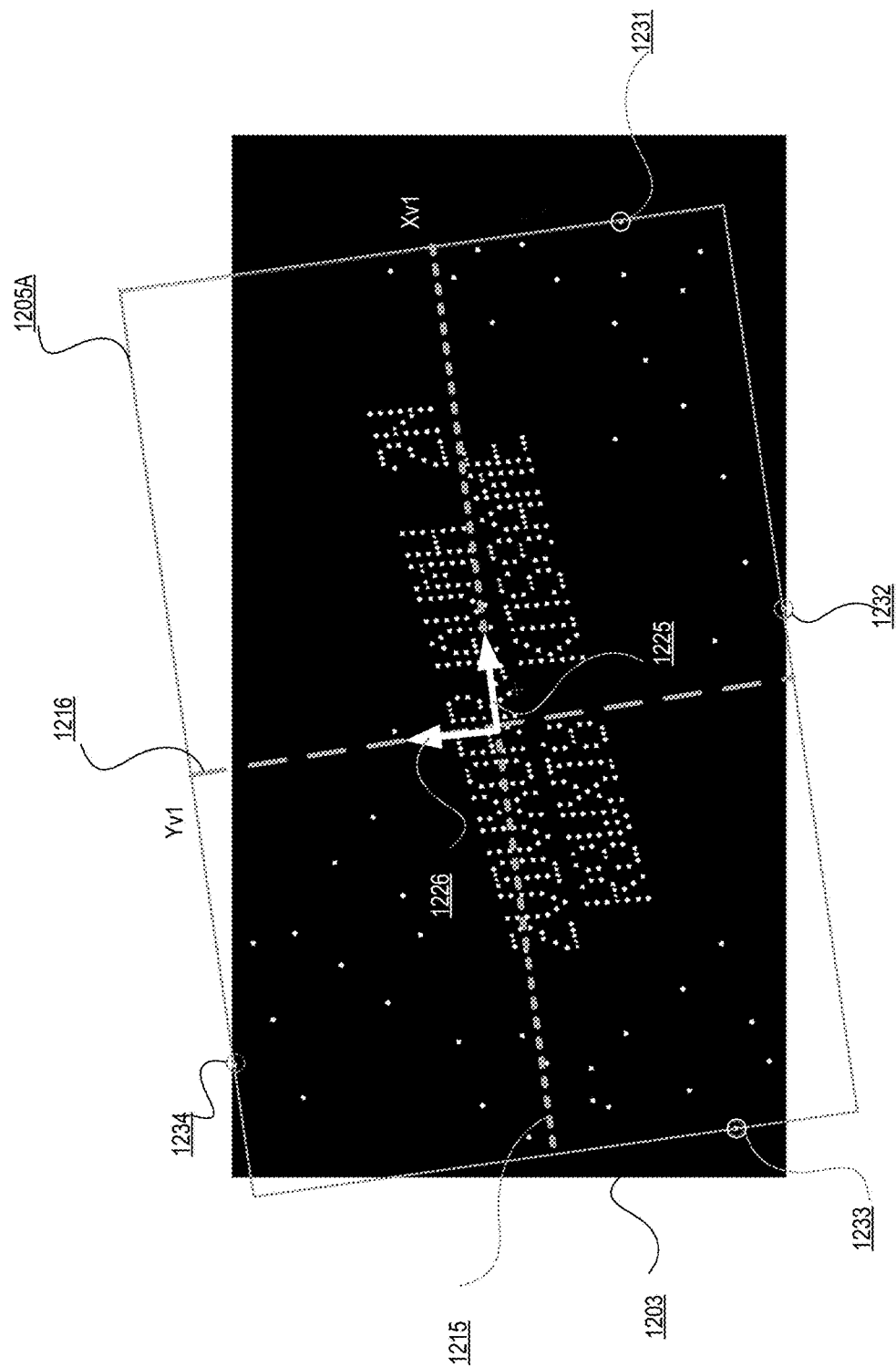
FIG. 13 illustrates an exemplary image of a set of dots with corresponding principal components resulting from the principal component analysis of the set of dots in accordance with some embodiments.

Once the dots of $D_1$ are extracted, a region of interest is determined based on a first and second axis resulting from a principal component analysis of the set of extracted dots. The region of interest is defined by the location and orientation of a bounding box (e.g., the rectangle 1205A). Principal component analysis (PCA) is a statistical procedure, known to those of ordinary skill in the art, that is used to convert a set of data of possibly correlated variables (e.g., coordinates of dot positions within an image) into a set of values of linearly uncorrelated variables called principal components. This transformation is defined in such a way that a first principal component has the largest possible variance (i.e., accounts for as much of the variability in the data as possible), and each succeeding component in turn has the highest variance possible under the constraint that it is orthogonal to the preceding components. The PCA results in the determination of eigenvectors that form an uncorrelated orthogonal basis set. FIG. 13 illustrates an exemplary set of dots with corresponding principal components resulting from the PCA of the set of dots in accordance with some embodiments. The first axis 1215 and second axis 1216 are defined according to principal components (eigenvectors 1225 and 1226 respectively) of the extracted set of dots.

Figure 14:
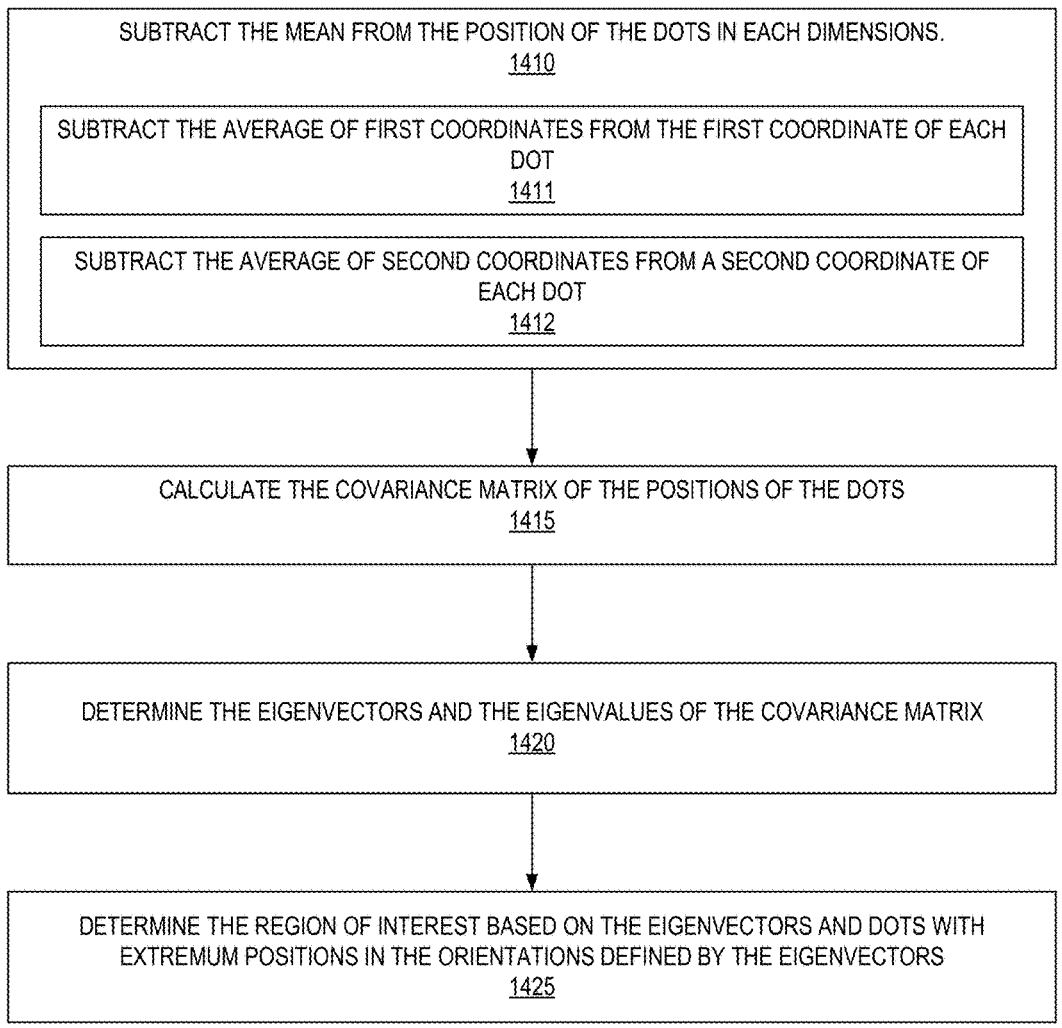
FIG. 14 illustrates exemplary operations performed for determining the region of interest comprising the set of dots in accordance with some embodiments.

The operations in the following flow diagram of FIG. 14 will be described with reference to the exemplary image of FIG. 13. FIG. 14 illustrates exemplary operations performed for determining the region of interest comprising the set of dots in accordance with some embodiments. At operation 1410, the mean is subtracted from the positions $(x_i, y_i)$ of the dots $d_i$ in each dimension. The mean subtracted is the average across each dimension (i.e., the average across the X coordinates and the average across the Y coordinates). Each of the $x_i$ values of the set of dots have $\bar{x}$ (the mean of the $x_i$ values of all the dots in the initial image 1203) subtracted (operation 1411), and each of the $y_i$ values have $\bar{y}$ (the mean of the $y_i$ values of all the dots in the initial image 1203) is subtracted (operation 1412) from them. At operation 1415, the covariance matrix cov(X,Y) of the positions $(x_i, y_i)$ of the dots $d_i$ is calculated. At operation 1420, the eigenvectors (1225 and 1226) and the eigenvalues of the covariance matrix cov (X,Y) are calculated. Flow then moves to operation 1425, at which the region of interest is determined based on the eigenvectors of the covariance matrix of the initial set of dots $D_1$ and further based on dots with extremum positions in the orientations defined by the eigenvectors. In some embodiments, the region of interest is defined by a bounding box that includes all the dots of the set $D_1$ on which the PCA was performed.

In the illustrated example of FIG. 13, the bounding box 1205A is defined based on the orientations of the eigenvectors 1225 and 1226 and the positions of the dots 1231-34. The dots 1231, 1232, 1233, and 1234 have associated coordinates which when projected on the coordinate system defined by the eigenvectors are extremum in at least one direction. Each of these points has at least one coordinate that is a maximum in a given direction parallel to an orientation of the eigenvectors when compared with the other dots in the image 1203. For example, the dot 1231 has an associate $x_i$ value which when projected on the coordinate system ($Xv_1$, $Yv_2$) defined by the eigenvectors ($v_1$, $v_2$) is a maximum in the positive direction of the $Xv_1$ axis (1215). The dot 1233 has an associate $x_i$ value which when projected on the coordinate system ($Xv_1$, $Yv_2$) defined by the eigenvectors ($v_1$, $v_2$) is a maximum in the negative direction of the $Xv_1$ axis (1215). The dot 1232 has an associate $y_i$ value which when projected on the coordinate system ($Xv_1$, $Yv_2$) defined by the eigenvectors ($v_1$, $v_2$) is a maximum in the negative direction of the $Yv_1$ axis (1216). The dot 1234 has an associate $y_i$ value which when projected on the coordinate system ($Xv_1$, $Yv_2$) defined by the eigenvectors ($v_1$, $v_2$) is a maximum in the positive direction of the $Yv_1$ axis (1216). The intersection of the lines parallel to the directions of the eigenvectors and that pass through each of these dots (1231-34) forms the bounding box 1205A. While in some embodiments, the bounding box of the region of interest is a rectangle, in other embodiments, it can have other shapes that include all the dots of the set of dots. These other shapes are oriented according to the eigenvectors and include all the dots (e.g., the region of interest can be an ellipse, or other).

In some embodiments, when the dots $d_i$ are associated with weights $w_i$, the PCA of a set of dots is further performed based on the weights. In these embodiments, the coordinates of a point are weighted coordinates such as the weight is multiplied by the respective coordinate. The covariance matrix is then calculated based on the weighted coordinates ($w_i x_i$, $w_i y_i$).

Once the region of interest is located, a determination is performed of whether it satisfies given selection criteria. In some embodiments, the selection criteria include the bounding box having a predetermined size and shape. For example, when the bounding box is a rectangle, the selection criteria may include determining that the rectangle's length is equal to a predetermined length and that the rectangle's width is equal to a predetermined width. In other embodiments, a bounding box's dimensions may be defined based on a predetermined diameter of a circle, or predetermined semiminor axis and semimajor axis of an ellipse. In some embodiments, the dimensions of the bounding box may be input by a user or alternatively preconfigured in the system. The dimensions of the bounding box may result from a preprocessing stage in which a user manually selects the region that includes the dot text from a model image including a model dot text.

Referring back to FIG. 12, at operation 12.3, upon determination that the region of interest 1205A does not satisfy the predetermined dimensions, one or more dots are removed from the set of dots $D_1$ to obtain a second set of dots $D_2$. The second set of dots is then used to determine a new region of interest defined by the bounding box 1205B based on the PCA of the new set of dots $D_2$. The operations (12.2) and (12.3) are repeated on successive sets of dots (of which outlier dots are removed recursively reducing the size of the set of dots and consequently the dimensions of the bounding box) until a region of interest defined by the bounding box 1205N is determined to satisfy the selection criteria of the dot text.

Figure 15A:
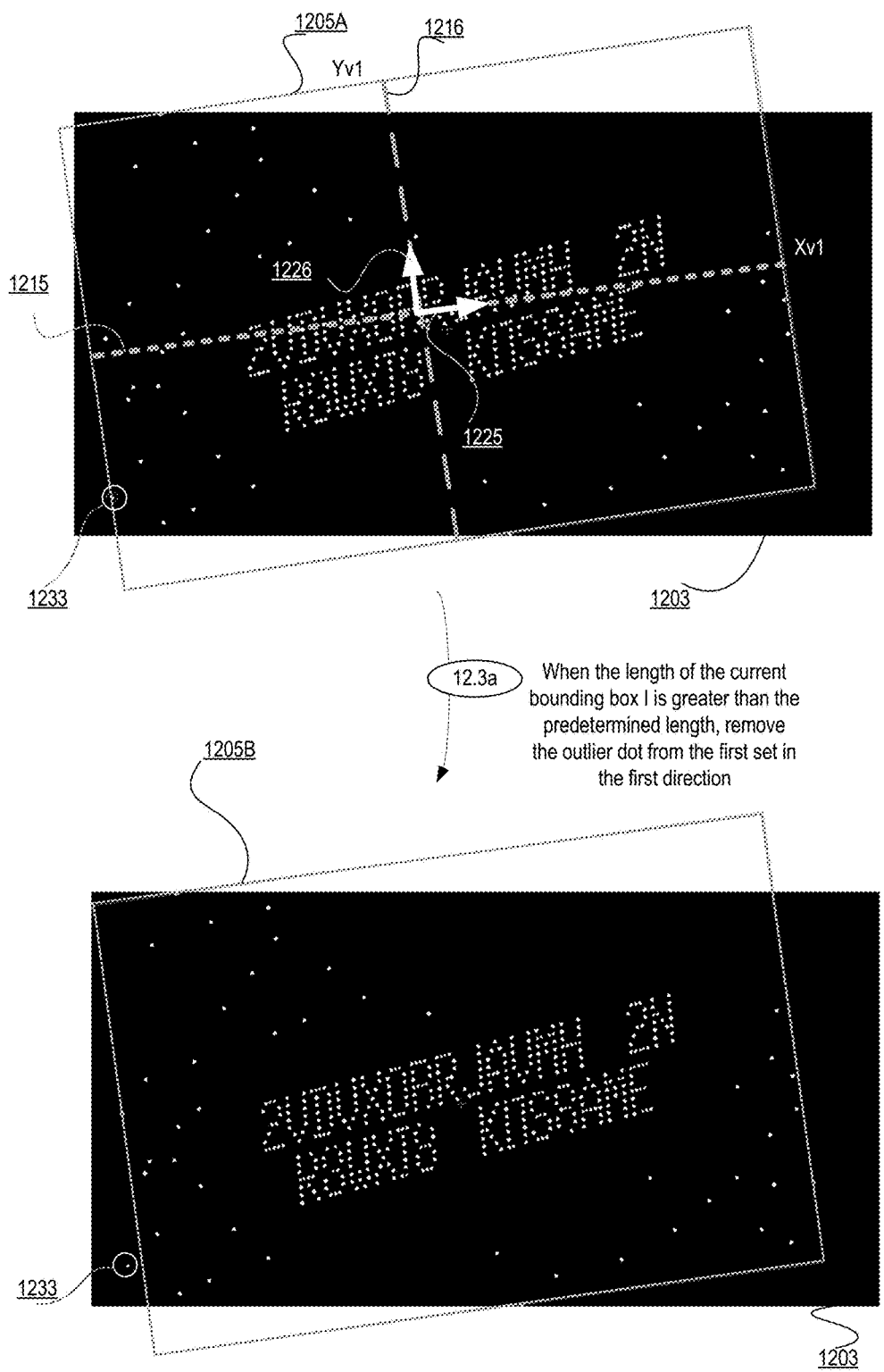
FIG. 15A illustrates exemplary operations for removing an outlier dot from a set of dots when a length of a bounding box is greater than a predetermined length in accordance with some embodiments.

FIG. 15A illustrates exemplary operations for removing an outlier dot from a set of dots when a length of a bounding box is greater than a predetermined length in accordance with some embodiments. In this example, the bounding box 1205A does not satisfy the dimensions of a predetermined bounding box. The bounding box 1205A is greater than the bounding box including the dots that form the text in the image. In this example, the length of the bounding box 1205A and its width are greater than to the predetermined length or width. At operation 12.3a at least one dot is removed from the set of dots $D_1$ to form a new set of dots $D_2$. As the length of the bounding box 1205 is greater than the determined length, the outlier dot to be removed is a dot that is the most distant when compared with the other dots of the set $D_1$ in the same orientation as the orientation of the long side of the bounding box 1205. For example, dot 1233 is removed from the set $D_1$ to form a new set of dots $D_2$.

In some embodiments, the outlier dot to be removed is determined based on a distance of the dot in the orientation of the eigenvector that is parallel to the orientation of the long side of the bounding box 1205A. In the example of FIG. 15A, the orientation of the bounding box 1205A is determined with respect to the eigenvectors $v_1$ (1225) and $v_2$ (1226). In one embodiment, the distance of the dot may be calculated by determining the difference between $x_{v1}$ (the coordinate of 1233 in the $X_{v1}$ axis) and the average $\bar{x}$ of the $x_i$ of the dots (as expressed in ($X_{v1}$, $Y_{v1}$ coordinate system). This difference can be expressed in terms of a number n of the standard variation std(X) of the $x_i$ of the dots. In other words, for each dot (or at least for a subset of dots) the measure $$ni = \frac{x - \bar{x}}{\sigma_x}$$

is compared with the measures of the other dots, and the dot with the highest measure when compared to the other dots is removed. For example, the dot 1233 is removed to obtain the new set of dots $D_2$. The PCA is computed on this new set of dots $D_2$ and a new bounding box 1205B is determined based on new eigenvectors associated with the new set of dots $D_2$. The new bounding box has a new dimension (with an associated length and an associated width). These dimensions are used to determine whether the new bounding box has the predetermined dimensions. In the illustrated example, the bounding box 1205B does not have the predetermined dimensions and therefore the region of interest defined by this box does not satisfy the selection criteria. The process is repeated and further dots are removed from the set $D_2$ until the predetermined size is reached and the selection criteria satisfied.

Figure 15B:
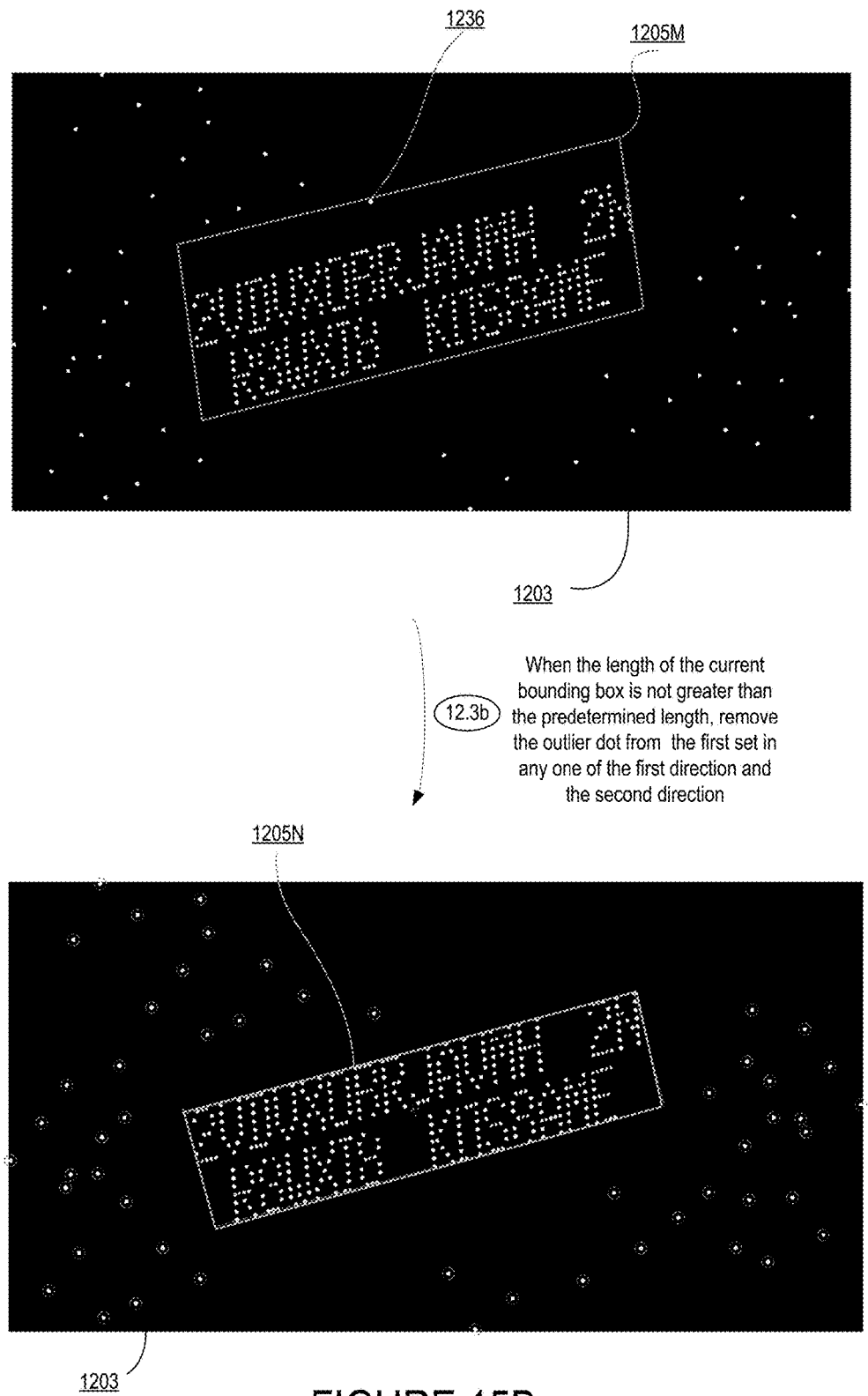
FIG. 15B illustrates exemplary operations for removing an outlier dot from a set of dots when a length of a bounding box is not greater than a predetermined length in accordance with some embodiments.

FIG. 15B illustrates exemplary operations for removing an outlier dot from a set of dots when a length of a bounding box is not greater than a predetermined size in accordance with some embodiments. In this example, the bounding box 1205M, surrounding a set of dots $D_m$ (which has been obtained after a certain number of iterations), does not satisfy the predetermined dimensions. While the bounding box 1205M does not have the predetermined dimensions (i.e., at least one of the length and the width of the bounding box 1205M is greater than the predetermined length or width), the length of the bounding box 1205M is equal to the predetermined length. At operation 12.3b the most distant outlier dot, in any of the two directions defined by the eigenvectors of the set of dots $D_m$, is removed from the set of dots $D_m$ to form a new set of dots $D_n$. For example, dot 1236 is removed from the set $D_m$ in a direction parallel to the shorter side of the bounding box 1205M to form the new set of dots $D_n$ as 1236 is the most distant dot when compared to the other dots. In some embodiments, the most distant outlier dot to be removed is determined based on a distance of the dot in a given orientation with respect to the mean of the dots. In one embodiment, the distance of the dot is calculated by determining the difference between the coordinate of 1236 with the average of the dots of the set $D_m$ associated with that coordinates. This distance can be expressed in the coordinate system defined by the eigenvectors in terms of numbers $n_x$ and $n_y$ of the standard variations std(X) and std(Y) that there is between coordinates x and y of the dots and the respective averages $\bar{x}$ and $\bar{y}$. In other words, for each dot (or at least for a subset of dots) the measures $$nx = \frac{x - \bar{x}}{\sigma_x}$$

and $$ny = \frac{y - \bar{y}}{\sigma_y}$$

are respectively compared with the measures of the other dots, and the dot with the highest measure when compared to the other dots is removed. For example, the dot 1236 is removed.

The PCA is computed on this new set of dots $D_n$ and a new bounding box 1205N is determined based on new eigenvectors associated with the new set of dots $D_n$. The new bounding box has a new size (with an associated length and an associated width). This size is used to determine whether the new bounding box 1205N has the predetermined dimension and size. In the illustrated example, the bounding box 1205N has the predetermined dimension and therefore the region of interest defined by this box satisfies the selection criteria. The bounding box's location, size and orientation define the region of interest within the image that includes the dot text.

While the embodiments for removing a dot from the set of dots are described above with respect to removing a single dot, in other embodiments, multiple dots may be removed to speed the convergence process of the bounding box defining the region of interest towards a box with the predetermined dimensions. Further alternative distances and measures can be used to determine the outlier dots to be removed from the set of dots without departing from the scope of the present invention. For example, a distance based on the percentiles can be used.

Figure 16:
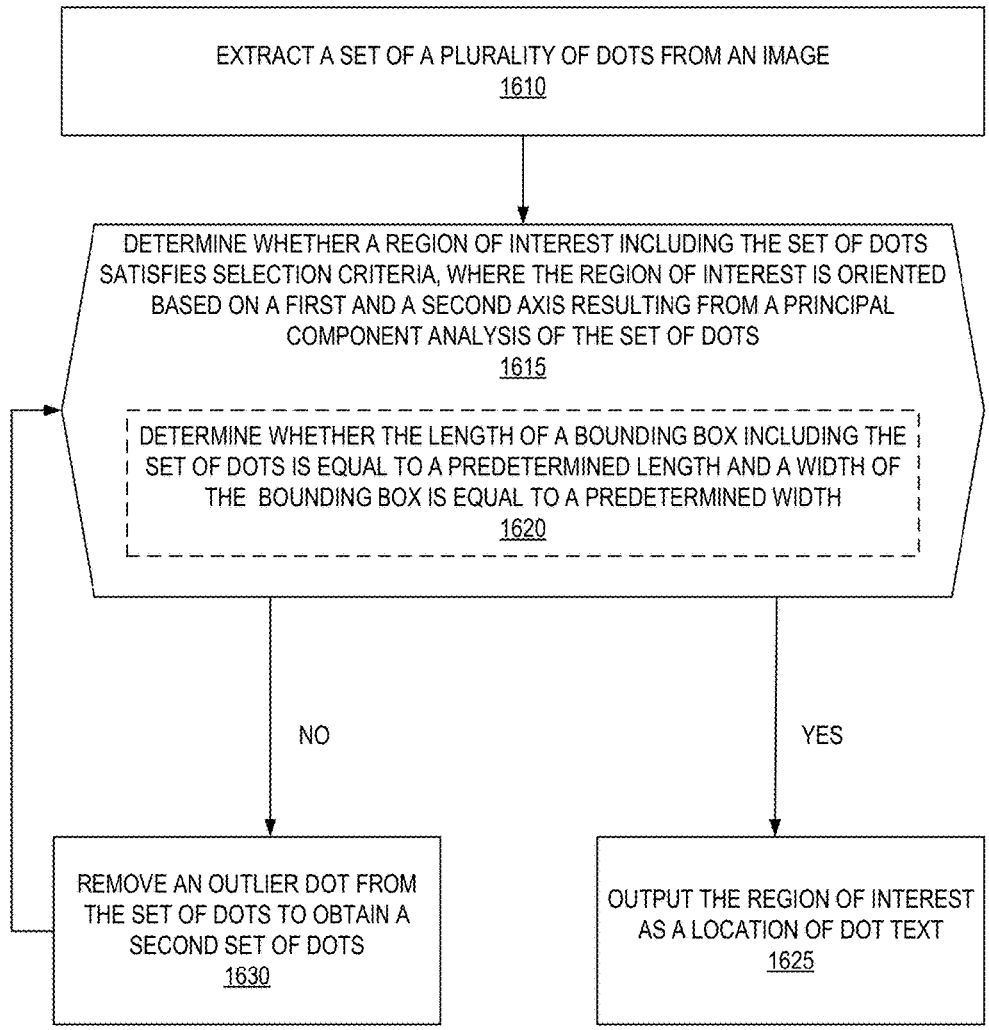
FIG. 16 illustrates a flow diagram of exemplary operations for locating dot text in an image in accordance with some embodiments.

FIG. 16 illustrates a flow diagram of exemplary operations for locating dot text in an image in accordance with some embodiments. At operation 1610 a first set of dots is extracted from an image. At operation 1615, a determination is performed of whether a first region of interest satisfies selection criteria. The region of interest is oriented based on a first and a second axis (1225 and 1226) resulting from a principal component analysis (PCA) of the first set of dots.

In some embodiments, the determination that the region of interest satisfies the criteria is performed by determining that the length of a bounding box (1205A) including the set of dots is equal to a predetermined length and a width of the bounding box is equal to a predetermined width. Flow then moves to operation 1625, in which responsive to determining that the region of interest satisfies the selection criteria (e.g., responsive to determining that the first bounding box (1205N) has the predetermined size (i.e., length and width)), the region of interest is output as the location of dot text within the image. In contrast, responsive to determining that the region of interest does not satisfy the selection criteria (e.g., first bounding box does not have the predetermined size (i.e., either one of the length or the width of the bounding box is different from the predetermined length or width respectively)), the flow moves to operation 1630, at which an outlier dot (1233, or 1236) is removed from the first set of dots to obtain a second set of dots. Flow then moves to operation 1615 at which, it is determined whether the region of interest comprising the second set of dots satisfies the selection criteria (e.g., second bounding box has a predetermined size). The region of interest including the second set of dots is oriented based on a third and fourth axis resulting from a principal component analysis of the second set of dots. This process (removing a dot, determining the region of interest) is repeated until a resulting region of interest is determined to satisfy the selection criteria (e.g., the bounding box is determined to have the predetermined size/dimensions).

Figure 17:
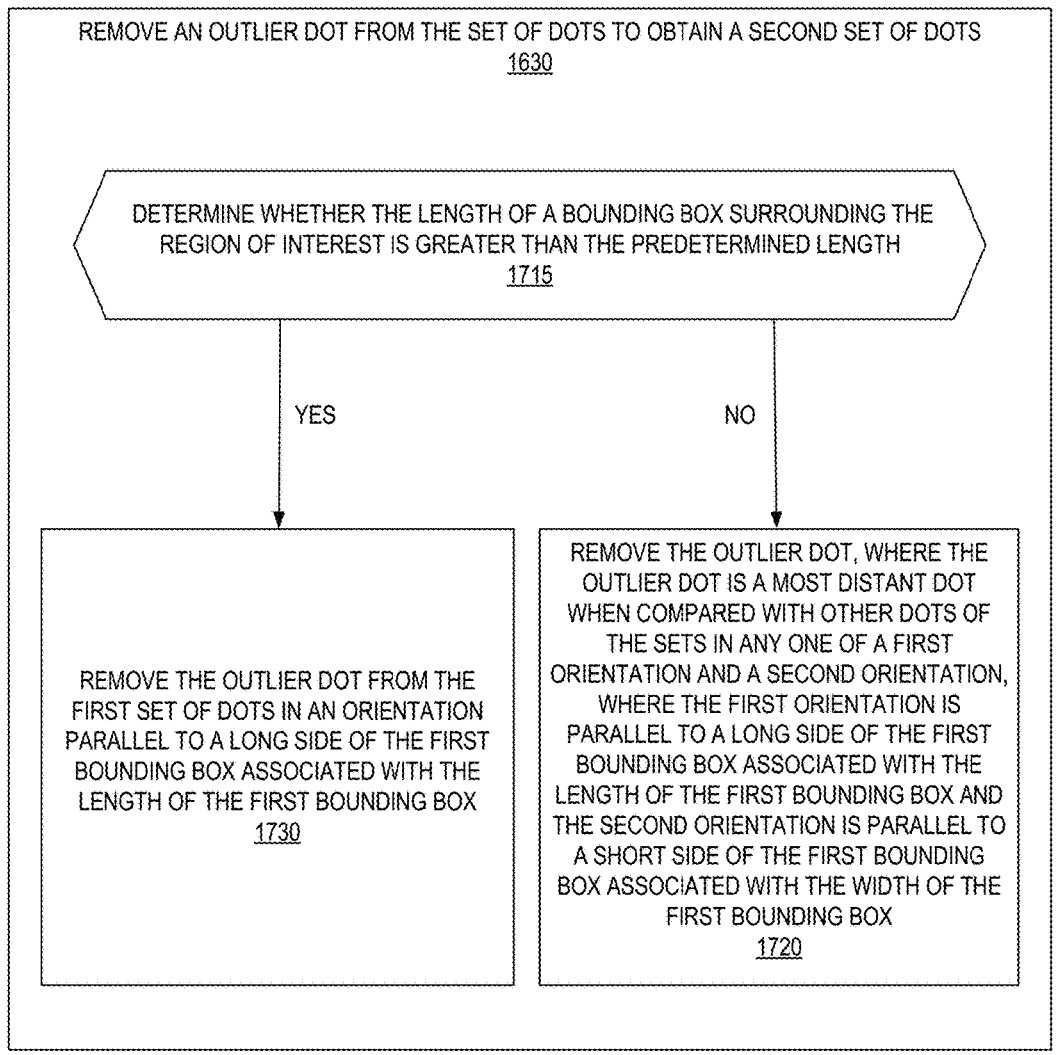
FIG. 17 illustrates a flow diagram of detailed exemplary operations for removing an outlier dot from a set of dots in accordance with some embodiments.

FIG. 17 illustrates a flow diagram of detailed exemplary operations for removing an outlier dot from a set of dots in accordance with some embodiments. At operation 1715, a determination of whether the length of the first bounding box is greater than the predetermined length is performed. Upon determining that the length of the first bounding box is greater than the predetermined length, flow then moves to operation 1730, at which an outlier dot is removed from the first set of dots in an orientation parallel to a long side of the first bounding box associated with the length of the first bounding box. Upon determining that the length of the first bounding box is not greater than the predetermined length, flow then moves to operation 1720, at which the outlier dot that is a most distant dot when compared with other dots of the sets in any one of a first orientation and a second orientation is removed. The first orientation is parallel to a long side of the first bounding box associated with the length of the first bounding box and the second orientation is parallel to a short side of the first bounding box associated with the width of the first bounding box.

Detection of Dots in an Image:

The embodiments described with reference to FIGS. 18A-23 enable the detection of dots in an image. As will be described in further detail below, in some embodiments, the operations performed to enable the detection of dots in an image can be performed independently of the operations enabling optical character recognition, dot text location, or orientation and dot pitch determination. In other embodiments, the operations performed to enable the detection of dots in an image can be performed as part of the operations enabling optical character recognition described with reference to FIGS. 1-5, alternatively or additionally, the operations can be performed as part of the dot text location described with reference to FIGS. 12-17, or in combination with the operations for performing orientation and dot pitch determination of FIGS. 6-11.

In some embodiments, the operations described with respect to FIGS. 18A-23 are implemented on an electronic device (such as the dot text optical character recognition unit 108 or data processing system 2400) and enable automatic detection of dots in an image. In some embodiments, the operations described herein are implemented by the dot extraction code 2434, which when executed by processor(s) 2405 of FIG. 24, cause the data processing system 2400 to automatically detect dots in an image. The set of dots detected can be used in the optical character recognition process described with reference to FIGS. 1-5, in the orientation and dot pitch detection process described with reference to FIGS. 6-11, and/or in the dot text detection process described with reference to FIGS. 12-17. For example, the operations described herein below can be performed at operation (1) of FIG. 1 and operation 310 of FIG. 3. Further the operations described herein below can be performed to determine and extract the subset of dots as illustrated in image 115A of FIGS. 6 and 7A used to determine the statistical neighborhood in the orientation and dot pitch detection process. The operations described herein below can further be used at operation 12.1 of FIG. 12 and operation 1610 of FIG. 16. While the embodiments of the present invention described with reference to FIGS. 18A-23 focus on exemplary use cases of optical character recognition and the detection of dots of characters, the use of the present invention is not so limited. Other use cases can be contemplated without departing from the scope and spirit of the present invention.

A recursive process of binarization and extraction of dots is performed. An image is binarized according to an initial intensity threshold to obtain an initial binary image including foreground and background pixels. Each foreground pixel has a foreground intensity value and each background pixel has a background intensity value. A set of one or more blobs are selected from the initial binary image to be part of a selected set of dots, where each blob from the set of blobs has characteristics of a dot. The pixels of the selected dots are replaced with background pixels in the image. Responsive to determining that a successive binarization is to be performed, the following operations are repeated: (i) binarization of the image according to a successive intensity threshold to obtain a successive binary image, where the successive intensity threshold is different from the initial intensity threshold, (ii) selection from the successive binary image of a successive set of one or more blobs including foreground pixels to be part of the selected set of dots, where each blob from the successive set has characteristics of a dot, and (iv) replacement in the image of each pixel of a dot from the successive set of dots with a background pixel. Responsive to determining that a successive binarization is not to be performed, the selected set of dots is output.

The recursive binarization and selection of dots enable the extraction of disjoint dots from an image where the dots satisfy given dot characteristics. The dots share size and shape characteristics and the image is analyzed to output all dots that have the same characteristics. The characteristics of a dot may include a predetermined size and shape of the dot which can be expressed as an area and elongation of a dot. The area represents the number of pixels forming the dot and the elongation is a ratio of the length versus the breadth of a dot. In some embodiments, the dot may have additional characteristics such as a predetermined contrast, a predetermined intensity value, a predetermined color, and any other characteristic that uniquely defines dots within the image.

Figure 18A:
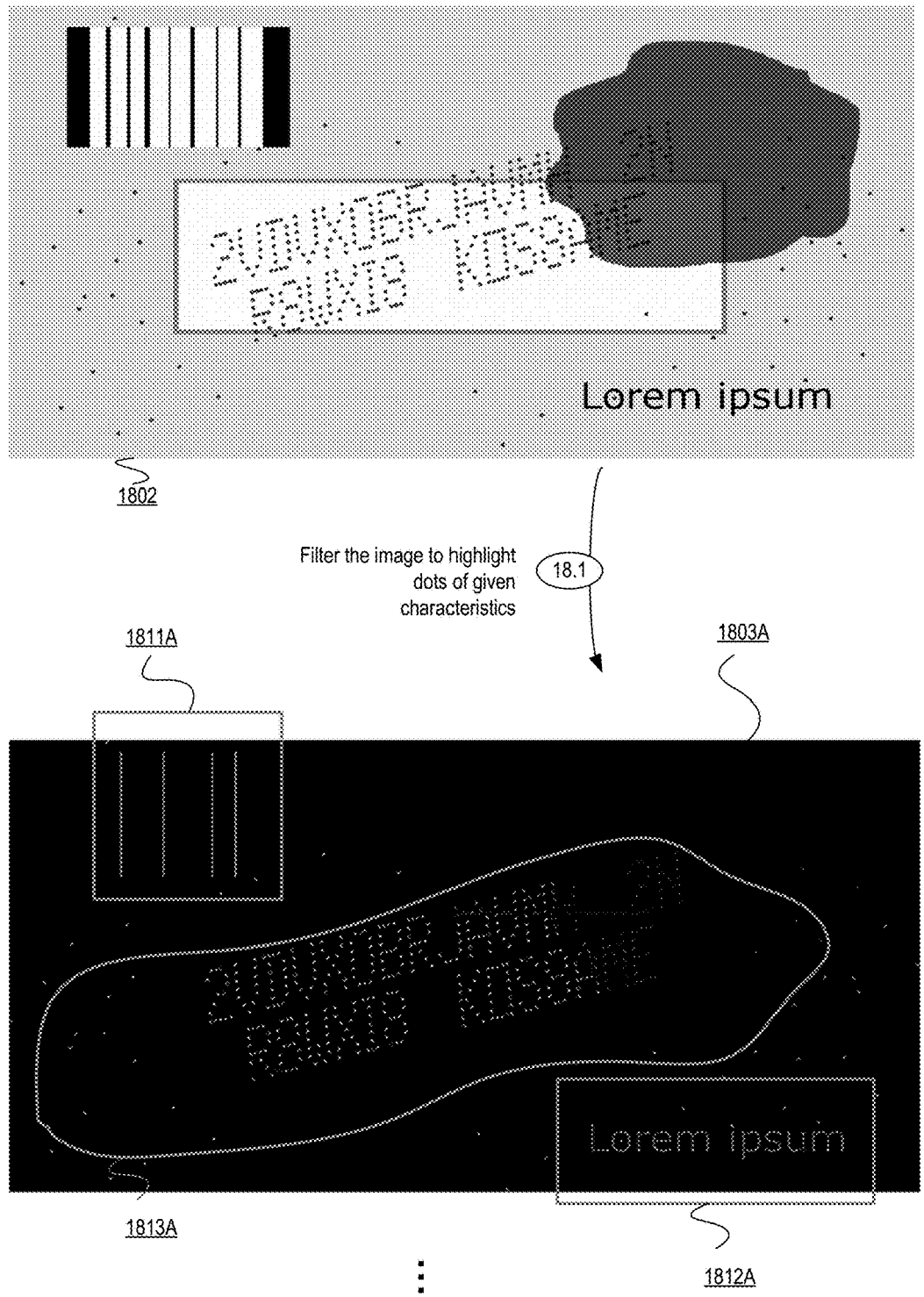
FIG. 18A illustrates exemplary operations for filtering an image in accordance with some embodiments.
Figure 18B:
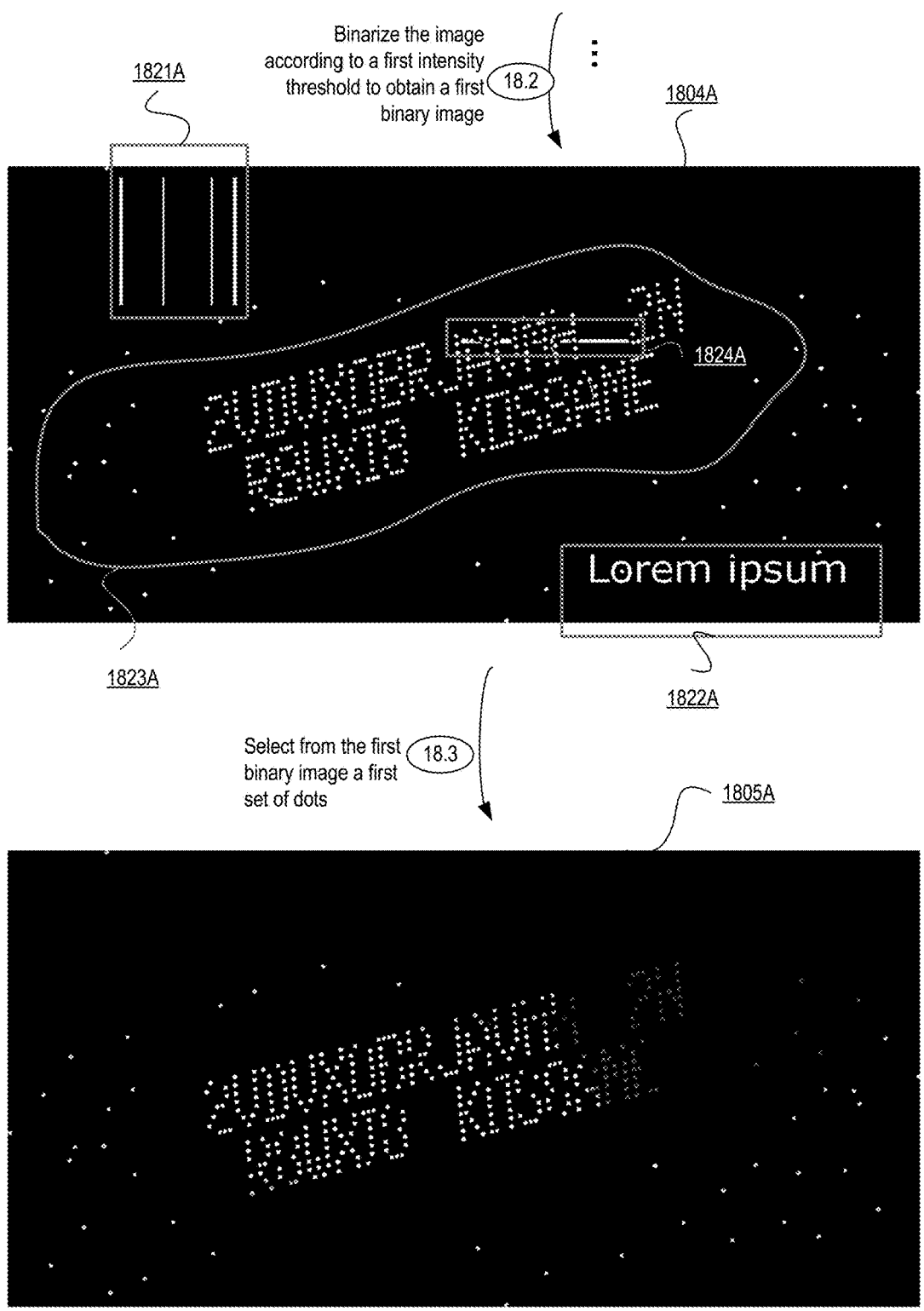
FIG. 18B illustrates exemplary operations for selecting an initial set of dots from an image in accordance with some embodiments.

FIG. 18A-18B illustrates exemplary operations for extracting an initial set of dots from an image according to an initial intensity threshold in accordance with some embodiments. The following embodiments will be described with reference to exemplary image 1802. The image 1802 can be acquired by the image acquisition device 106 or received through any other communication means or storage means. The image 1802 is a grayscale image, in which each pixel of the image has an intensity value within a given range (e.g., between 0 and 255 when the pixel intensity is represented with 8 bits; between 0 and 65535 when the pixel intensity is represented with 16 bits; or other ranges when the pixel intensity is represented with a different number of bits). In other embodiments, the image can be a color image (e.g., RGB). In some embodiments the color image can be converted into a grayscale image prior to performing the operations of the dot detection.

At operation 18.1, an image 1802 is filtered to extract dots with given characteristics. In some embodiments, a second order derivative filter is applied to the grayscale image 1802 to obtain a filtered image 1803A in which foreground connected sets of pixels that have characteristics of a dot (e.g., a predetermined shape and the predetermined size) are highlighted while portions of the image that do not have these characteristics are converted into pixels of background intensities. In some embodiments, the filter is used to bring out dots with a shape of a circle of diameter N (e.g., N=7 pixels, N=15 pixels, or any other value). For example, the filter can be a Laplacian filter, or another second order derivative filter which can be implemented as a Finite Impulse Response (FIR) filter, or an Infinite Impulse Response (IIR) filter. In other embodiments, other types of filters may be used.

The intensity of each pixel within the image 1803A corresponds to a measure indicative of the presence of a dot at that location. As illustrated in the filtered image 1803A, the application of the filter to the image 1802 results in the set of dots that has the desired characteristics (as represented with the subset 1813A), and other blobs within the image 1803A that do not satisfy the characteristics of a blob (or not all of the characteristics). For example, the filtered image includes elements 1811A and elements 1812A, which despite not being dots are extracted through the filtering operation (18.1). In some embodiments, the filtering of the image 1802 can be preceded by one or more optional preprocessing operations as described in further details with reference to FIG. 5 and operations 515-535.

In some embodiments, the filtering operation is optional and can be skipped. In these embodiments, the received image 1802 is binarized without further preprocessing. The flow of operations then moves to operation (18.2), at which the filtered image 1803A is binarized according to an initial intensity threshold $T_1$. The binary image 1804A includes the set of dots (that includes the subset 1823A) that have the characteristics of the desired dot, and other blobs within the image which don't have the characteristics of the dot (e.g., the lines 1821A, the stroked text 1822A, and the stripe 1824A that goes through the dots of the characters in the subset 1823A). An analysis of the binary image 1804A enables the selection, at operation (18.3), of an initial set of dots as illustrated in the resulting image 1805A.

In this example, the image 1805A representing the set of dots is a grayscale image and each pixel that is part of a dot in the image has the weight of the pixel as its intensity value. In contrast, pixels that are not part of any dots (e.g., pixels that form the blobs of the stroked text 1822A) are associated with a background intensity value (e.g., black). In some embodiments, the weight is the corresponding intensity value of the dot in the filtered image 1803A. In some embodiments, all pixels of a dot are associated with a same weight. For example, the weight can be a sum of all intensity values in the filtered image of the foreground pixels forming the dot. In some embodiments, the weight can be a function of the intensity value in the filtered image of the position of the local maxima pixel at which the dot was detected. In some embodiments, each pixel forming the dot can be associated with a respective weight and the dot is then associated with the multiple positions of the pixels and their associated weights. In other embodiments, the weight can be a measure indicative of the roundness/compactness of the dot and its diameter. More generally, the weight can be a measure indicative of the shape of the dot with respect to a model dot.

While FIG. 18B illustrates the extracted set of dots as an image (e.g., image 1805A), in other embodiments, the extracted set of dots can be stored as a list of positions $(x_i, y_i)$. In one embodiment, each dot $d_i$ is stored with a single position $(x_i, y_i)$ (determined with respect to a coordinate system of the original image 1802). The single position can be a position of a pixel that is part of the dot (e.g., a center of the dot, a top-left pixel of the dot, or any other pixel within the dot). In other embodiments, each dot $d_i$ is associated with multiple positions $\{(x_1, y_1), \ldots, (x_n, y_n)\}$ that represent the set of pixels $P_n$ that form the dot. In some embodiments, the dots are further stored with associated weights.

Figure 19:
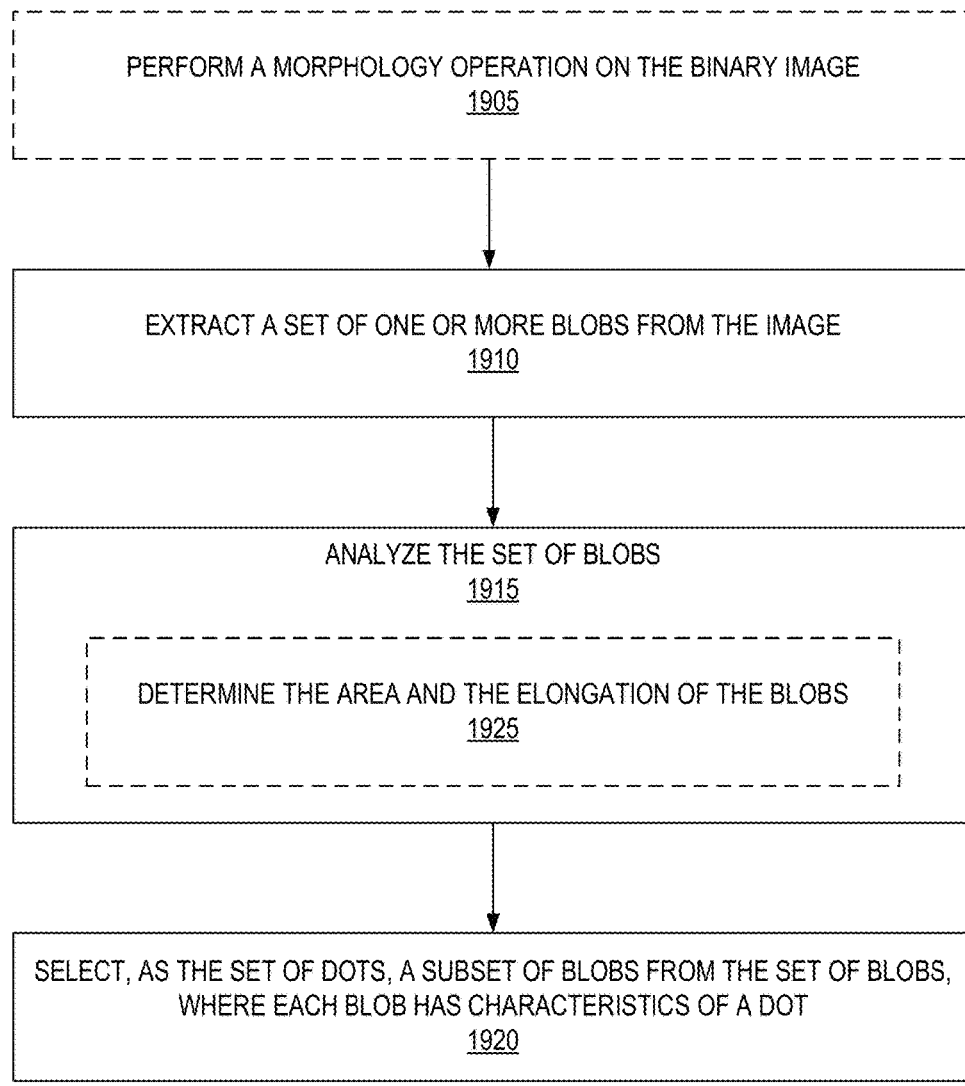
FIG. 19 illustrates a flow diagram of exemplary detailed operations for selecting a set of dots from a binary image in accordance with some embodiments.

The selection of the dots at operation (18.3) can be performed according to various embodiments. FIG. 19 illustrates a flow diagram of exemplary detailed operations for selecting a set of one or more dots from a binary image in accordance with some embodiments. At operation 1905 a morphology operation is performed on the binary image 1804A, which results in discarding thin structures that do not satisfy dot criteria (e.g., blobs that are thinner in width than the predetermined width of a blob). The morphology operation includes a dilation and erosion operations. Flow then moves to operation 1910, at which a set of blobs is extracted from the binary image 1805A. A blob consists of a group of connected pixels. Whether or not two pixels are connected is defined by the connectivity, that is, which pixels are neighbors and which are not. The two most often applied types of connectivity are a 4-connectivity or an 8-connectivity. Various mechanisms (referred to as connected component analysis or connected component labeling) can be used for finding the blobs in the binarized image. In some embodiments, a 4-connectivity blob analysis is performed to extract all blobs in the binarized image 1805A.

Flow then moves to operation 1915, at which the set of blobs is analyzed. In some embodiments, analyzing a blob includes determining (1925) the area and the elongation of the blob. The elongation is the ratio of the length of the dot versus its breadth. The length and breadth of the dot are determined based on the area and a perimeter of the blob (i.e., total length of the edges in the blob). Once the area and elongation of the blob are determined, these values are compared with predetermined elongation and predetermined area of a dot. Flow then moves to operation 1920 at which, a subset of blobs that has the characteristics of the dot (i.e., that has an elongation that is equal to the predetermined elongation and an area that is equal to the predetermined area) are extracted as a selected set of dots.

Figure 20:
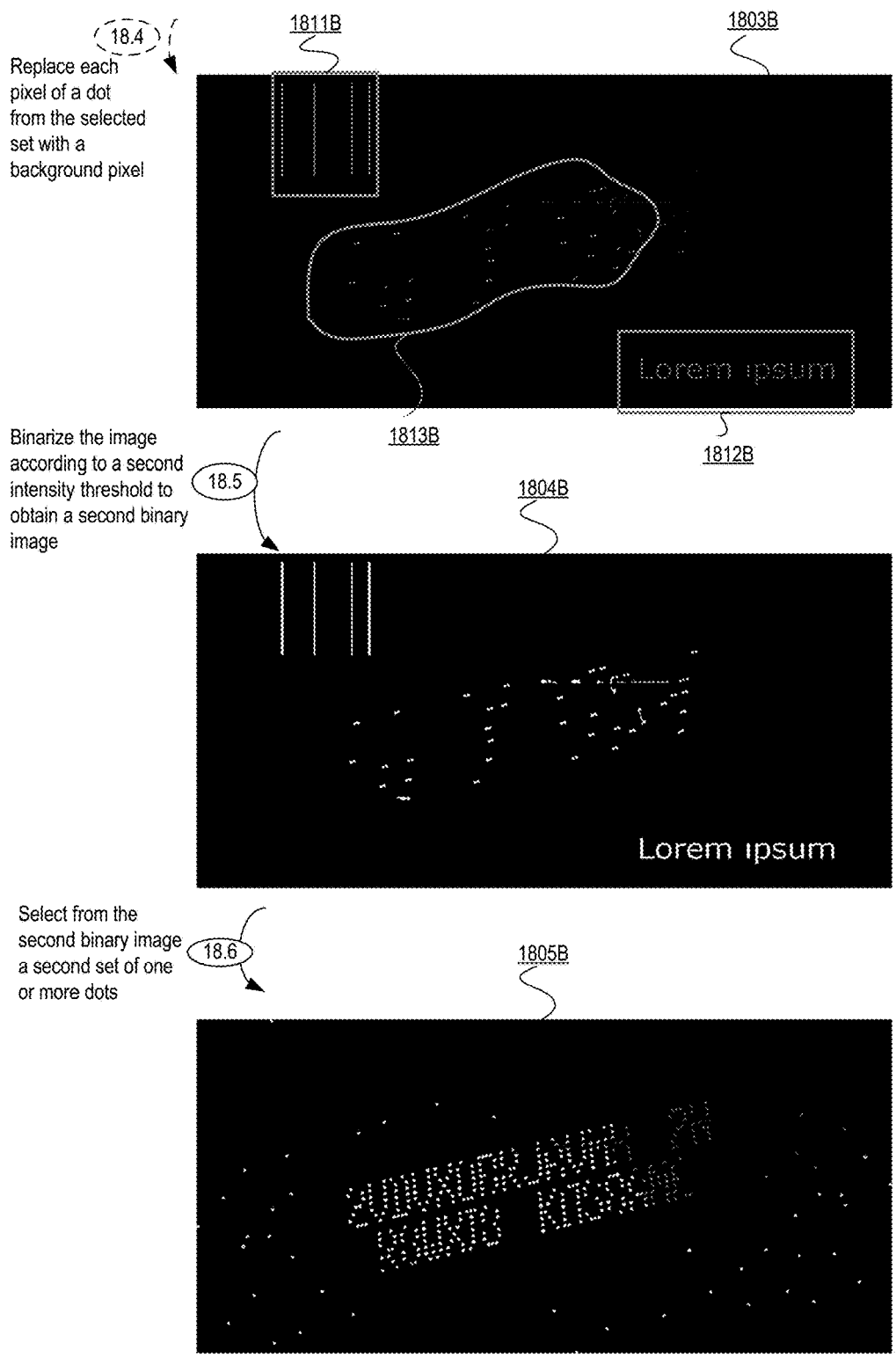
FIG. 20 illustrates exemplary operations for extracting additional dots from an image in accordance with some embodiments.

FIG. 20 illustrates exemplary operations for extracting additional dots from an image in accordance with some embodiments. Once an initial set of dots is selected as a result of the initial binarization with the initial threshold $T_1$, the pixels of the selected dots are replaced (operation 18.4) in the filtered image 1803A with background pixels (e.g., black pixels) resulting in the image 1803B. The image 1803B includes blobs which have not yet been selected as dots (e.g., the blobs forming the lines 1811B and the stroked characters 1812B, as well as the dots 1813B). In some embodiments, the operation of replacing the selected dots is optional and can be skipped. In some embodiments, pixels of all blobs (from the binary image 1804A) that are smaller than a dot (i.e., which have an area and elongation that are smaller than the predetermined elongation and area of a dot) are replaced with background pixels. In some embodiments, all blobs which have the characteristics of a dot and all blobs which are smaller than a dot when the image 1803A is binarized at the threshold $T_1$ are replaced in the grayscale image 1803A with black pixels resulting in the image 1803B. This enables the following operations of successive binarization and dot selection to be more efficient as only pixels of blobs which were not already selected will be analyzed. In some embodiments, the operation of replacing the blobs that are smaller than the dots is optional and can be skipped. In other embodiments, the two operations of replacing the pixels (pixels of dots, or pixels of small blobs) can be skipped.

The operations of binarization (18.5) and selection (18.6) of blobs that have the characteristics of a dot are repeated according to a successive intensity threshold $T_2$ (that is different from $T_1$) on the image 1803B to obtain the binary image 1804B and the selected set of dots 1805B. When the replacement of pixels operation (18.4) is skipped, the entire image 1803A is binarized at the successive intensity threshold instead of a binarization of 1803B. The selected set of dots represented in image 1805B includes all dots selected as a result of the binarization process of image 1803A according to intensity threshold $T_1$ and image 1803B according to the successive intensity threshold $T_2$. The repetition of these two operations on the image 1803B enable the selection of new dots that were not detected at the first iteration with the first threshold $T_1$ as will be described in further details below.

Figure 21A:
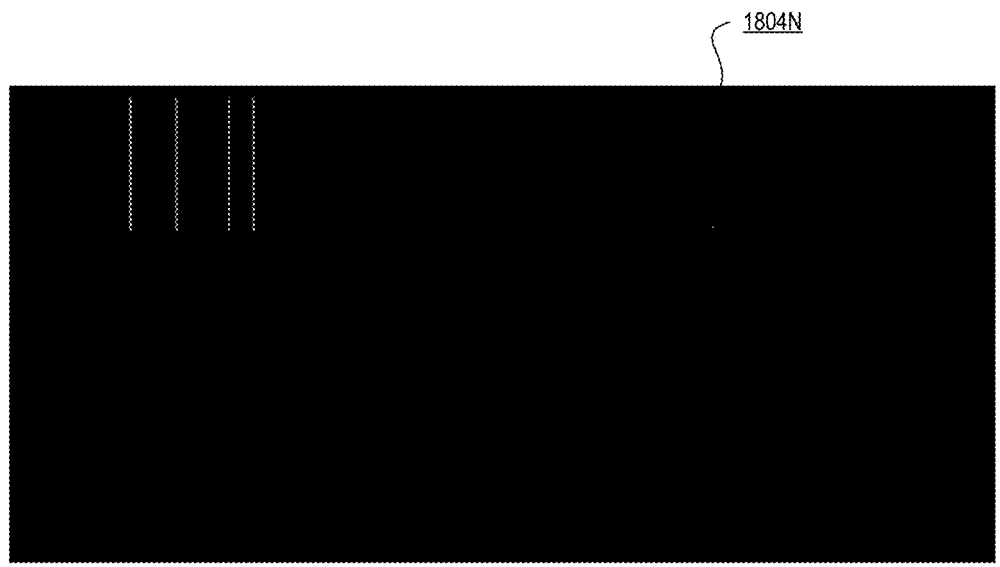
FIG. 21A illustrates an exemplary image obtained after N successive binarizations in accordance with some embodiments.
Figure 21B:
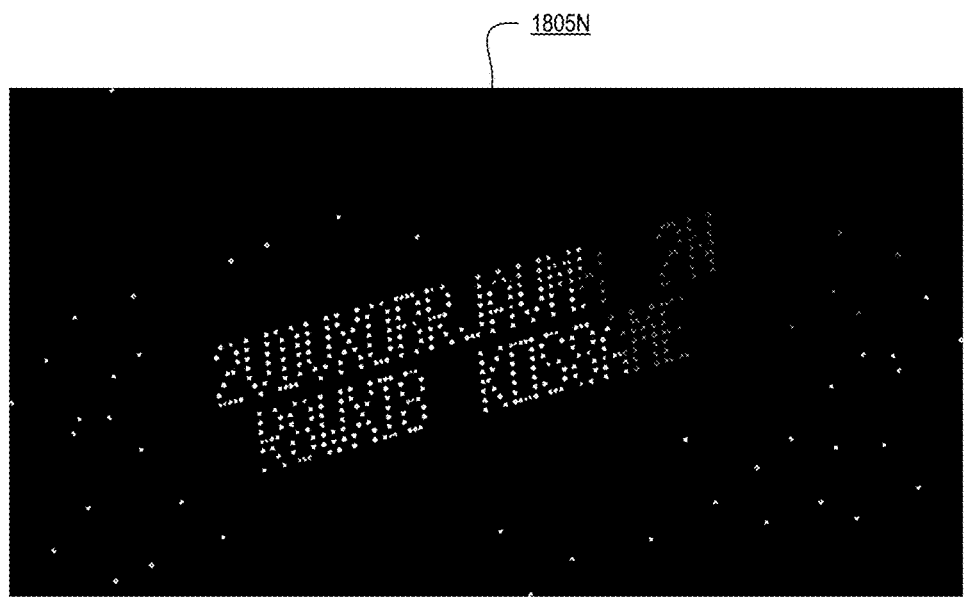
FIG. 21B illustrates an exemplary image representing a set of selected dots obtained after N successive binarizations in accordance with some embodiments.

In some embodiments, the process is repeated (binarization according to a threshold $T_i$, selection of dots and replacement of selected dots and discarded blobs with background pixels) for successive intensity thresholds $T_i$ until it is determined that no further binarization is to be performed. FIG. 21B illustrates an exemplary image representing a set of selected dots obtained after N successive binarizations and it was determined that no further binarization is to be performed. In one embodiment, this determination can be performed based on whether there is a remaining intensity threshold in a set of preset intensity thresholds. In other embodiments, the determination can be dynamically performed based on the content of the remaining blobs in the image. For example, FIG. 21A illustrates an exemplary image 1804N obtained after successive binarization N and replacement of selected dots in the image 1802. When this image is obtained, a determination is made that no blobs satisfying the dot criteria remain and no further binarization is to be performed. In some embodiments, an analysis of a histogram of intensities of the current image to be binarized (e.g., a histogram of the intensities of image 1803A, 1803B, or 1803N) is performed to determine if there is a significant number of pixels that may correspond to dots in the image in order to perform a next iteration of binarization and dot selection.

The use of successive intensity thresholds to binarize the image 1802 results in the selection of disjoint dots at different levels of binarization enabling the accurate detection within an image of all dots that satisfy the characteristics of a desired dot. As will be described in further details below with reference to FIGS. 22A-22C, in some examples, dots can appear connected at a given binarization level (and therefore will not be selected as separate/disjoint dots) while appearing as disjoint dots at another binarization level.

Figure 22A:
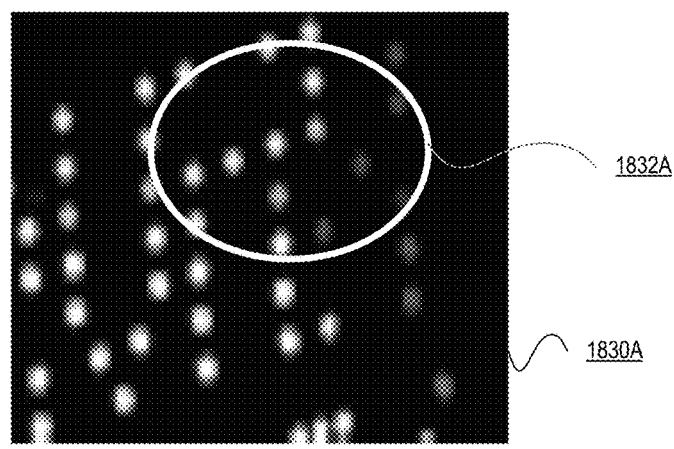
FIG. 22A illustrates an exemplary subset of selected dots obtained following an initial processing of an image in accordance with some embodiments.
Figure 22B:
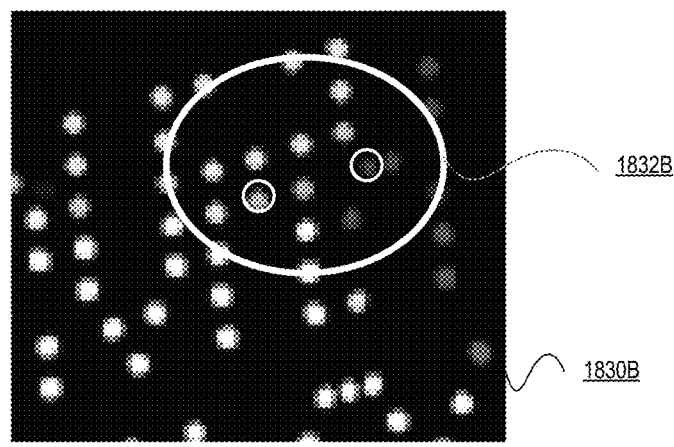
FIG. 22B illustrates an exemplary subset of selected dots obtained following successive processing iterations of an image in accordance with some embodiments.
Figure 22C:
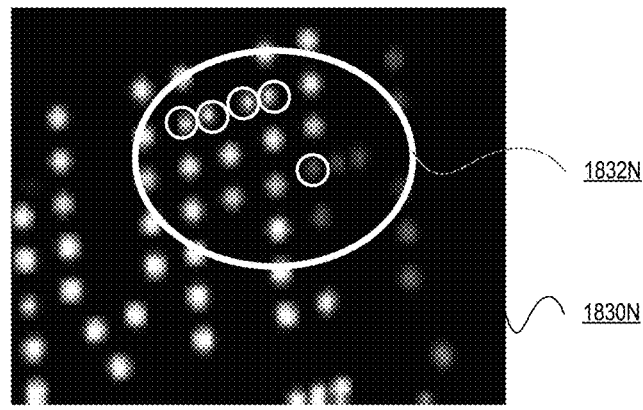
FIG. 22C illustrates an exemplary subset of selected dots obtained following a final processing iteration of an image in accordance with some embodiments.

FIG. 22A illustrates an exemplary subset of selected dots obtained following an initial processing of an image in accordance with some embodiments Image 1830A is a detailed view of a portion from image 1805A including the selected dots following the processing of the image 1802 according to the initial intensity threshold $T_1$. In the portion 1832A of image 1830A a subset of the dots forming the letters M and R are selected when the process is performed according to the threshold $T_1$. FIG. 22B illustrates an exemplary subset of selected dots obtained following successive processing iterations of an image in accordance with some embodiments. Image 1830B is a detailed view of a portion from image 1805B including the selected dots following the processing of the image 1802 according to the initial intensity threshold $T_1$ and the successive intensity threshold $T_2$. In the portion 1832B of image 1830B additional dots are selected for each one of the letters M and R as highlighted by the circled dots. These dots are not present in image 1830A and are extracted following the processing of the image 1803B according to the new threshold $T_2$. FIG. 22C illustrates an exemplary subset of selected dots obtained following a final processing iteration of an image in accordance with some embodiments Image 1830N is a detailed view of a portion from image 1805N including the selected dots following the processing of the image 1802 according to a set of successive intensity thresholds $\{T_1, \ldots, T_N\}$. The image 1805N includes the final set of dots selected through the recursive process. In the portion 1832N of image 1830N additional dots are selected for each one of the letters M and R as highlighted by the circled dots. These dots are not present in image 1830A and not present in the image 1830B. They are extracted following the processing of successive binary images at one or multiple intensity thresholds $T_i$. Thus the embodiments of the present invention enable the detection of dots even when there is an external object or lighting that overlaps with the dots (e.g., the dots of the letters M and R are detected even though the stripe 1824A overlaps the letters).

The recursive process described above is performed according to a sequence of intensity threshold values $\{T_1, \ldots, T_N\}$ used to binarize an image (e.g., 1802) into a sequence of binarized images (e.g., 1804A-1804N). These intensity thresholds can be selected according to various embodiments. In a first embodiment, the sequence of intensity thresholds is incremented from a minimum intensity value to a maximum intensity value with a regular increment value $\Delta T$. For example, the intensity threshold values can vary from the black intensity value (0) to the white intensity value (255) with regular increments of $\Delta T$ (e.g., $\Delta T=1$, 10, 15, etc.). In a second embodiment, the sequence of intensity thresholds is decremented from a maximum intensity value to a minimum intensity value with a regular value $\Delta T$. For example, the intensity thresholds can vary from the white intensity value (255) to the black intensity value (0) with regular decrements $\Delta T$ (e.g., $T=1$, 10, 15, etc.). In other embodiments, the sequence of thresholds can be chosen based on a histogram of intensities of the image 1802. For example, as a result of the analysis of the histogram, a minimum intensity value that the pixels in the image 1802 have can be selected as the initial intensity threshold $T_1$ and a maximum intensity value can be selected as the final threshold $T_N$. Each successive intensity threshold can be selected based on the histogram by determining whether the image includes pixels at a given intensity level. In some embodiments, an intensity level can be selected as a threshold if a given number of pixels with that intensity level is included in the image (e.g., if a number of pixels equivalent to N dots with an intensity level $T_i$ is present in the image, the intensity level Ti is selected as a threshold). Other sequences of thresholds can be used without departing from the scope of the present invention.

Figure 23:
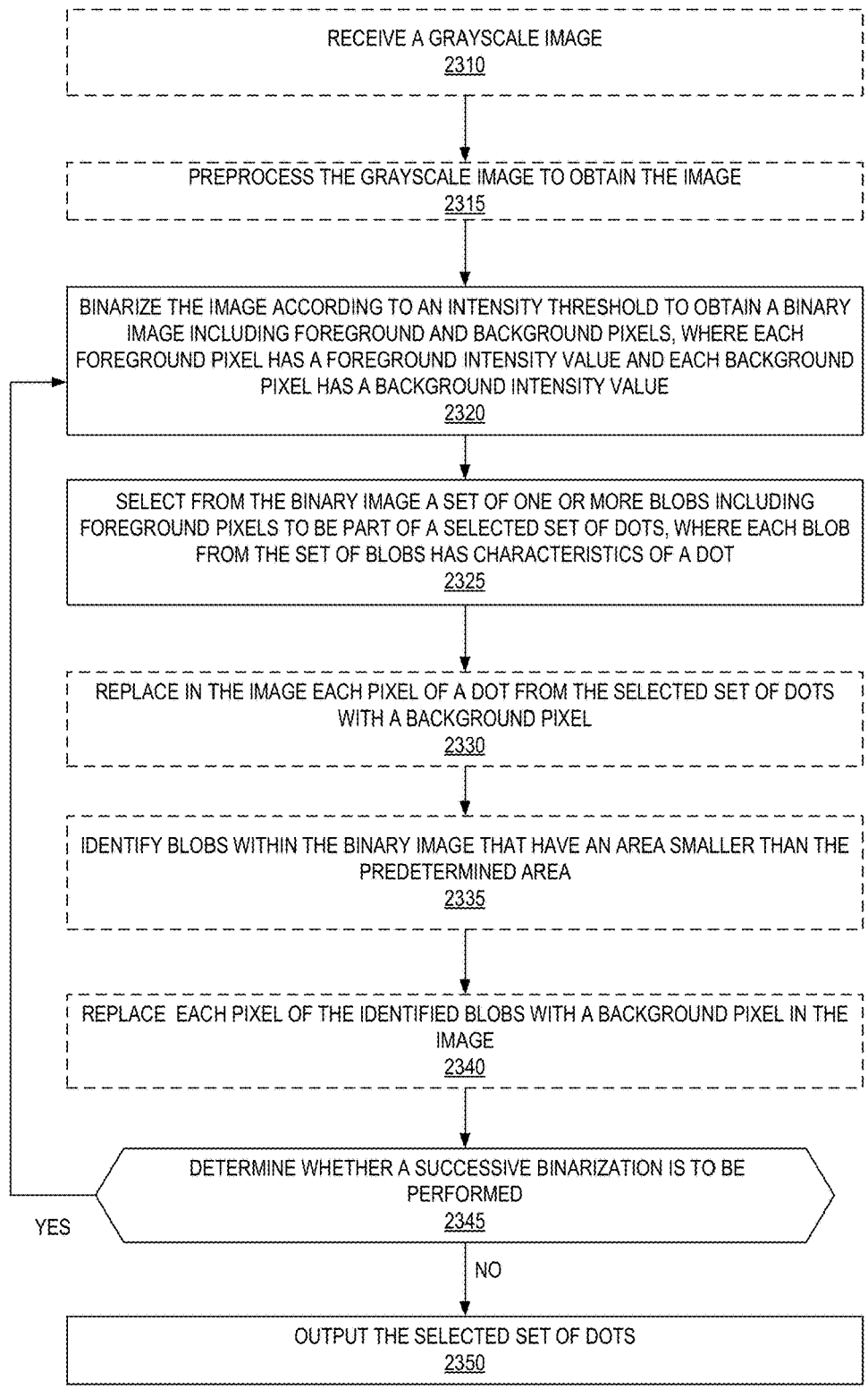
FIG. 23 illustrates a flow diagram of exemplary operations for performing dot detection in an image in accordance with some embodiments.

FIG. 23 illustrates exemplary operations for performing dot detection in an image in accordance with some embodiments. At operation 2310 a grayscale image (e.g., image 1802) is received. While the operations are described with reference to a grayscale image, in other embodiments, the image received is a color image. In some embodiments, the received image is preprocessed at operation 2315 to obtain a filtered image (e.g., image 1803A). The preprocessing may include performing the operations 515-545 described with reference to FIG. 5. In other embodiments, the preprocessing can be skipped, and the flow moves from operation 2310 to operation 2320. At operation 2320, the image is binarized according to an initial intensity threshold (e.g., according to $T_1$) to obtain an initial binary image (e.g., 1804A) including foreground and background pixels. Each foreground pixel has a foreground intensity value and each background pixel has a background intensity value. Flow moves to operation 2325 at which, a set of blobs including foreground pixels is selected from the initial binary image to be part of a selected set of dots (e.g., as represented in image 1805A). Each blob from the set of blobs has characteristics of a dot (e.g., each blob has a predetermined size and shape of a dot as defined with a predetermined elongation and predetermined area). Flow then moves to operation 2330, at which, each pixel of a dot from the selected set of dots is replaced with a background pixel in the image. As a result a second image (e.g., 1803B) is obtained in which all pixels belonging to a selected dot have been removed (i.e., replaced with a background pixel). In some embodiments, the operation 2330 of replacing the selected dots is optional and can be skipped.

In some embodiments, flow then moves to operation 2335, at which blobs that have an area smaller than the predetermined area are identified in the binary image (1804A). Flow then moves to operation 2340, at which each pixel from the identified blobs is replaced with a background pixel in the image (resulting in image 1803B). In some embodiments, the operations 2335 and 2340 are skipped and flow moves from operation 2330 to 2345.

At operation 2345, a determination is performed of whether a successive binarization is to be performed. Upon determining that a successive binarization is to be performed flow moves to operation 2320 and the operations 2320 to 2345 are repeated with a successive intensity threshold. The successive intensity threshold can be determined according to various mechanisms as described in further details above. Once it is determined that no further binarization is to be performed, flow moves to operation 2350, at which the selected set of dots is output.

The selected set of dots can then be used in multiple ways. For example, the selected set of dots can be used to perform the operations of the dot text detection as described with respect to FIGS. 12-17. In other embodiments, the selected set of dots can be used in the operations of the dot text OCR of FIGS. 1-5, and/or in the orientation and dot pitch determination process of FIGS. 6-11. The use of successive intensity thresholds to binarize an image present clear advantages with respect to previous dot detection approaches as it results in the accurate detection of all dots within an image that satisfy the characteristics of a desired dot.

Architecture

Figure 24:
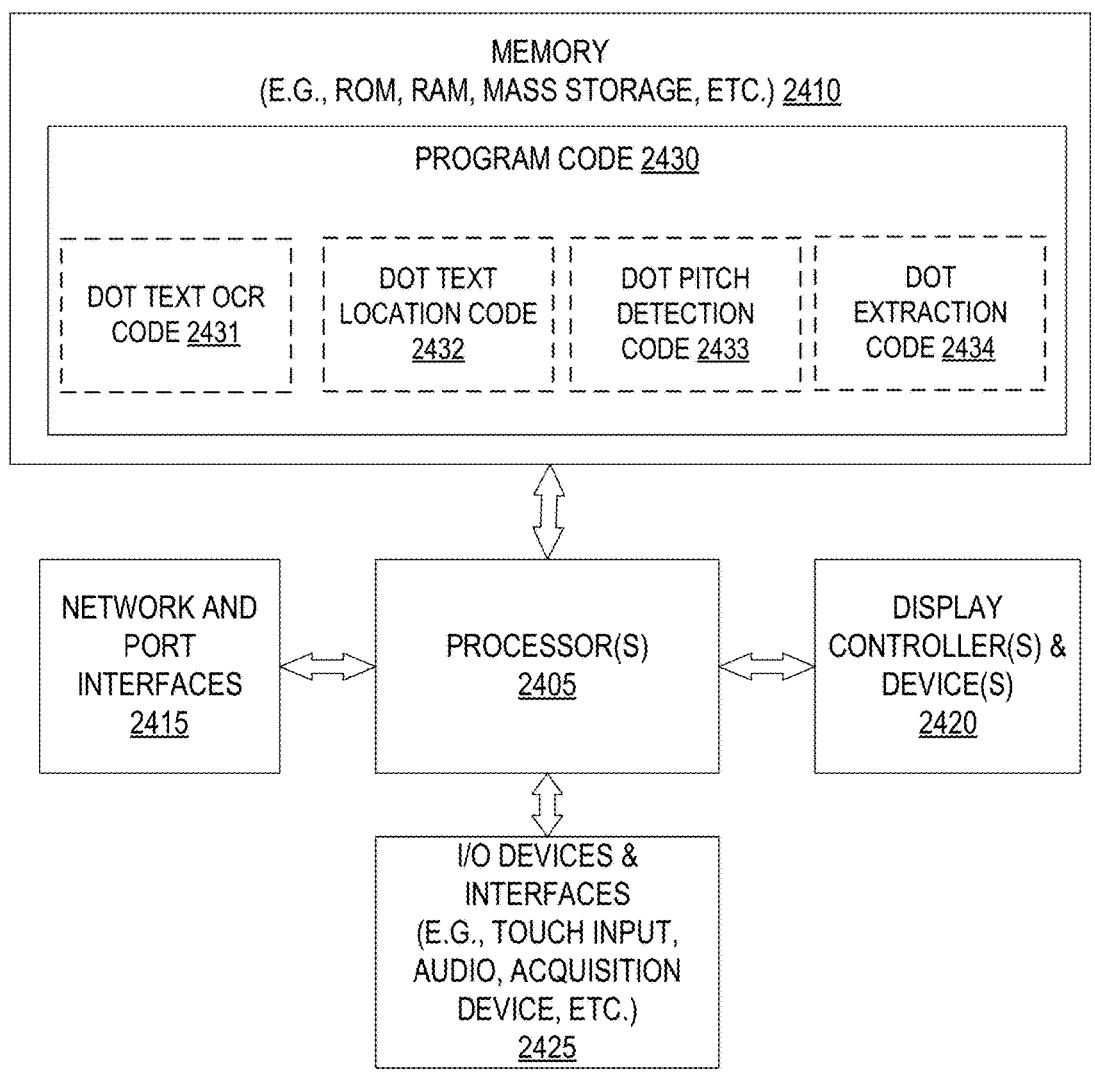
FIG. 24 is a block diagram illustrating an exemplary data processing system that may be used in some embodiments.

FIG. 24 illustrates a block diagram for an exemplary data processing system 2400 that may be used in some embodiments. Data processing system 2400 includes one or more processors 2405 and connected system components (e.g., multiple connected chips). Alternatively, the data processing system 2400 is a system on a chip or Field-Programmable gate array. One or more such data processing systems 2400 may be utilized to implement the functionality of the dot text optical character recognition unit 108 as illustrated in FIGS. 1-5.

The data processing system 2400 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 2410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 2405, and machine-readable transmission media (also called a carrier) (e.g., electrical, optical, radio, acoustical or other form of propagated signals—such as carrier waves, infrared signals). For example, the depicted machine readable storage media 2410 may store program code 2430 that, when executed by the processor(s) 2405, causes the data processing system 2400 to perform efficient and accurate optical character recognition. For example, the program code 2430 may include a dot text OCR code 2431, which when executed by the processor(s) 2405, causes the data processing system 2400 to perform the operations described with reference to FIGS. 1-5. The program code 2430 may further include a dot text location code 2432, which when executed by the processor(s) 2405, causes the data processing system 2400 to perform the operations described with reference to FIGS. 12-17. The program code 2430 may further include a dot pitch detection code 2433, which when executed by the processor(s) 2405, causes the data processing system 2400 to perform the operations described with reference to FIGS. 6-11. The program code 2430 may further include a dot extraction code 2434, which when executed by the processor(s) 2405, causes the data processing system 2400 to perform the operations described with reference to FIGS. 18A-23.

In some embodiments, each of the dot text OCR code 2431, the dot text location code 2432, the dot pitch detection code 2433, and the dot extraction code 2434 are implemented separately on separate data processing systems. In other embodiments, any combination of two or more of the dot text OCR code 2431, the dot text location code 2432, the dot pitch detection code 2433, and the dot extraction code 2434 can be implemented in the same data processing system. In some embodiments, one or more of the dot text location code 2432, the dot pitch detection code 2433, and the dot extraction code 2434 can be included as part of the dot text OCR code 2431.

Thus, an electronic device (e.g., a computer or an FPGA) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 2400 also includes an audio input/output subsystem 2415 which may include a microphone and/or a speaker for, for example, playing back music or other audio, receiving voice instructions to be executed by the processor(s) 2405, playing audio notifications, etc. A display controller and display device 2420 provides a visual user interface for the user, e.g., GUI elements or windows.

The data processing system 2400 also includes one or more input or output ("I/O") devices and interfaces 2425, which are provided to allow a user to provide input to, receive output from, and otherwise transfer data to and from the system. These I/O devices 2425 may include a mouse, keypad, keyboard, a touch panel or a multi-touch input panel, camera, frame grabber, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 2400.

The I/O devices and interfaces 2425 may also include a connector for a dock or a connector for a USB interface, FireWire, Thunderbolt, Ethernet, etc., to connect the system 2400 with another device, external component, or a network. Exemplary I/O devices and interfaces 2425 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 2400 with another device, external component, or a network and receive stored instructions, data, tokens, etc. It will be appreciated that one or more buses may be used to interconnect the various components shown in FIG. 24.

It will be appreciated that additional components, not shown, may also be part of the system 2400, and, in certain embodiments, fewer components than that shown in FIG. 24 may also be used in a data processing system 2400. For example, in some embodiments the data processing system 2400 may include or be coupled with an image acquisition device for acquiring images.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). The embodiment has been described with quantities (e.g., size, dimension, length, width, elongation, area, perimeter, etc.) that can be equal to a given value, it should be understand that such equalities are not intended to be absolute equalities only and that a quantity can be determined to be equal to a given value if it is within an acceptable range from the given value.

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of determining orientation and dot pitch of characters in an image, wherein dots are extracted from the image as a set of dots, the method comprising:
   determining a statistical neighborhood of the set of dots of the image, wherein the statistical neighborhood includes a set of points and each point is associated with a position and a statistical measure accumulated at the position based on a relative position of dots with respect to neighbor dots from the set of dots of the image, and based on whether one or more dots that satisfy a shape and a size criteria are located at that position;
   computing a Fast Fourier Transform (FFT) across the set of points of the statistical neighborhood; and
   determining, based on the FFT of the set of points, a first orientation and a first distance between adjacent dots of characters along the first orientation, and a second orientation and a second distance between adjacent dots of the characters along the second orientation, wherein the first orientation, the first distance, the second orientation and the second distance are to be used to perform accurate optical character recognition.

2. The method of claim 1, wherein determining the statistical neighborhood of the set of dots includes:
   for a first dot from the set of dots, performing:
      determining a subset of dots from the set of dots located within a neighborhood of the dot; and
      for a second dot from the subset of dots, accumulating the statistical measure at a position of a point from the statistical neighborhood, wherein the position of the point is based on a relative position of the second dot with respect to the first dot.

3. The method of claim 2, wherein accumulating the statistical measure includes adding to the statistical measure at the position of the point a product of a first weight with a second weight, wherein the first weight is associated with the first dot and a second weight is associated with the second dot.

4. The method of claim 1, wherein determining the first orientation, the first distance, the second orientation and the second distance includes:
   applying a pass band filter to the FFT of the set of points.

5. The method of claim 4, wherein determining the first orientation, the first distance, the second orientation and the second distance further includes:
   identifying from the filtered FFT of the set of points, two FFT points that satisfy selection criteria.

6. The method of claim 5, wherein the selection criteria include at least one of the following criteria: each one of the two FFT points is within a range of 0 and 180 degrees, each one of the two FFT points has a high intensity value, the two FFT points are at least D degrees apart, where D is a predetermined value.

7. The method of claim 5, wherein the first orientation is determined based on a direction of a first vector from a center of the FFT of the set of points to a first one of the two FFT points and the first distance between adjacent dots of characters is determined based on a magnitude of the first vector.

8. The method of claim 5, wherein the second orientation is determined based on a direction of a second vector from a center of the FFT of the set of points to a second one of the two FFT points and the second distance between adjacent dots of characters is determined based on a magnitude of the second vector.

9. The method of claim 1 further comprising:
performing a transformation on the image based on the first orientation, the first distance, the second orientation and the second distance to obtain a transformed image including stroked characters; and
outputting the transformed image.

10. The method of claim 9, wherein performing the transformation includes:
correcting the image of the set of dots for orthogonality based on the first orientation and the second orientation; and
sampling the image of the set of dots based on the first distance and the second distance to remove space between adjacent dots from the set of dots in the first and the second orientation respectively.

11. A non-transitory computer readable storage medium that provides instructions, which when executed by a processor, cause said processor to perform operations comprising:
determining a statistical neighborhood of a set of dots of an image, wherein dots are extracted from the image as the set of dots, wherein the statistical neighborhood includes a set of points and each point is associated with a position and a statistical measure accumulated at the position based on a relative position of dots with respect to neighbor dots from the set of dots of the image, and based on whether one or more dots that satisfy a shape and a size criteria are located at that position;
computing a Fast Fourier Transform (FFT) across the set of points of the statistical neighborhood; and
determining, based on the FFT of the set of points, a first orientation and a first distance between adjacent dots of characters along the first orientation, and a second orientation and a second distance between adjacent dots of the characters along the second orientation, wherein the first orientation, the first distance, the second orientation and the second distance are to be used to perform accurate optical character recognition.

12. The non-transitory computer readable storage medium of claim 11, wherein determining the statistical neighborhood of the set of dots includes:
for a first dot from the set of dots, performing:
determining a subset of dots from the set of dots located within a neighborhood of the dot; and
for a second dot from the subset of dots, accumulating the statistical measure at a position of a point from the statistical neighborhood, wherein the position of the point is based on a relative position of the second dot with respect to the first dot.

13. The non-transitory computer readable storage medium of claim 12, wherein accumulating the statistical measure includes adding to the statistical measure at the position of the point a product of a first weight with a second weight, wherein the first weight is associated with the first dot and a second weight is associated with the second dot.

14. The non-transitory computer readable storage medium of claim 11, wherein determining the first orientation, the first distance, the second orientation and the second distance includes:
applying a pass band filter to the FFT of the set of points.

15. The non-transitory computer readable storage medium of claim 14, wherein determining the first orientation, the first distance, the second orientation and the second distance further includes:
identifying from the filtered FFT of the set of points, two FFT points that satisfy selection criteria.

16. The non-transitory computer readable storage medium of claim 15, wherein the selection criteria include at least one of the following criteria: each one of the two FFT points is within a range of 0 and 180 degrees, each one of the two FFT points has a high intensity value, the two FFT points are at least D degrees apart, where D is a predetermined value.

17. The non-transitory computer readable storage medium of claim 15, wherein the first orientation is determined based on a direction of a first vector from a center of the FFT of the set of points to a first one of the two FFT points and the first distance between adjacent dots of characters is determined based on a magnitude of the first vector.

18. The non-transitory computer readable storage medium of claim 15, wherein the second orientation is determined based on a direction of a second vector from a center of the FFT of the set of points to a second one of the two FFT points and the second distance between adjacent dots of characters is determined based on a magnitude of the second vector.

19. The non-transitory computer readable storage medium of claim 11, wherein the operations further comprise:
performing a transformation on the image based on the first orientation, the first distance, the second orientation and the second distance to obtain a transformed image including stroked characters; and
outputting the transformed image.

20. The non-transitory computer readable storage medium of claim 19, wherein performing the transformation includes:
correcting the image of the set of dots for orthogonality based on the first orientation and the second orientation; and
sampling the image of the set of dots based on the first distance and the second distance to remove space between adjacent dots from the set of dots in the first and the second orientation respectively.

21. A system for determining orientation and dot pitch of characters in an image, wherein dots are extracted from the image as a set of dots, the system comprising:
one or more processors; and
a non-transitory computer readable storage medium that stores code which when executed by the one or more processors, causes the system to:
determine a statistical neighborhood of the set of dots of the image, wherein the statistical neighborhood includes a set of points and each point is associated with a position and a statistical measure accumulated at the position based on a relative position of dots with respect to neighbor dots from the set of dots of the image, and based on whether one or more dots that satisfy a shape and a size criteria are located at that position,
compute a Fast Fourier Transform (FFT) across the set of points of the statistical neighborhood, and
determine, based on the FFT of the set of points, a first orientation and a first distance between adjacent dots of characters along the first orientation, and a second orientation and a second distance between adjacent dots of the characters along the second orientation, wherein the first orientation, the first distance, the second orientation and the second distance are to be used to perform accurate optical character recognition.

22. The system of claim 21, wherein to determine the statistical neighborhood of the set of dots includes:
for a first dot from the set of dots, to perform:
determining a subset of dots from the set of dots located within a neighborhood of the dot; and
for a second dot from the subset of dots, accumulating the statistical measure at a position of a point from the statistical neighborhood, wherein the position of the point is based on a relative position of the second dot with respect to the first dot.

23. The system of claim 22, wherein to accumulate the statistical measure includes to add to the statistical measure at the position of the point a product of a first weight with a second weight, wherein the first weight is associated with the first dot and a second weight is associated with the second dot.

24. The system of claim 21, wherein to determine the first orientation, the first distance, the second orientation and the second distance includes:
to apply a pass band filter to the FFT of the set of points.

25. The system of claim 24, wherein to determine the first orientation, the first distance, the second orientation and the second distance further includes:
to identify from the filtered FFT of the set of points, two FFT points that satisfy selection criteria.

26. The system of claim 25, wherein the selection criteria include at least one of the following criteria: each one of the two FFT points is within a range of 0 and 180 degrees, each one of the two FFT points has a high intensity value, the two FFT points are at least D degrees apart, where D is a predetermined value.

27. The system of claim 25, wherein the first orientation is determined based on a direction of a first vector from a center of the FFT of the set of points to a first one of the two FFT points and the first distance between adjacent dots of characters is determined based on a magnitude of the first vector.

28. The system of claim 25, wherein the second orientation is determined based on a direction of a second vector from a center of the FFT of the set of points to a second one of the two FFT points and the second distance between adjacent dots of characters is determined based on a magnitude of the second vector.

29. The system of claim 21, wherein the system is further to:
perform a transformation on the image based on the first orientation, the first distance, the second orientation and the second distance to obtain a transformed image including stroked characters; and
output the transformed image.

30. The system of claim 29, wherein to perform the transformation includes:
to correct the image of the set of dots for orthogonality based on the first orientation and the second orientation; and
to sample the image of the set of dots based on the first distance and the second distance to remove space between adjacent dots from the set of dots in the first and the second orientation respectively.

* * * * *